(12) United States Patent
Sheng et al.

(10) Patent No.: US 11,485,486 B2
(45) Date of Patent: Nov. 1, 2022

(54) ACTIVE FLOW CONTROL FOR DUCTED FANS AND FAN-IN-WING CONFIGURATIONS

(71) Applicant: The University of Toledo, Toledo, OH (US)

(72) Inventors: Chunhua Sheng, Toledo, OH (US); Qiuying Zhao, Toledo, OH (US)

(73) Assignee: The University of Toledo, Toledo, OH (US)

( * ) Notice: Subject to any disclaimer, the term of this patent is extended or adjusted under 35 U.S.C. 154(b) by 689 days.

(21) Appl. No.: 15/596,170

(22) Filed: May 16, 2017

(65) Prior Publication Data
US 2018/0346108 A1 Dec. 6, 2018

Related U.S. Application Data

(60) Provisional application No. 62/338,212, filed on May 18, 2016.

(51) Int. Cl.
| | |
|---|---|
| *B64C 27/32* | (2006.01) |
| *B64C 27/20* | (2006.01) |
| *F15D 1/00* | (2006.01) |
| *B64C 11/00* | (2006.01) |
| *B64C 29/00* | (2006.01) |
| *B64C 21/02* | (2006.01) |
| *B64C 21/08* | (2006.01) |

(52) U.S. Cl.
CPC .......... *B64C 27/325* (2013.01); *B64C 11/001* (2013.01); *B64C 21/025* (2013.01); *B64C 21/08* (2013.01); *B64C 27/20* (2013.01); *B64C 29/0025* (2013.01); *F15D 1/007* (2013.01); *B64C 2230/04* (2013.01); *B64C 2230/06* (2013.01); *B64C 2230/28* (2013.01)

(58) Field of Classification Search
CPC .... F04D 29/541; F04D 29/545; F04D 29/547; B64C 27/325; B64C 21/08; B64C 21/025; B64C 29/0025; B64C 11/001; B64C 27/20; B64C 2230/04; B64C 2230/06; B64C 2230/28; B64C 21/04; B64C 21/06; F15D 1/007
See application file for complete search history.

(56) References Cited

U.S. PATENT DOCUMENTS

| | | | | |
|---|---|---|---|---|
| 3,484,039 A | | 12/1969 | Mittelstaedt | |
| 3,735,593 A | * | 5/1973 | Howell | F02C 7/045 |
| | | | | 60/226.1 |
| 3,920,203 A | * | 11/1975 | Moorehead | F02K 1/70 |
| | | | | 244/207 |

(Continued)

OTHER PUBLICATIONS

"Julian Tan Kok Ping, SauKeong Ban, ChingSeong Tan, Preliminary Design of Vertical Take-Off and Landing (VTOL) UAV with Steerable Vertical Thrust Effect" (Year: 2010).*

(Continued)

*Primary Examiner* — Woody A Lee, Jr.
*Assistant Examiner* — Jesse M Prager
(74) *Attorney, Agent, or Firm* — MacMillan, Sobanski & Todd, LLC

(57) ABSTRACT

Systems, methods, lift fans, and aircraft involving active flow control of a ducted fan or fan-in-wing configuration are described.

4 Claims, 64 Drawing Sheets
(57 of 64 Drawing Sheet(s) Filed in Color)

(56) References Cited

U.S. PATENT DOCUMENTS

| | | | | |
|---|---|---|---|---|
| 4,993,663 | A * | 2/1991 | Lahti | B64C 21/06 244/130 |
| 5,016,837 | A * | 5/1991 | Willis | B64C 21/04 244/12.1 |
| 5,417,391 | A * | 5/1995 | Savitsky | B64C 21/06 244/204.1 |
| 5,727,381 | A * | 3/1998 | Rogers | B63H 1/28 114/151 |
| 5,743,493 | A * | 4/1998 | McCaughan | B64C 21/08 244/130 |
| 5,841,079 | A * | 11/1998 | Parente | B64C 23/00 181/214 |
| 5,934,611 | A * | 8/1999 | Tindell | B64C 21/025 181/214 |
| 6,379,110 | B1 * | 4/2002 | McCormick | B64C 23/00 415/115 |
| 6,390,418 | B1 * | 5/2002 | McCormick | B64C 23/00 244/1 N |
| 6,899,302 | B1 * | 5/2005 | Hassan | B64C 21/025 244/130 |
| 7,870,721 | B2 * | 1/2011 | Winter | B64D 33/02 137/15.1 |
| 8,082,726 | B2 * | 12/2011 | Cloft | F02C 9/18 137/15.1 |
| 8,104,707 | B1 | 1/2012 | Ohanian, III | |
| 8,276,392 | B2 * | 10/2012 | Van Der Woude | F02C 7/14 60/39.83 |
| 8,282,037 | B2 * | 10/2012 | Jain | B64D 29/00 244/207 |
| 8,640,986 | B2 * | 2/2014 | Surply | B64D 33/02 244/204 |
| 8,967,964 | B2 * | 3/2015 | Sheaf | F02K 3/04 416/1 |
| 9,611,865 | B2 * | 4/2017 | Morel | F02C 6/08 |
| 10,479,489 | B2 * | 11/2019 | Bertels | F04D 29/522 |
| 2002/0134891 | A1 * | 9/2002 | Guillot | B64C 3/00 244/204.1 |
| 2005/0081530 | A1 * | 4/2005 | Bagnall | B64C 21/06 60/785 |
| 2006/0076456 | A1 * | 4/2006 | Layton | B64C 11/001 244/53 B |
| 2008/0054121 | A1 * | 3/2008 | Yoeli | B64C 1/1415 244/12.1 |
| 2009/0196739 | A1 * | 8/2009 | Tsuchiya | F02C 7/04 415/119 |
| 2010/0140416 | A1 * | 6/2010 | Ohanian, III | B64C 21/04 244/23 A |
| 2011/0103969 | A1 * | 5/2011 | Sheaf | F02K 3/04 416/90 R |
| 2011/0147533 | A1 * | 6/2011 | Goossen | B64C 11/001 244/23 A |
| 2011/0217163 | A1 * | 9/2011 | Camci | F04D 29/541 415/220 |
| 2017/0037779 | A1 * | 2/2017 | Khalid | B64C 21/06 |
| 2018/0208297 | A1 * | 7/2018 | Ramakrishnan | B64C 21/06 |
| 2019/0263529 | A1 * | 8/2019 | Edwards | B64C 21/025 |
| 2020/0407043 | A1 * | 12/2020 | Ajumobi | B64C 21/08 |

OTHER PUBLICATIONS

Kondor et al., "Experimental Investigation of a Morphing Nacelle Ducted Fan", NASA / ONR Circulation Control Workshop, (2004), pp. 435-468.

* cited by examiner

| Cases | Diagrams | Upper Slots | Lower Slots | Exit Slots |
|---|---|---|---|---|
| Baseline FIW | | - | - | - |
| Full-Inj-Ext | | Full 8 | Full 8 | - |
| Full-Inj-Ext (2) | | Full 8 | Full 8 | - |
| Semi-Up-Ext | | Windward 4 | - | - |
| Semi-Low-Ext | | - | Windward 4 | - |
| Semi-Up-Zero | | Windward 4 | - | Windward 4 |
| Semi-Low-Zero | | - | Windward 4 | Windward 4 |

FIG. 28 – Table 4

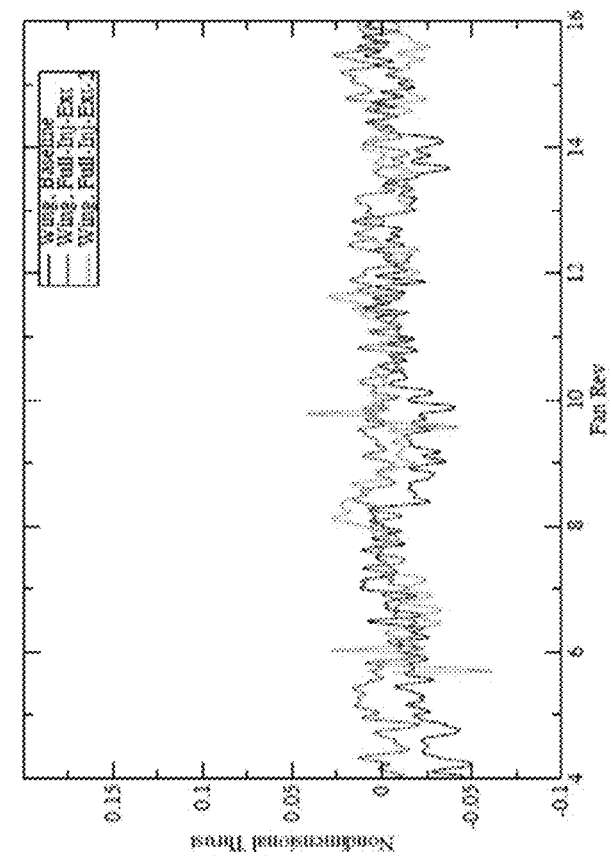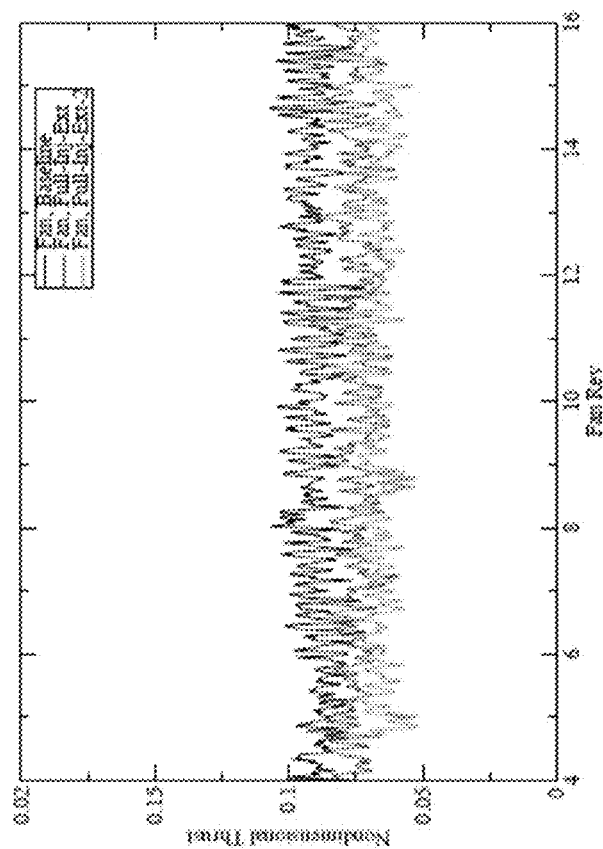
FIG. 38

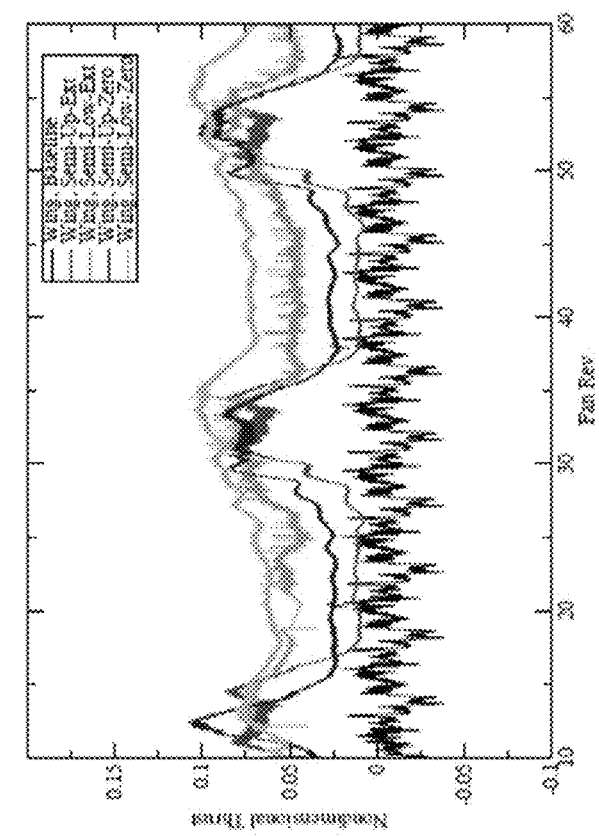
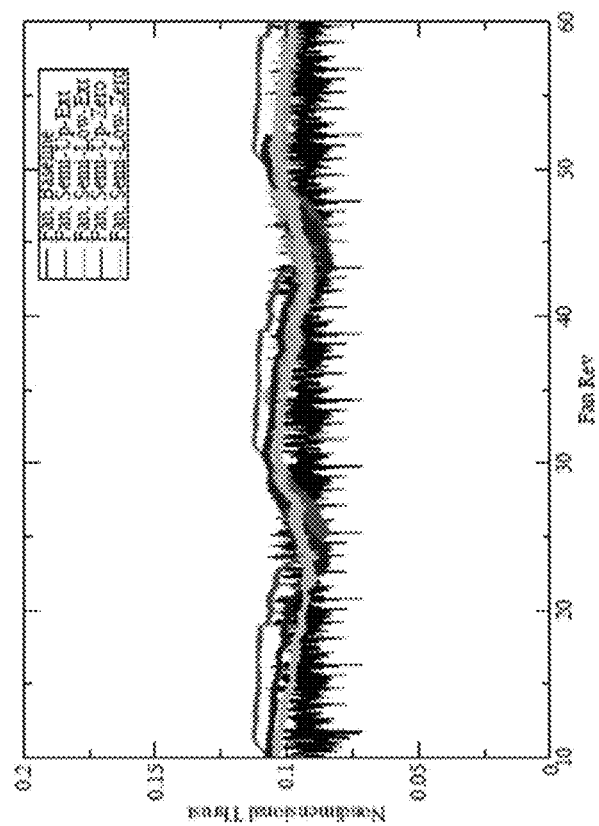
FIG. 40

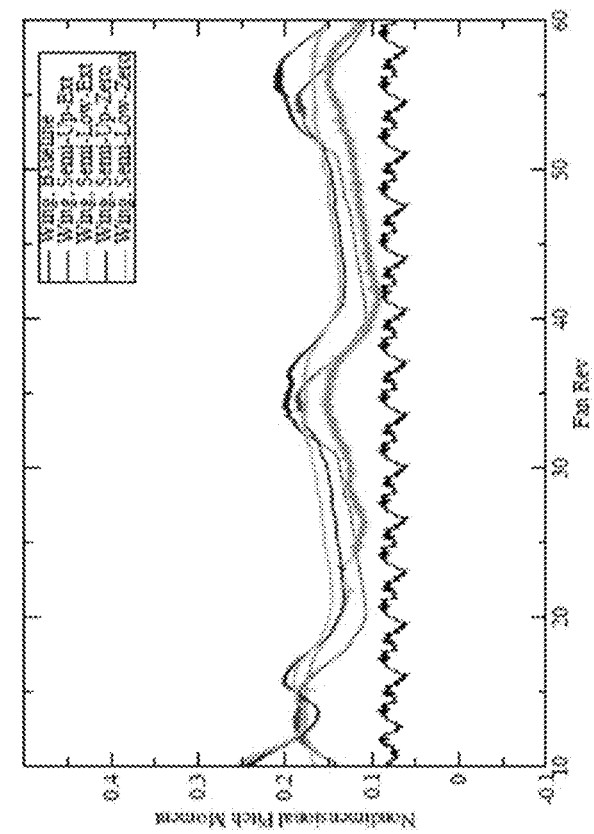
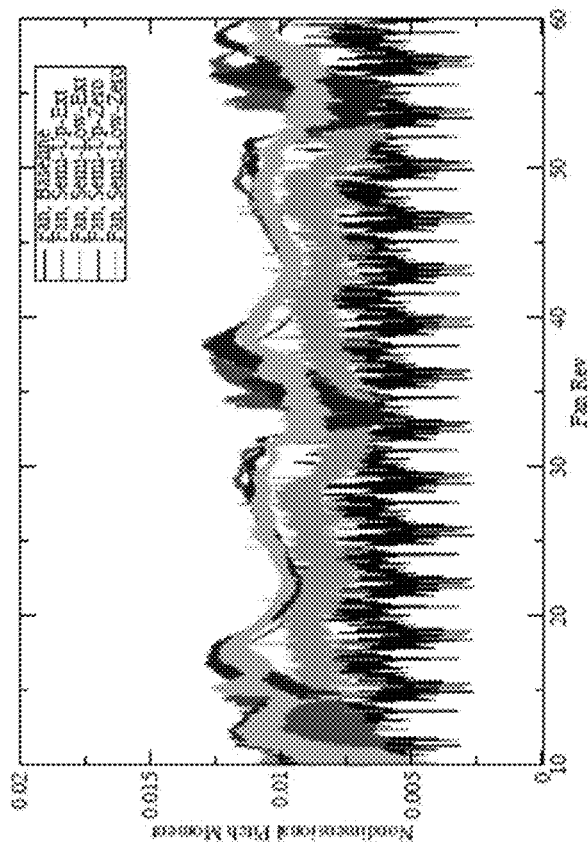
FIG. 41

ACTIVE FLOW CONTROL FOR DUCTED FANS AND FAN-IN-WING CONFIGURATIONS

RELATED APPLICATIONS

This application claims priority to U.S. Provisional Application No. 62/338,212, filed under 35 U.S.C. § 111(b) on May 18, 2016, the disclosure of which is incorporated herein by reference in its entirety.

STATEMENT REGARDING FEDERALLY SPONSORED RESEARCH

This invention was made with government support under Grant Number N000141410263 awarded by the Office of Naval Research. The government has certain rights in this invention.

BACKGROUND OF THE INVENTION

Ducted-fan aircraft are known for their superior stationary aerodynamic hovering performance, three-dimensional precision position hold, low-speed flights, and precision vertical take-off and landing capabilities. In addition, the duct provides protection from contact with the rotating fan blade. As such, ducted-fan aircraft, including unmanned aerial vehicles (UAVs) having ducted fans, are increasingly deployed in battlefield scenarios. Ducted-fan aircraft have the advantages of high-static thrust and propulsion efficiency, while the duct acts to reduce blade noise and improve safety. However, one factor limiting the performance of these blades is boundary layer separation, where the flow detaches from the blade surface, leading to losses in performance and increases in noise and vibrations.

Fan-in-wing (FIW) aircraft, distinct from rotary-wing airplanes and helicopters, use a fixed wing with a forced airflow produced by fans mounted inside the wing. FIW aircraft are desired in the naval community for developing Vertical Take-Off and Landing (VTOL) aircraft to support sea-based aviation operations. Compared to other lift fan devices such as ducted fans or shroud rotors, FIW configurations offer the advantages of vertical takeoff and high speed forward flight, but suffer from the same low hover efficiency as ducted fans due to relatively high disk loading. There are a number of concepts that are under development to overcome these issues for the FIW configurations. One such concept is to use low to medium disk loading fans instead of traditional high disk loading fan designs. Like ducted fans or shroud rotors, the fan blade usually operates more efficiently inside the FIW configuration than in an open fan by avoiding or minimizing the tip loss. In addition, net thrust can be generated on the hovering duct or wing due to the fan suction effect that generates substantially lower pressure on the duct inlet lip region. While the overall performance of these lift fan systems depends on a complex combination of various factors such as geometry, fan pitch angle, fan solidity rotational speed, as well as forward wind speed, etc., there are two inherent aerodynamic issues or limitations that affect the thrust generation, efficiency, and stability control of ducted fans or FIW configurations in various flight conditions. One issue is the flow separation on the duct inner wall after passing the fan blade tip path plane in hover or low speed forward flight. The second issue is the longitudinal momentum drag and nose-up pitching moment due to imbalanced forces generated on the devices when operating in forward flight or crosswind conditions.

A ducted fan VTOL UAV with a 10-inch diameter rotor has been tested in the U.S. Army 7×10-foot wind tunnel. By changing the angle of attack and the wind speed, the effect of the duct leading edge radius on the performance as well as the penalty of the rotor tip clearance was investigated. The results of this investigation indicated that by reducing the duct leading edge radius, the stability of the ducted fan was improved when operating in hover with a crosswind, but the thrust ratio of the ducted fan to the isolated fan was reduced. An increase in the tip clearance would decrease the duct thrust dramatically. An interesting finding for this micro UAV design was that at a low RPM or Reynolds number, the net force contribution from the duct is a download instead of a thrust compared to the isolated rotor. More importantly, the flow along the inner wall of the duct appeared to separate after passing through the rotor tip path plane (TPP) through the hot wire measurement and flow visualization. This observation was also confirmed later in a numerical simulations of two notional ducted fans using a high-fidelity CFD code.

The effect of various duct lip shapes on the performance of ducted fans in hover and forward flight has been further studied, and researchers have found that duct shaping alone could not eliminate all of the adverse aerodynamic characteristics. A common approach for control of, or counteracting, the duct nose-up pitch moment, is the usage of moveable control vanes at or just aft of the duct exit. In cooperation with the primary control vanes, auxiliary devices (spoiler, deflector inside the duct, or LE slat/TE flap) have been added in the experiments. A series of configuration tests have been performed to change the direction of the exit flow momentum in order to produce a more nose-down pitching moment, helping the ducted fan to tilt into the wind in forward flight. According to these tests, the auxiliary control devices may potentially reduce the control vane deflections required for vehicle trim across the complete flight envelope.

A double ducted fan (DDF) concept has also been investigated to control the inlet lip separation at elevated forward flight velocity by modifying the inlet leading edge distorting to improve the flow characteristics of the ducted fan system. DDF uses a secondary stationary duct system to control the inlet lip separation, which causes the momentum deficit at the inlet of the fan during the edgewise forward flight. DDF uses a self-adjusting feature corresponding to the forward flight speed of the ducted fan to maximize the effect of reducing the inlet lip separation. However, certain beneficial effects of DDF have not been quantified.

Synthetic jet flow has been applied to control the flow separation at the duct lip, and the use of a Coandã surface has been applied to turn the flow at the duct trailing edge in order to reduce the magnitude of the nose-up pitching moment in cross-winds. As another example, the concept of applying the flow control asymmetrically to the duct has been proposed in order to produce an imbalance in forces to counterbalance the nose-up pitching moment. The synthetic jet has the advantage of zero net mass flux generated, which eliminates the need for plumbing. Because of the constraints of the scale, weight, and power of ducted fan aircraft or UAV, for example, synthetic Jet Actuators (SJA) have generated research interest due to their potential use in applications where steady blowing flow control may not be feasible.

Similarly, a circulation control method by continuous or steady blowing jets into the duct fan inlet and exit regions to control the flow separation and aerodynamic characteristics has been explored. This resulted in a finding that the most notable improvement in static thrust coefficient was obtained with a sufficient jet momentum added at the duct inlet. However, it was far less effective when the circulation jet was applied at the exit of the duct. The steady jets need to be provided by a pressurized air supply, and the effect of the circulation control jets seemed to be limited.

It would be advantageous to discover systems to significantly improve the efficiency, performance, or safety of ducted-fan or FIW aircraft in various flight conditions, such as hover, forward flight, or transient flight.

SUMMARY OF THE INVENTION

Provided is an active flow control system for a ducted fan or fan-in-wing configuration, where the active flow control system includes a duct, a fan, and at least one suction outlet. The duct has a duct wall defining a duct inlet section and a duct diffuser section. The fan is within the duct and has a center body and a plurality of blades configured to rotate around the center body, where the rotation of the blades at a quarter chord point thereof defines a fan blade tip path plane. The duct inlet section is defined by a first portion of the duct relative to the fan blade tip path plane, and the duct diffuser section is defined by a second portion of the duct relative to the fan blade tip path plane. Each blade has a blade tip with a blade tip leading edge and a blade tip trailing edge, where the length between the blade tip leading edge and the blade tip trailing edge defines a fan blade tip chord length. The at least one suction outlet is in the duct diffuser section and is configured to passively bleed or actively remove air from within the duct. The at least one suction outlet is disposed at a distance from the blade tip path plane approximately equal to the fan blade tip chord length.

In certain embodiments, the active flow control system includes a plurality of suction outlets. In particular embodiments, the active flow control system includes 6 to 8 suction outlets, where the suction outlets are disconnected in circumferential lengths. In certain embodiments, the active flow control system further includes at least one injection inlet in the duct inlet section configured to inject air into the duct. In particular embodiments, the active flow control system includes a plurality of injection inlets. In particular embodiments, the active flow control system includes a plurality of suction outlets and a plurality of injection inlets. In particular embodiments, the injection inlets are configured to provide substantially uniform injection of air into the duct inlet section, and the suction outlets are configured to provide substantially uniform bleeding or suction of air from the duct diffuser section from either a windward side of the duct only or a full annulus of the duct.

In particular embodiments, each of the injection inlets and suction outlets is independently operable to open or close. In particular embodiments, a subset of suction outlets is controlled together. In particular embodiments, a subset of injection inlets is controlled together. In particular embodiments, two or more subsets of suction outlets are controlled independently from one another. In particular embodiments, two or more subsets of injection inlets are controlled independently from one another. In certain embodiments, a subset of a combination of suction outlets and injection inlets is controlled together.

In certain embodiments, the active flow control system further includes a processor configured to control the active flow control system. In certain embodiments, the active flow control system further includes an air data system configured to receive air data from one or more sensors and control the active flow control system based on the received air data.

In certain embodiments, the active flow control system further includes at least one suction exit slot at an edge of the duct, where the suction exit slot is connected to the at least one suction outlet by a mass flow transport apparatus and is configured to direct air removed by the suction outlet out of the duct diffuser section. In particular embodiments, the suction exit slot has a radius ranging from about 2% to about 10% of the radius of the duct. In particular embodiments, the suction exit slot has a radius equal to about 5% of the radius of the duct.

In certain embodiments, the suction outlet has a radius ranging from about 1% to about 5% of the radius of the duct. In certain embodiments, the suction outlet has a radius equal to about 2.5% of the radius of the duct.

In certain embodiments, the active flow control system further includes at least one suction exit slot in the duct diffuser section, and the radius of the suction exit slot is about twice the radius of the suction outlet.

In certain embodiments, the active flow control system further includes a supply of pressurized air capable of generating a suction speed at the suction outlets approximately equal to the fan blade tip speed.

Also provided is an aircraft having the active flow control system described above. In certain embodiments, the aircraft further includes a power supply for air injection and suction. In certain embodiments, the aircraft further includes a piping system configured to provide air supply for the air injection and suction, and/or to deliver removed air flow mass to a desired location.

Further provided is a ducted fan or a fan-in-wing comprising a fan inside a duct, and a plurality of suction outlets. The fan has blades that are rotatable around a center body to create air flow in a duct diffuser section in the duct. A distance from a leading edge of a blade to a trailing edge of the blade blades defines a blade tip chord length. The outlets are configured to vent air from the duct diffuser section (i.e., underneath the fan blades relative to the incoming air), where each outlet is disposed in the duct diffuser section at a distance from the blades approximately equal to the blade tip chord length. Also provided is an aircraft that includes the ducted fan or fan-in-wing.

Further provided is an active flow control system that includes a power source, a ducted fan or fan-in-wing, and one or more suction outlets. The ducted fan or fan-in-wing has a fan within a duct, where the fan is powered by the power source, and the fan is configured to create air flow through the duct out of a duct diffuser section by rotation of a plurality of blades. The one or more suction outlets are disposed in the duct diffuser section and configured to bleed or actively remove air flow from within the duct, where the outlets are located at a position beneath the blades at a distance from a plane defined by the rotation of the plurality of blades at a quarter chord point approximately equal to a distance between a leading edge of a blade tip of one of the blades and a trailing edge of the blade tip. In certain embodiments, the power source is a gas turbine engine or an electric motor. In certain embodiments, the airflow provides thrust and lift for an aircraft. In particular embodiments, the aircraft includes a plurality of suction outlets, where each suction outlet is independently operable to open or close. In particular embodiments, the aircraft further includes one or more injection inlets in the duct configured to inject air into the duct. In particular embodiments, the aircraft further includes a piping system configured to remove air flow mass to a desired location.

Further provided is a method of conducting active flow control in a ducted fan or fan-in-wing aircraft having a fan within a duct defining a duct wall, where the method involves passively bleeding or actively removing air from a position relative to a blade tip of a rotatable blade of the fan, where the position is in a diffuser section of the duct under a plane defined by rotation of the blade at a quarter chord point of the blade tip and disposed at a distance from the plane approximately equal to a distance between a leading edge of the blade tip and a trailing edge of the blade tip.

In certain embodiments, the bleeding or removing, and, optionally, injecting of air is controlled automatically by a computer system. In certain embodiments, the bleeding or removing is conducted at a suction speed approximately equal to a speed of the fan blades. In certain embodiments, the method involves semi-annulus air extraction, where the air is passively bled or actively removed from a windward side of the duct only, under the fan blades. In certain embodiments, the method involves full-annulus air extraction, where the air is passively bled or actively removed from a full annulus of the duct, under the fan blades. In certain embodiments, the method involves zero-net mass flow, where the bled or removed air is directed to an exit of the duct semi-annulusly or full-annulusly.

In certain embodiments, the method involves a combination of semi-annulus air extraction with zero-net mass flow and full-annulus air extraction with zero-net mass flow, where, in forward flight, the air is passively bled or actively removed semi-annulusly from a windward side of the duct only, under the fan blades, and is directed to an exit of the duct, and, in hover, the air is passively bled or actively removed in a full annulus of the duct, under the fan blades, and is directed to an exit of the duct.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the U.S. Patent and Trademark Office upon request and payment of the necessary fees.

FIG. 5A shows a lift fan without suction exit slots, and FIGS. 5B-5C show lift fans with suction exit slots. FIG. 5C shows a cross-sectional view of a fan-in-wing configuration.

FIG. 7A shows an open fan, and FIG. 7B shows a fan-in-wing.

FIG. 11C shows the option of suction exit slots at the duct exit.

FIG. 18A shows no flow control, FIG. 18B shows normal injection, FIG. 18C shows tangential injection, FIG. 18D shows suction only, and FIGS. 18E-18F show air suction with the mass flow directed back to the system at the duct exit (also called zero-net mass flow option, with views from the top and bottom, respectively).

FIG. 28: Table 4, displaying six active flow control schemes.

FIG. 38: Convergence histories of non-dimensional thrust of fan (left) and wing (right) using full-annulus active flow control, θ=38 deg.

FIG. 40: Convergence histories of non-dimensional thrust of fan (left) and wing (right) using semi-annulus active flow control, θ=38 deg.

FIG. 41: Convergence histories of non-dimensional pitching moment of fan (left) and wing (right) using semi-annulus active flow control, at θ=38 deg.

DETAILED DESCRIPTION OF THE INVENTION

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

For convenience, certain terms are defined prior to further description of the present disclosure.

The term "windward" means facing the wind, on the side facing the wind, or the direction from which the wind is blowing. The term "leeward" means on or toward the side sheltered from the wind, or toward which the wind is blowing.

The symbol "c" refers to blade chord or blade tip chord length. The term "$C_P$" refers to power coefficient ($Q/\pi\rho\Omega^2 R^5$). The term "$C_T$" refers to thrust coefficient ($T/\pi\pi\rho\Omega^2 R^4$). The term "DL" refers to disk loading ($T/\pi R$). The symbol "e" refers to root cut-off. The term "FM" refers to Figure of Merit ($C_T^{3/2}/C_P\sqrt{2}$). The term "$M_{duct}$" refers to duct mass flow rate. The term "$M_i$" refers to injection mass flow rate. The term "$M_s$" refers to suction mass flow rate. The symbol "n" refers to number of blades. The term "P" refers to power. The term "PL" refers to power loading (T/P). The term "$P_{atm}$" refers to ambient pressure. The term "$P_i$" refers to injection pressure. The term "$P_s$" refers to suction pressure. The term "Q" refers to torque. The term "R" refers to blade radius. The term "T" refers to thrust. The term "$V_{tip}$" refers to fan tip speed. The term "$V_i$" refers to injection speed. The term "$V_s$" refers to suction speed. The term "W" refers to downward velocity. The term "ρ" refers to density. The term "σ" refers to fan blade solidity. The term "Ω" refers to fan rotational speed.

For ease of reference throughout this disclosure, the term "lift fan" may be used when actually referring to either a ducted fan or a fan-in-wing. The skilled person will recognize that the systems and methods described herein are applicable to both ducted fans and fan-in-wing configurations.

The terms "above" and "below" are sometimes used herein to refer to a position relative to another element, such as above or below the fan blades 118. It is understood that these terms are used merely for convenience, and do not strictly mean literally above or literally below. Rather, "above the fan blades 118" generally refers to an area in the duct inlet section 116, except when referring to the inlet lip 152, and "below the fan blades 118" generally refers to an area in the duct diffuser section 120.

General Description

Figure 1:
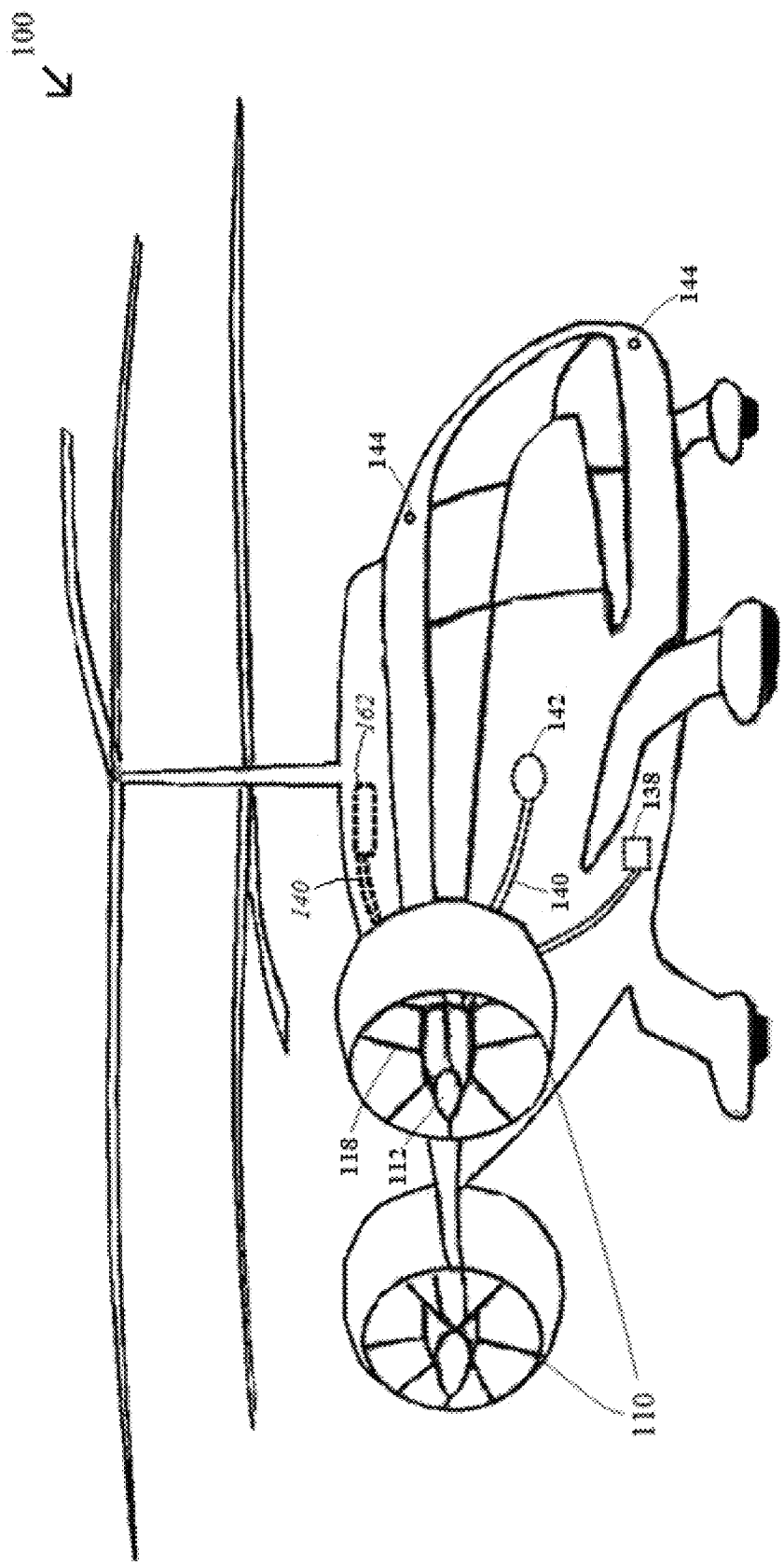
FIG. 1: Non-limiting illustration of a ducted-fan aircraft with an active flow control system.

Provided is an active flow control system and related methods for a ducted fan or fan-in-wing configuration, such as the ducted fan aircraft 100 depicted in FIG. 1. The active flow control system is based on steady air suction, as well as optional steady air injection, in the lift fan devices. Known active flow control systems blow air into the duct. That is, active air injection is known in the art. However, the presently described system clears air out by passive bleeding or active suction. Thus, the active flow control system described herein can involve a combination of air injection and air suction.

The active flow control system utilizes air suction/bleeding inside the ducted fan or fan-in-wing systems, in addition to the air injection/blowing that is known in the art. Unlike other flow control methods, which use air blowing at both inlet and exit of the ducted fan, the systems and methods described herein utilize air suction applied at a specific distance underneath the fan blade tip path plane (TPP) to effectively remove the low momentum reserve flow and increase the flow circulation through the ducted fan and FIW systems. Numerical tests show that the active flow control system of the present disclosure can significantly increase the maximum system thrust without suffering the peak efficiency loss for the FIW configuration in hover, and provide significant improvement of the system thrust and propulsive efficiency for the FIW device in forward flight.

The active flow control system involves one or more suction outlets disposed in a particular area beneath the fan blades within the duct, configured to passively vent or actively remove air from within the duct. The outlets are each independently operable to passively vent or actively remove air from within the duct. When actively removing air, varying levels of suction are possible. The system uses optional air injection (active) in the duct inlet section, in combination with air bleeding (passive) or suction (active) in the duct diffuser section, to modify the aerodynamic flow field within the fan-in-wing or ducted fan systems. In certain situations, air bleeding is insufficient, and therefore air suction is utilized. The air injection is applied at the duct inlet section before reaching the fan blades, and the air suction or bleeding is applied at the diffuser section of the duct underneath the fan blades. The air injection and air suction or bleeding may be implemented independently or coordinately within the system. The term "active" means that the air injection and/or suction are activated in situations when extra system thrusts are needed, but are turned off in normal operating conditions such as near the peak (design) efficiency point. The amount of mass flow injected to, or extracted from, the injection/suction slots can be controlled by pressure valves in the hardware instrumentation for the FIW or ducted fan systems.

The active flow control schemes may be non-zero mass flow approaches, zero-net mass flow approaches, or combinations thereof. In a zero-net mass flow active flow control scheme, fluids are extracted from the duct inner surface and directed to the exit of the duct passage to form a zero-net mass flow. In a non-zero mass flow active flow control scheme, the fluids are injected into the inlet section before the fan or extracted from the diffuser section after the fan on the duct surface. Zero-net mass flow methods redirect the fluid extracted from the duct surface to the exit of the duct passage, which avoids the need of distributing the fluid being extracted from the FIW system. Computations indicate that a significant improvement of the system thrust of up to 55% are possible using zero-net mass flow active flow control.

The active flow control system herein may use a combination of flow control strategies which optimize performance. For example, in hover, the system may optimally utilize a full-annulus air extraction zero-net mass flow, while in forward flight, the system may optimally utilize a semi-annulus air extraction with zero-net mass flow. These two optimal active flow control strategies may be combined together in a single system, controlled by a suitable processor, to provide efficient control for a FIW or ducted fan in both hover and forward flight, which are the two typical flight conditions for a helicopter or similar aircraft. These methods of flow control are further described and demonstrated in the examples herein.

Figure 4:
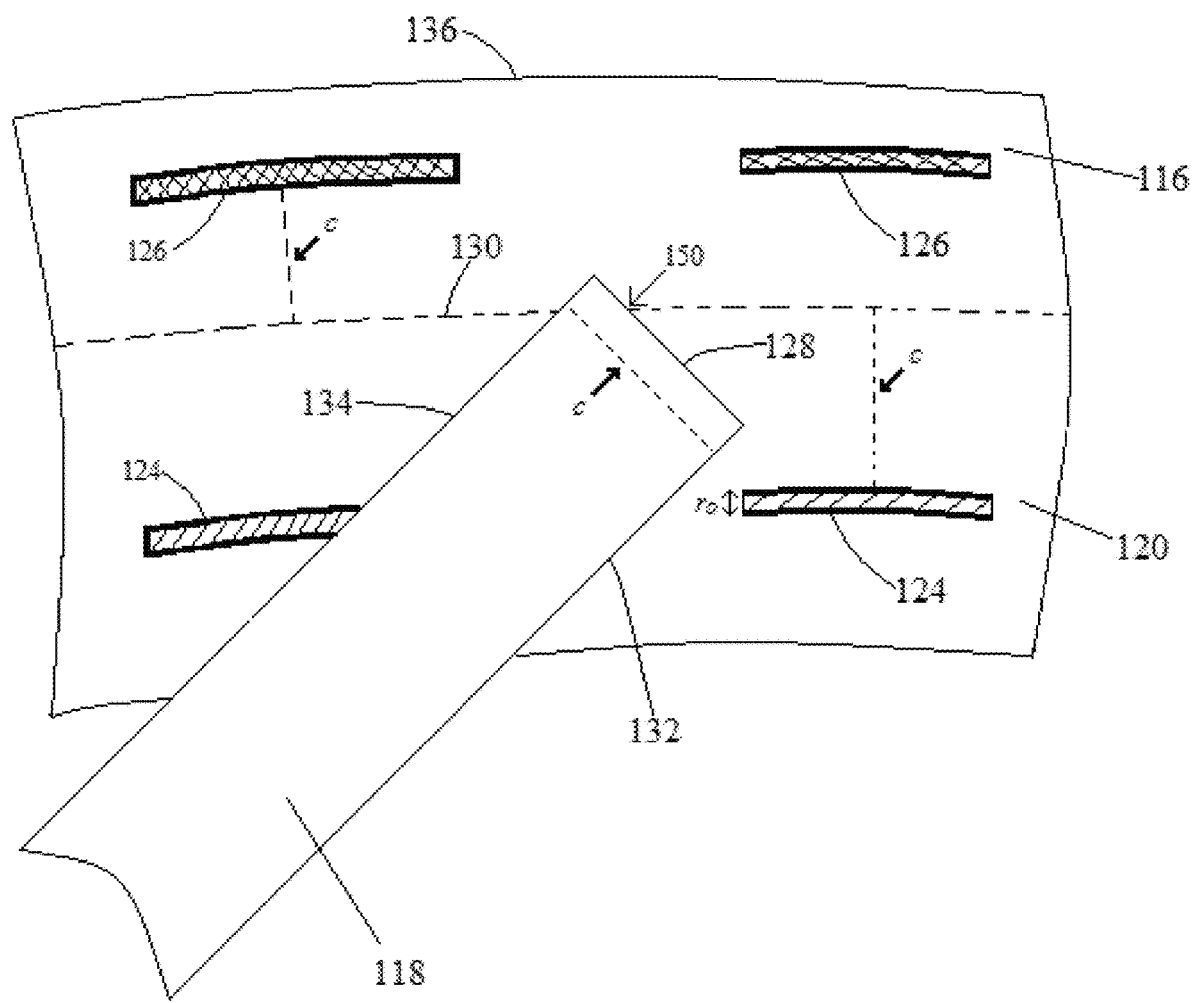
FIG. 4: Diagram of a fan blade and a duct wall, illustrating the position of the suction outlets beneath the fan blade tip path plane. The fan blade tip chord length is denoted c.
Figure 21:
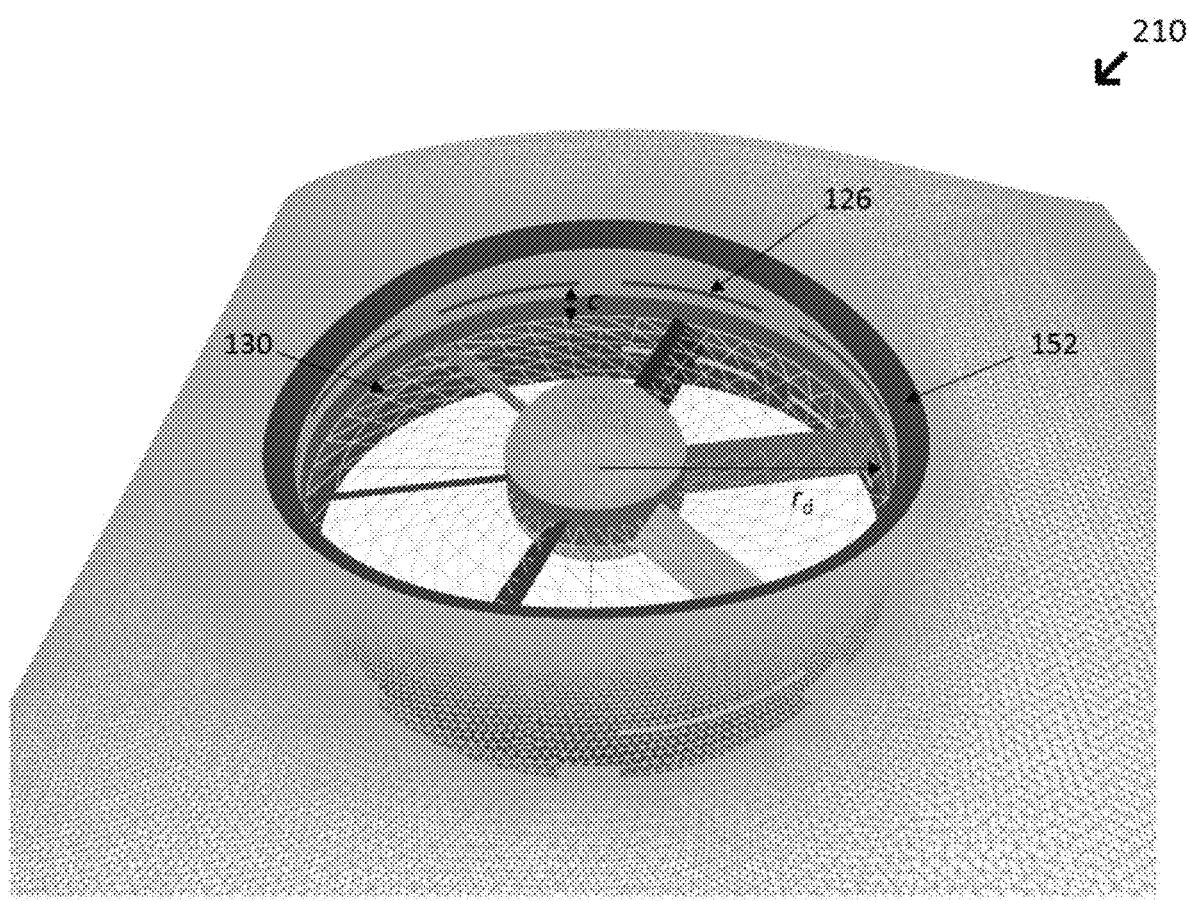
FIG. 21: Color illustration of a non-limiting example of a FIW configuration showing injection slots. The view is from the top of the FIW configuration. The wing is shown as partially transparent for illustration purposes.
Figure 22:
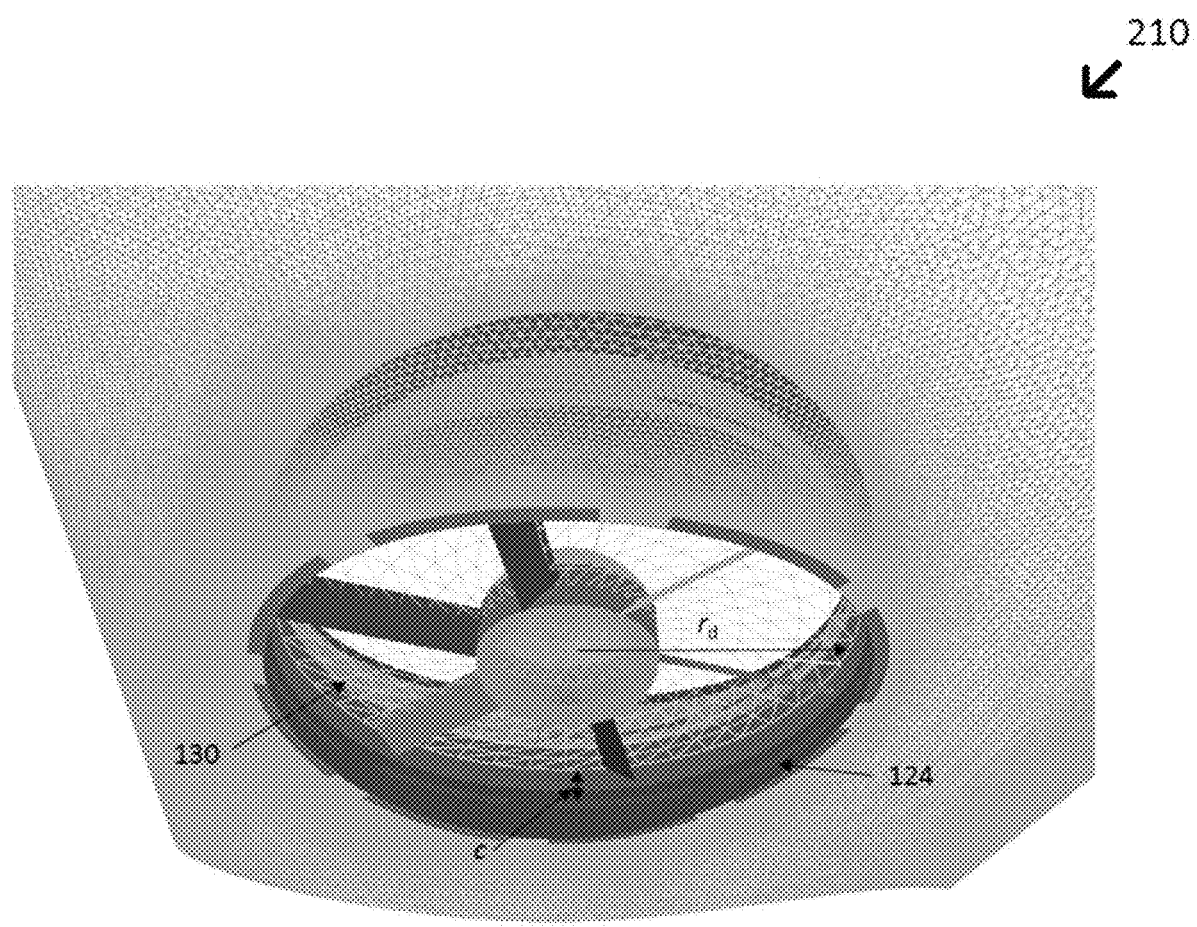
FIG. 22: Color illustration of a non-limiting example of a FIW configuration showing suction slots. The view is from the bottom of the FIW configuration. The wing is shown as partially transparent for illustration purposes.
Figure 23:
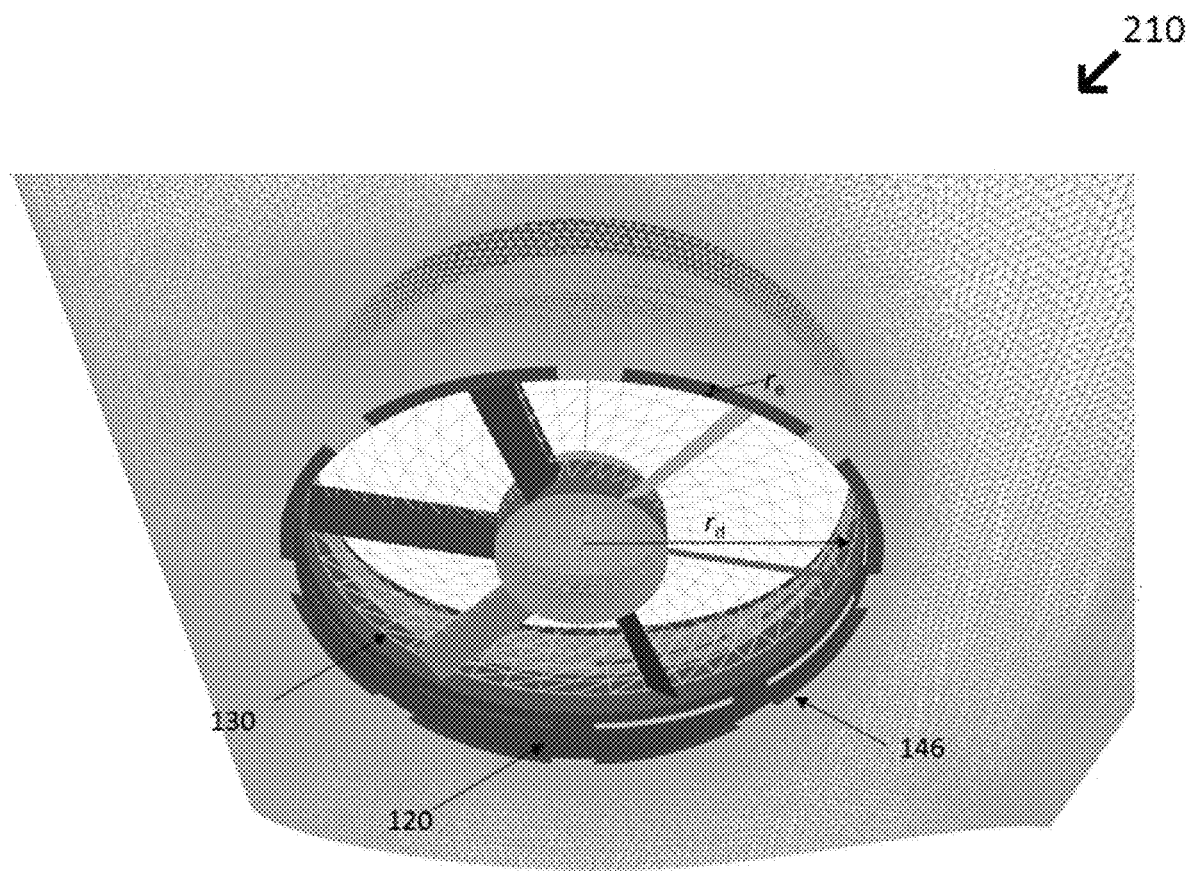
FIG. 23: Color illustration of a non-limiting example of a FIW configuration showing suction exit slots. The view is from the bottom of the FIW configuration. The wing is shown as partially transparent for illustration purposes.

Referring now to FIGS. 2, 4-6, and 21-27, a lift fan 110 utilizing the active flow control system generally includes a fan 112 within a duct 114, a duct inlet section 116 above the fan blades 118, a duct inlet lip 152 above the duct inlet section 116 relative to the fan blades 118, and a duct diffuser section 120 beneath the fan blades 118. The fan 112 includes a plurality of fan blades 118 rotatable around a center body 122. The duct wall 136 defines a perimeter such that the duct 114 surrounds the fan 112 and center body 122, which may optionally contain an engine for powering the fan 112, or additional components for fan operation, such as a processor and/or an avionics system. Upon rotation, the blades 118 pass in close proximity to the duct wall 136. The rotation of the blades 118 defines a fan blade tip path plane (TPP) 130 that separates the duct inlet section 116 from the duct diffuser section 120, as best illustrated in FIG. 4. Due to the bending of the blades 118, the TPP 130 is formed at a height on the duct wall 136 wherein the quarter chord point 150 of the blades 118 rotates. The TPP 130 is an imaginery line encircling the duct wall 136 along the path where the quarter chord point 150 of the blades 118 passes in proximity around the duct wall 136, and forming a plane across the duct 114 at the height of the rotational path of the quarter chord point 150. Thus, the rotation of the quarter chord point 150 defines the TPP 130 through the duct 114. The TPP 130 is best illustrated in FIGS. 21-23, where the TPP 130 is depicted by a green mesh, as well as in FIG. 4.

Figure 3:
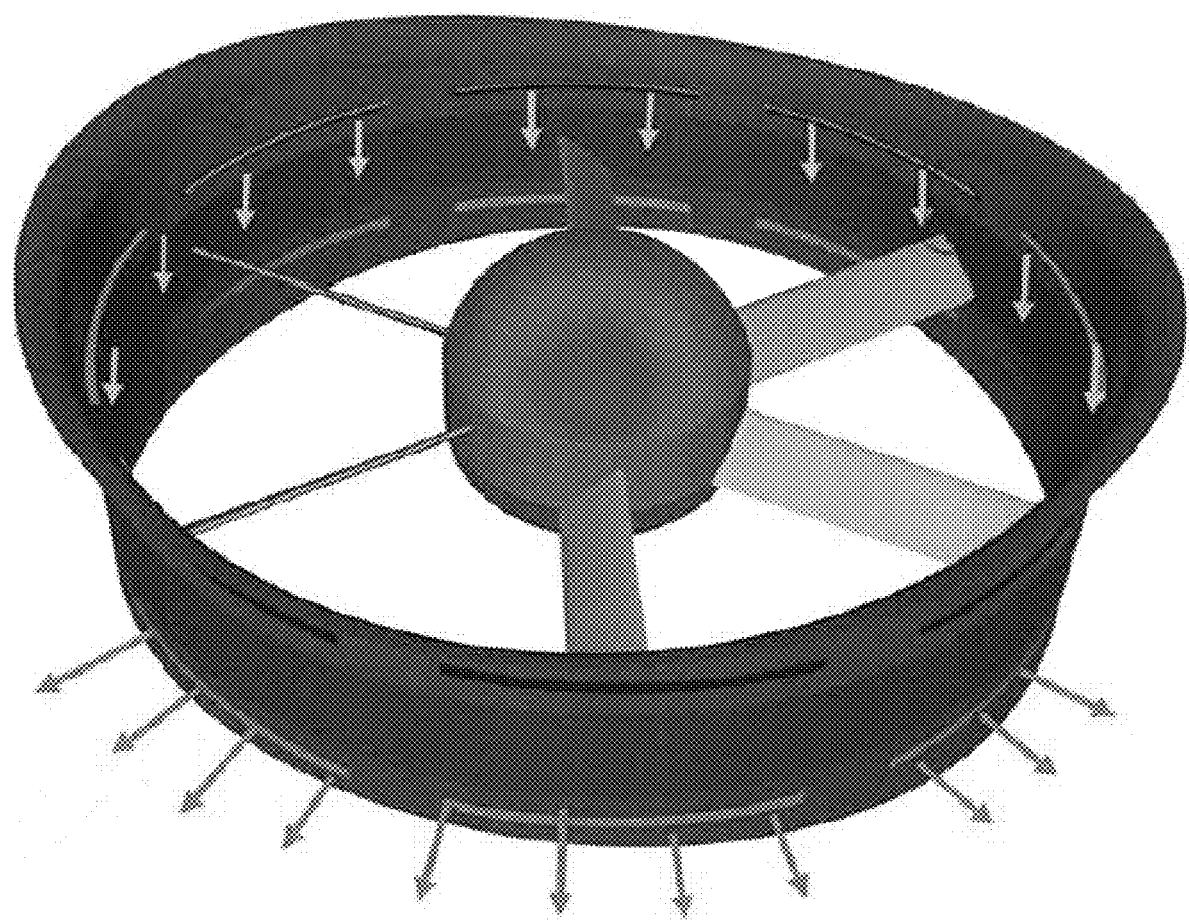
FIG. 3: Color illustration of a lift fan utilizing active flow control, where the yellow arrows depict air injection, and the orange arrows depict air bleeding/suction.

One or more suction outlets (also referred to as suction slots) 124 are disposed beneath the fan blades 118 in the duct diffuser section 120. Optionally, one or more injection inlets 126 are disposed above the fan blades 118 in the duct inlet section 116. In some embodiments, the lift fan 110 includes a plurality of suction outlets 124 and a plurality of injection inlets 126. The suction outlets 124 are configured to bleed or remove air from within the duct 114, as depicted by orange arrows in FIG. 3. In some circumstances, bleeding air is insufficient for optimal results, and active suction is preferred. The injection inlets 126 are configured to inject air into the duct 114, as depicted by yellow arrows in FIG. 3. The injection of air can be parallel, normal, or tangential to the duct wall 136.

Figure 19A:
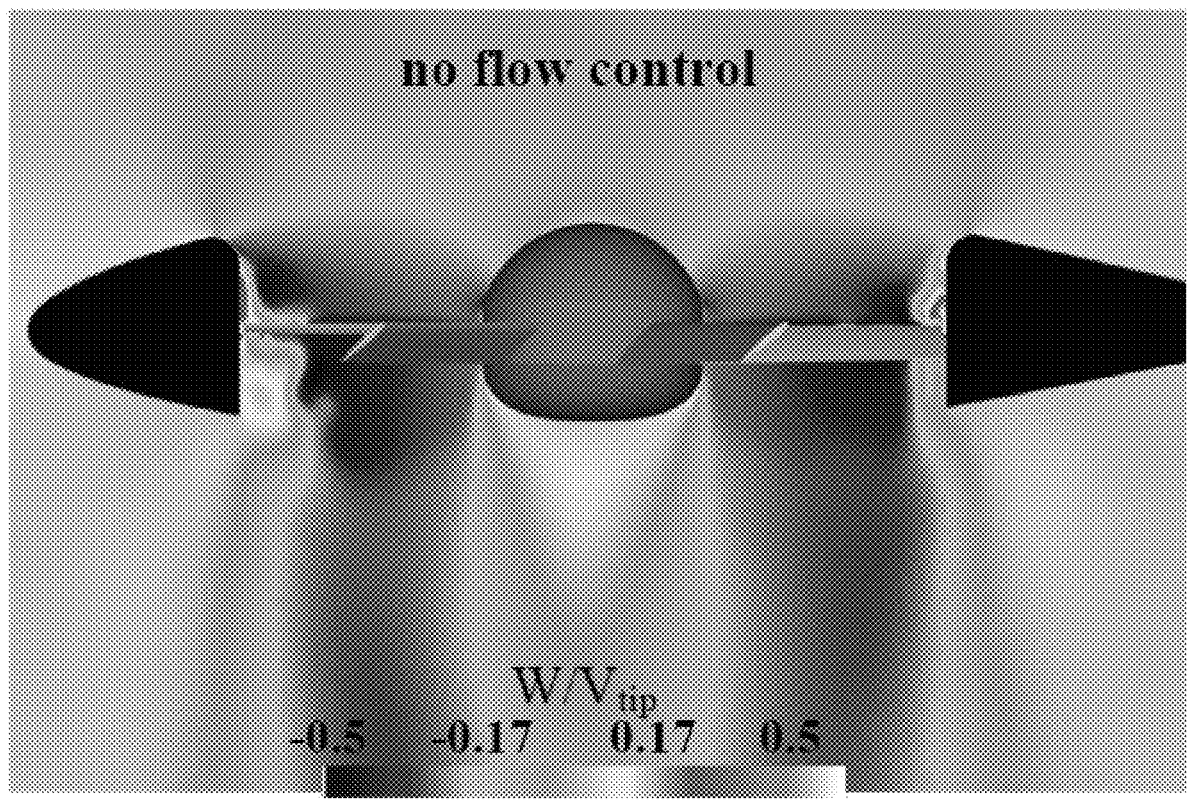
FIGS. 19A-19B: Velocities on central cutting plane at 38° blade pitch, 3700 RPM, with no flow control (FIG. 19A) and with active flow control (FIG. 19B). Active flow control greatly improves the velocity field of the duct.

The location of the air removal through the suction outlets 124 is important. It has been found that the air suction outlets 124 should be underneath the fan 112 at a distance along the duct wall 136 roughly equal to the blade tip chord length c. The term "chord" refers to an imaginary straight line joining the leading and trailing edges of an airfoil. Thus, the term "blade tip chord length" refers to the distance between the leading and trailing edges of the blade tip 128 (respectively, the blade tip leading edge 132 and the blade tip trailing edge 134). FIG. 4 illustrates the positioning of the suction outlets 124, at a distance along the duct wall 136 beneath the TPP 130 approximately equal to the blade tip chord length c. This position is where the diffuser flow separation is most severe, as seen in FIG. 19A. FIG. 4 depicts the injection inlets 126 also disposed at approximately the blade tip chord length c away from the TPP 130, though it is understood that this exact positioning is optional and the injection inlets 126 can be disposed in any suitable location above the fan blades 118 (i.e., in the duct inlet section 116), preferably so as to provide substantially uniform air injection into the fan blades 118.

As described above, the vertical orientation of the suction slots 124 relative to the TPP 130 is carefully chosen to be roughly the same length as the blade tip chord length c. For example, if the blade tip chord is 2 inches long, then the suction slots should be disposed at a location along the duct wall 136 approximately equal to about 2 inches beneath the TPP 130. It is understood that by "approximately equal," it is meant that the suction outlets 124 should be located at a distance from the TPP 130 that is at least within a 10% margin of the blade tip chord length c away from the TPP 130. For example, for a 2-inch blade tip chord length, the suction outlets 124 should ideally be disposed 2 inches away from the TPP 130, but may be disposed at a distance away from the TPP 130 ranging from about 1.8 inches to about 2.2 inches. Though 2 inches is given as a non-limiting example of a blade tip chord length c, this length can vary greatly depending on the design. It is understood that positioning of the suction outlets 124 at a greater or lesser distance away from the fan blades 118 results in non-optimal performance, but is nonetheless encompassed by the present disclosure. For example, if the suction outlets 124 are too close to the duct exit 164, the active flow control system may not work well to improve performance.

The number, shape, and size of the suction outlets 124 can vary widely and be customized for a wide diversity of configurations, provided that the outlets are at a distance underneath the fan approximately equal to the blade tip chord length c. Though for some embodiments it is preferred that the suction outlets 124 provide uniform air removal or suction around the duct 114, it is understood that uniform removal or suction of air is not strictly necessary. The suction outlets 124 generally have a radius $r_o$ ranging from about 1% to about 5% of the radius $r_d$ of the duct 114. In one non-limiting example, the suction outlets 124 have a radius $r_o$ of about 2.5% of the radius $r_d$ of the duct 114 (where the radius $r_d$ of the duct 114 is the distance from the center of the center body 122 to the duct wall 136). Similarly, the number, shape, and size of the injection inlets 126 can vary widely and be customized for a wide diversity of configurations. For example, the suction outlets 124 and/or the injection inlets 126 can each independently be vertical slits, horizontal slits, circular openings, geometric shapes such as triangles, or combinations thereof. The number of outlets 124 and inlets 126 is merely an optimization based on the particular design. In some embodiments, the air suction and air injection are each designed to be uniform around the duct 114.

Figure 2:
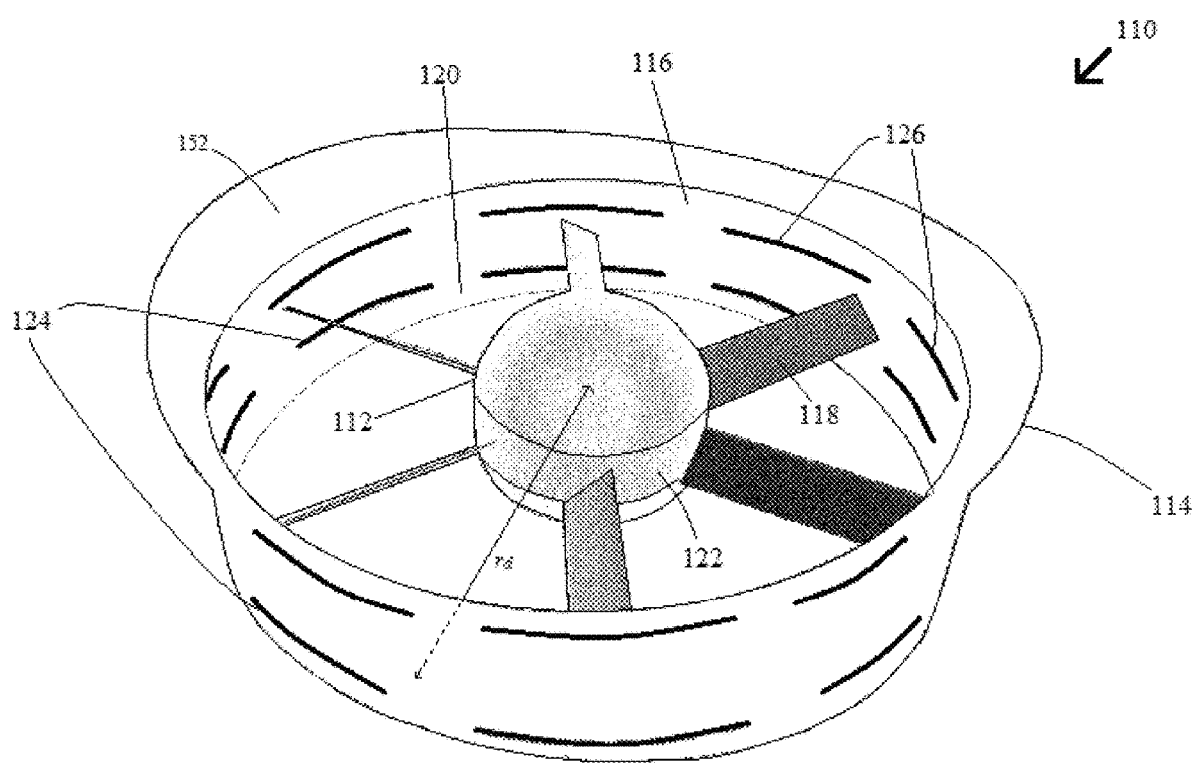
FIG. 2: Non-limiting example of an embodiment of a lift fan with an active flow control system.
Figure 5A:
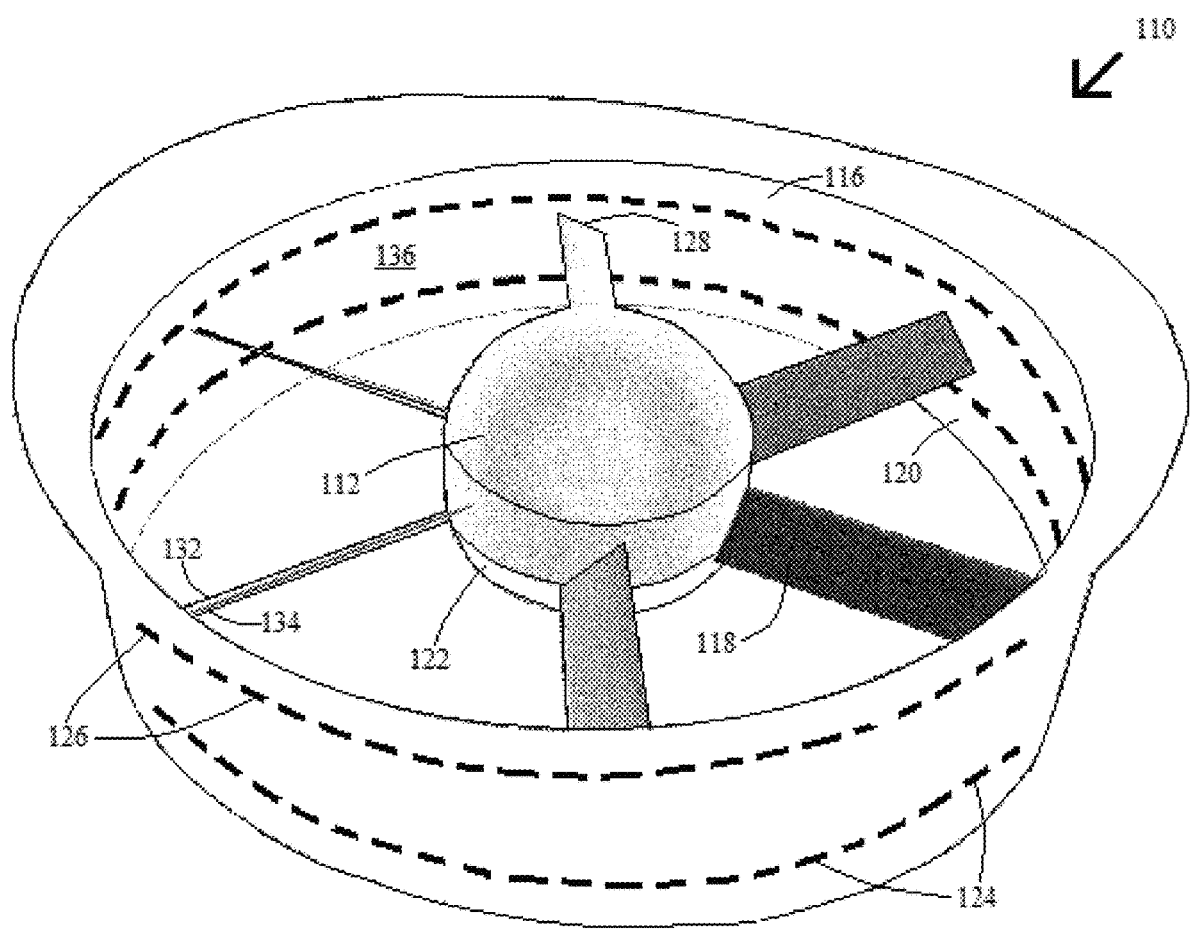
FIGS. 5A-5C: Non-limiting examples of alternative embodiments of lift fans with an active flow control system.
Figure 5B:
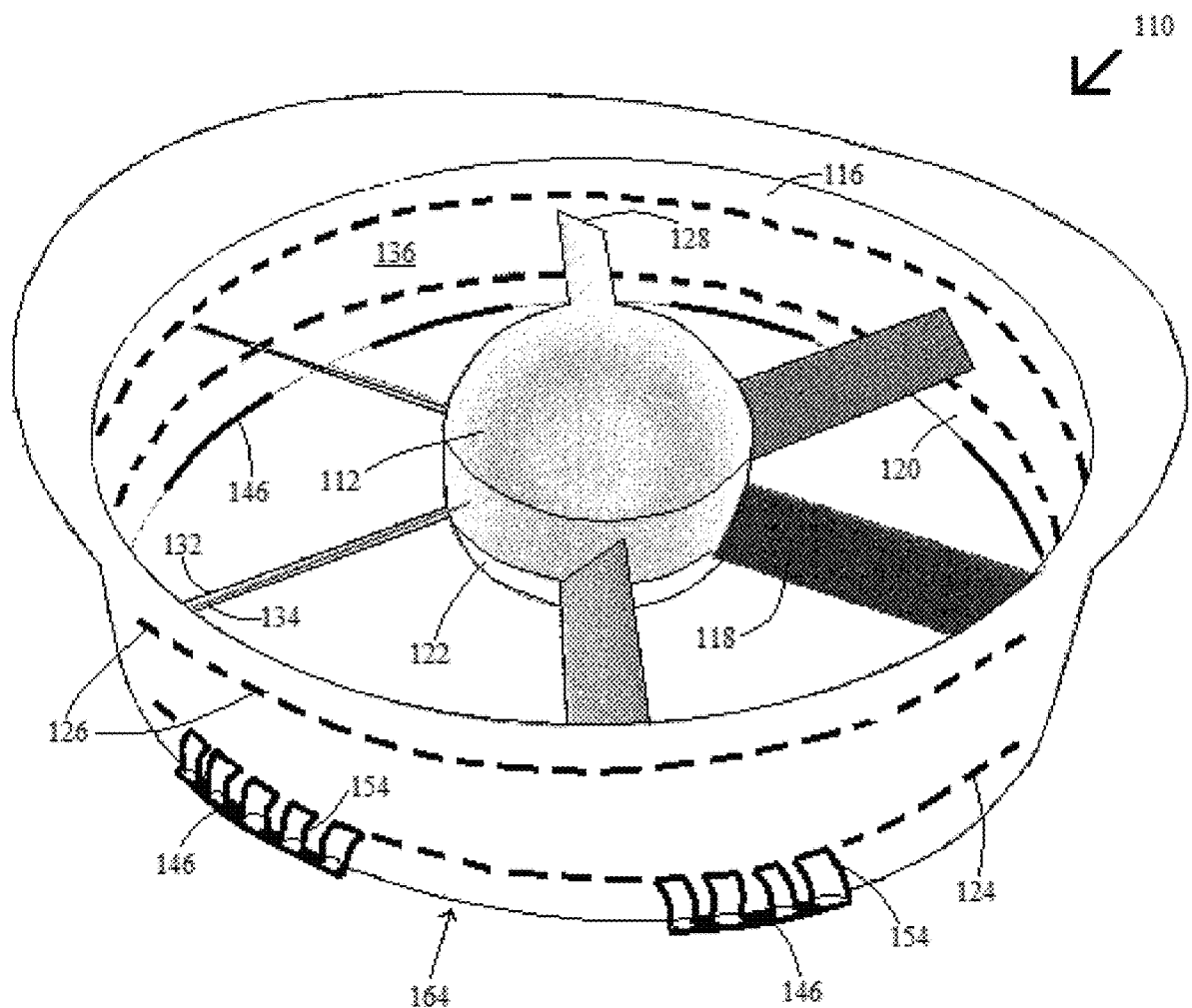
Figure 6:
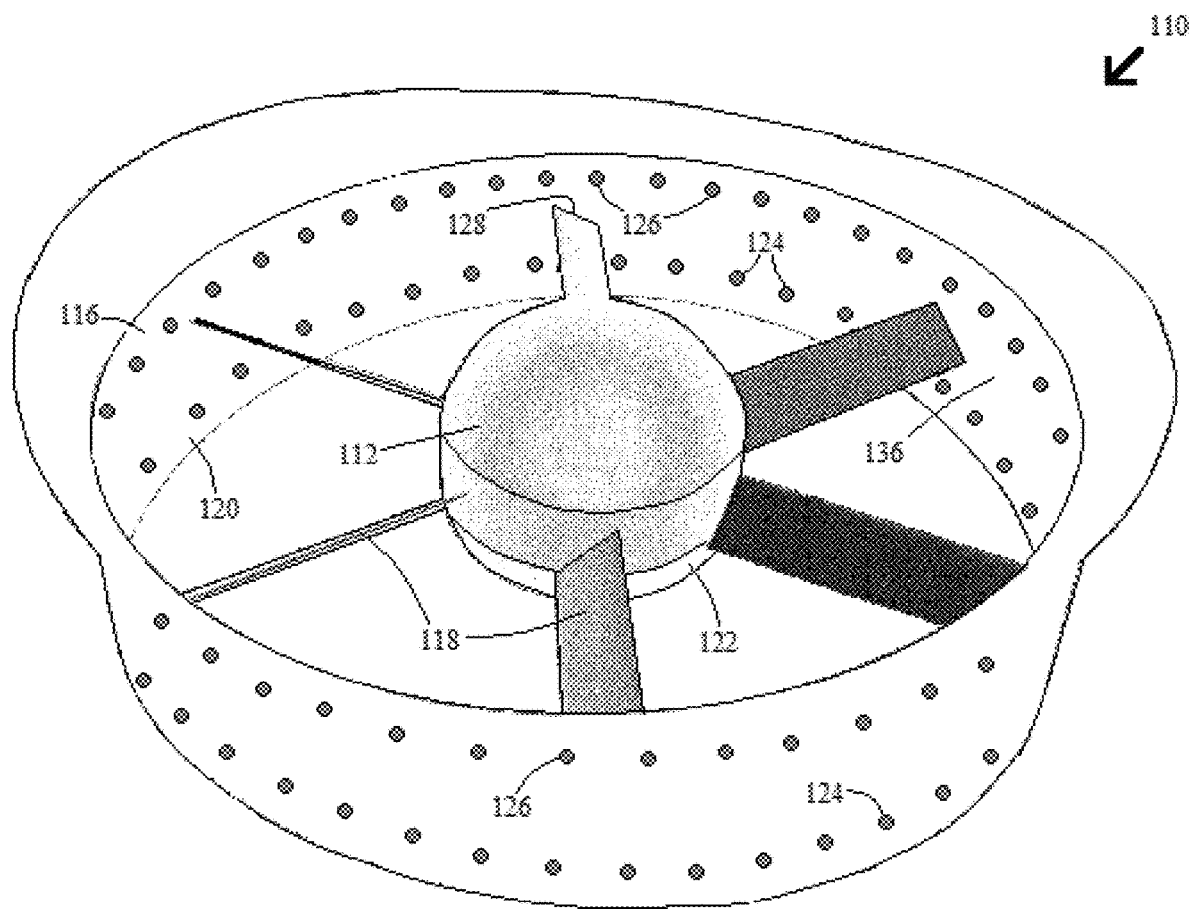
FIG. 6: Non-limiting example of an alternative embodiment of a lift fan with an active flow control system.

As a non-limiting example, FIG. 5A illustrates an embodiment where a lift fan 110 includes a high number of smaller suction outlets 124, as compared to the embodiment depicted in FIG. 2, where there are a small number of larger suction outlets 124. Though FIGS. 5A-5B show shorter suction slots 124, it is believed that longer slots are more aerodynamically efficient and easier for manufacturing than shorter slots. In some embodiments, such as depicted in FIG. 2, the active flow control system includes 6-8 suction outlets 124 that are disconnected circumferential lengths. As another non-limiting example, FIG. 6 illustrates an embodiment where both the injection inlets 126 and the suction outlets 124 are circular openings. It is understood that circular injection inlets 126 and circular suction outlets 124 may not be the most energy-efficient configuration, but are illustrated for the purpose of showing that a wide variety of shapes and sizes of injection inlets 126 and suction outlets 124 is encompassed within the present disclosure.

Figure 5C:
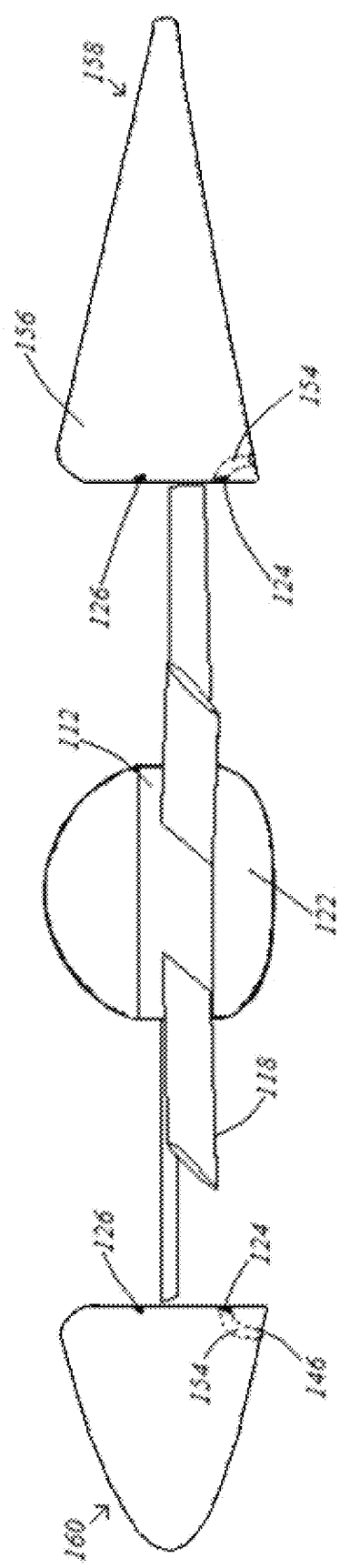
Figure 24:
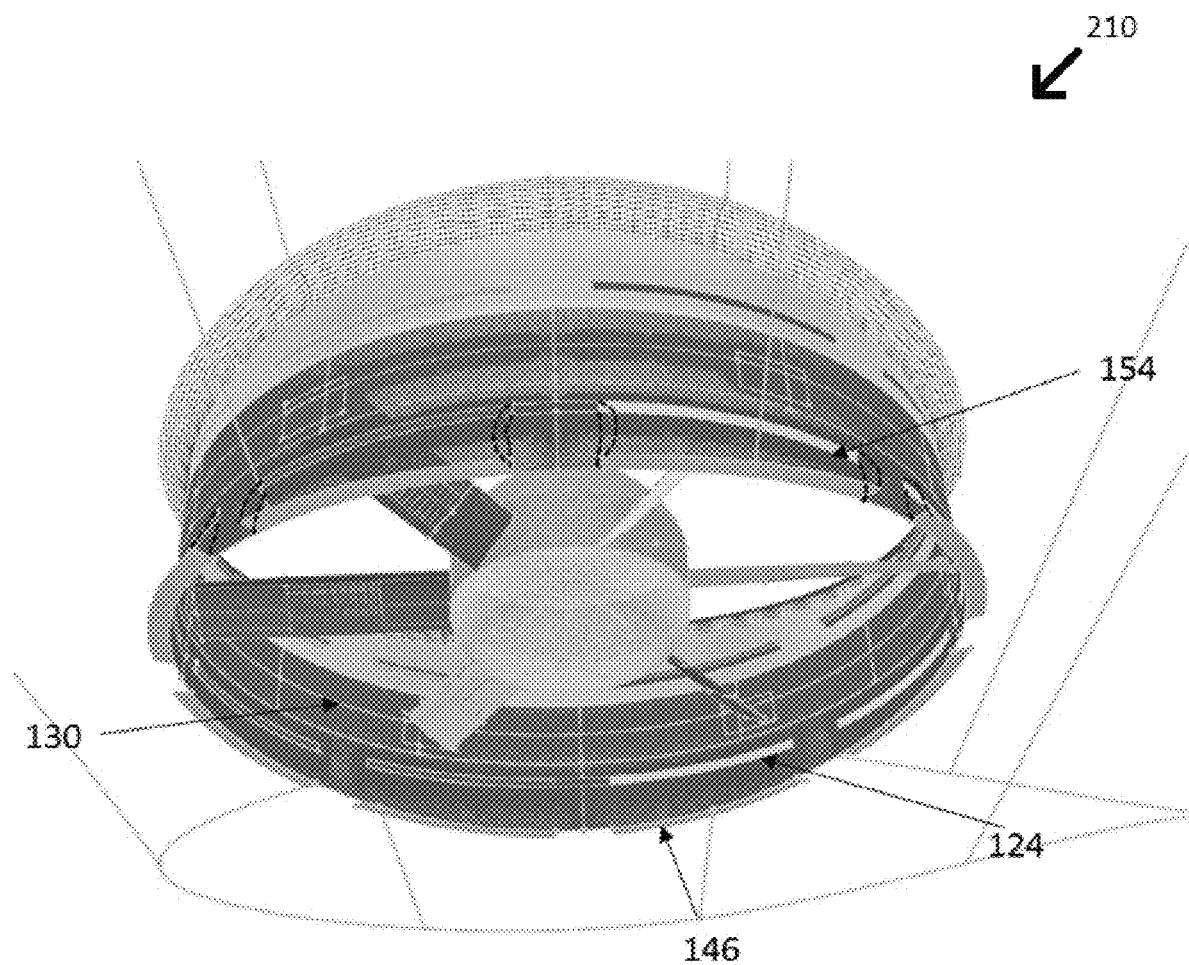
FIG. 24: Color illustration of a non-limiting example of a FIW configuration showing suction exit slots in the form of internal compartments in the duct.

Optionally, a lift fan 110 can further include one or more suction exit slots 146 in the duct diffuser section 120. The suction exit slots 146 allow for the mass flow removed by the suction outlets 124 to be exited at the duct exit 164, which for a ducted fan is also the trailing edge 148 of the duct 114. When suction exit slots 146 are utilized, mass flow can be carried via a mass flow transport apparatus 154 from the suction outlets 124 to the suction exit slots 146. As seen in FIG. 24, the mass flow transport apparatus 154 can be in the form of internal compartments in the duct 114 that connect the suction outlets 124 to the suction exit slots 146. Alternatively, as depicted in FIG. 5B, the mass flow transport apparatus 154 can be pipes external to the duct 114 that connect one or more suction outlets 124 to one or more suction exit slots 146. As depicted in FIG. 5C, the suction exit slots 146 and mass flow transport apparatus 154 can direct extracted mass flow to the exit 164 of the duct 114, which, in ducted fans, is also at the trailing edge 148 of the duct 114. As shown in the Examples herein, the option of redirecting the suction mass flow back into the duct exit 164 shows the best combination of the active flow control system for improving both the FM and the system thrust.

In some embodiments, the suction exit slots 146 have a radius $r_e$ that is about twice the radius $r_o$ of the suction outlets 124. Thus, the suction exit slots 140 generally have a radius $r_e$ that ranges from about 2% to about 20% of the radius $r_d$ of the duct 114. In one non-limiting example, the suction exit slots 146 have a radius $r_e$ of about 5% of the duct radius $r_d$. In other words, the suction exit slots 146, in one non-limiting example, have a radius $r_e$ that is approximately twice the radius $r_o$ of the suction outlets 124. The number and shape of the suction exit slots 146 are matters of optimization and can be customized based on the overall design. Furthermore, though a single radius $r_e$ and a single radius $r_o$ are described for simplicity, it is also understood that multiple suction outlets 124 can have multiple, different radii, and multiple suction exit slots 146 can have multiple, different radii. Moreover, the radius of any given suction outlet 124 need not match the radius of any given suction exit slot 146, even if the suction outlet 124 is connected to the suction exit slot 146 by a mass flow transport apparatus 154.

Figure 27:
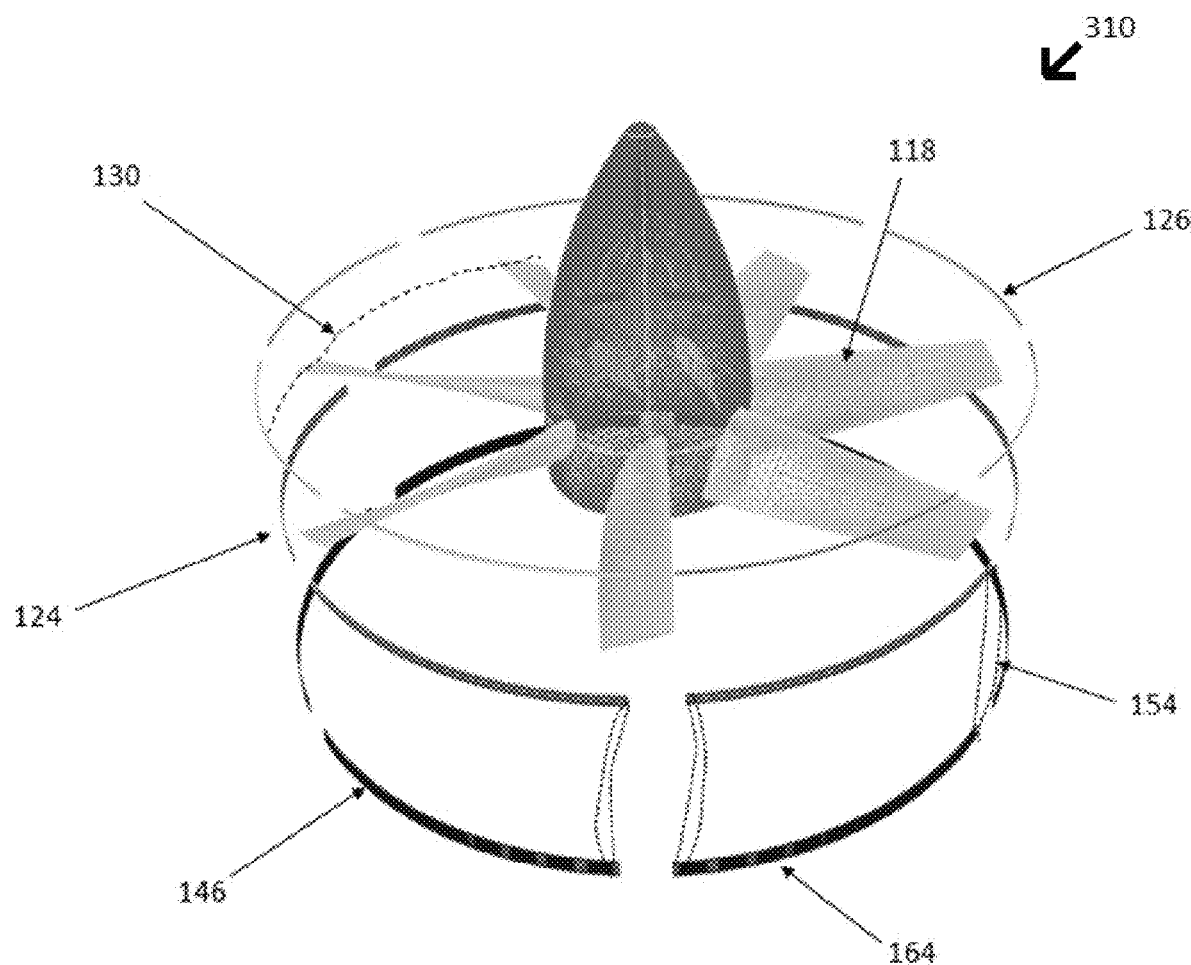
FIG. 27: Exploded color view of a non-limiting example of a ducted fan.

In some embodiments, such as the embodiments depicted in FIG. 5B and FIG. 23, the suction exit slots 146 are composed of 6 or 8 disconnected circumferential lengths. The number and positioning of suction exit slots can correspond to the number and positioning of suction outlets 124, such as shown in FIG. 24 and FIG. 27, where each suction outlet 124 is connected to a corresponding suction exit slot 146 via internal compartments 154. Alternatively, the number of suction outlets 124 can differ from the number of suction exit slots 146, such as shown in FIG. 5B, where a plurality of smaller suction outlets 124 is connected to a single larger suction exit slot 146 by a series of pipes 154.

FIG. 23 depict the suction exit slots 146 without showing a mass flow transport apparatus 154 for ease of illustration. It is understood that any mass flow transport apparatus 154 can be attached to provide fluid communication between any suction outlets 124 and suction exit slots 146 for the transport of extracted mass flow.

Figure 25:
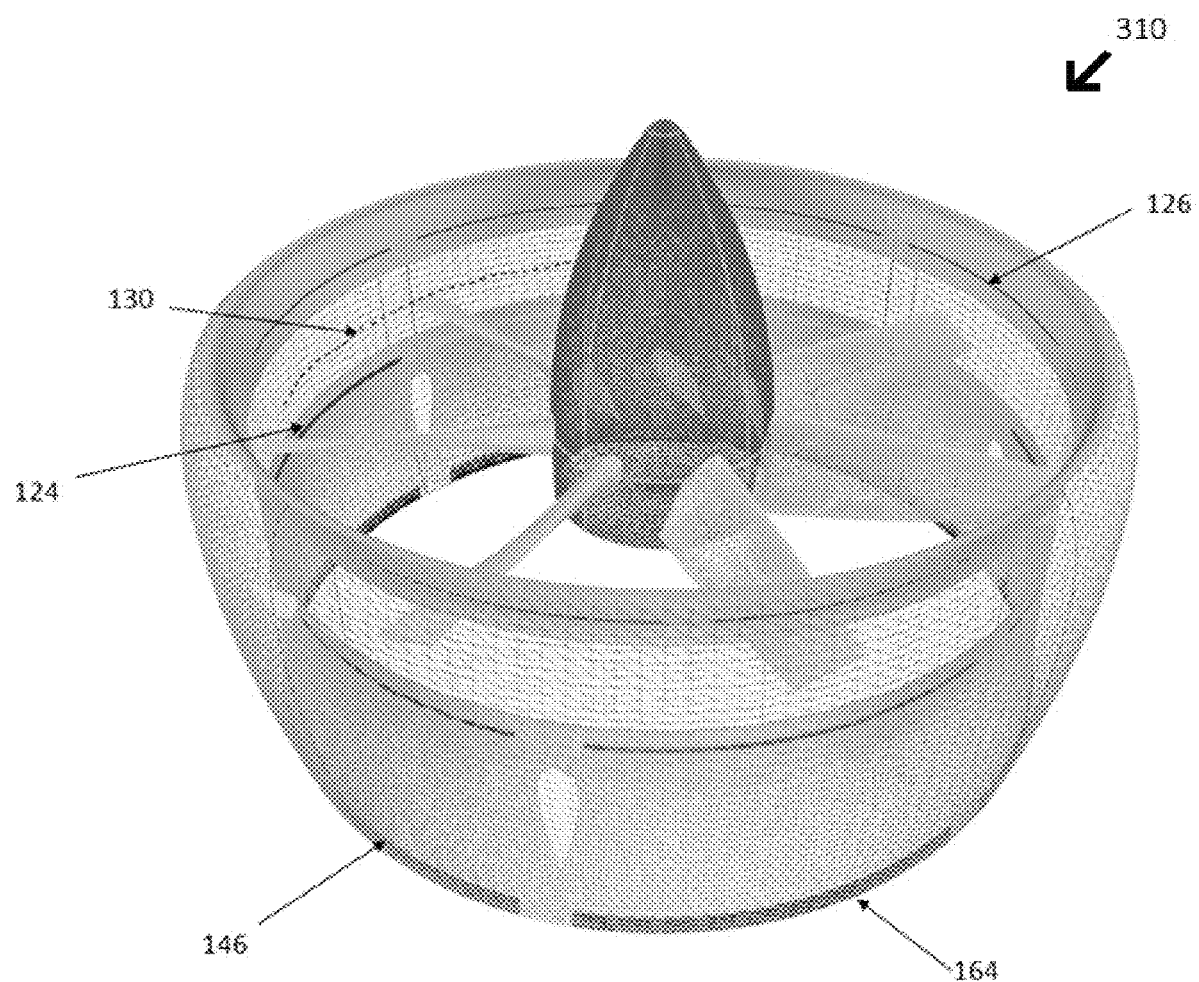
FIG. 25: Color illustration of a non-limiting example of a ducted fan, showing suction exit slots around the perimeter of the duct exit.
Figure 26:
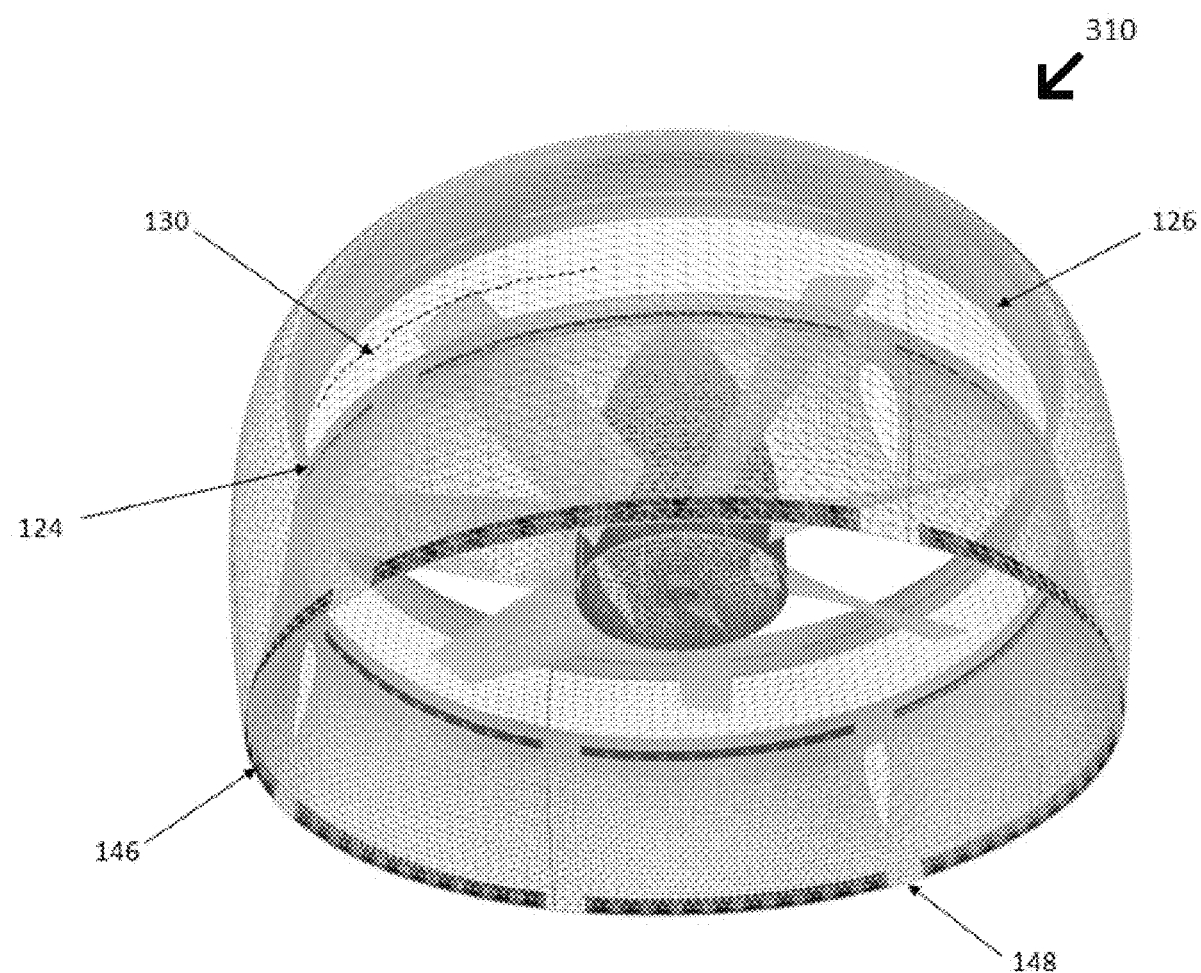
FIG. 26: Color illustration of the non-limiting example of a ducted fan depicted in FIG. 25, depicted from duct exit and trailing edge of the ducted fan.

FIGS. 21-24 show color illustrations of a FIW configuration 210 with an active flow control system, and FIGS. 25-27 show color illustrations of a ducted fan configuration 310 with an active flow control system. As seen from these figures, the suction exit slots 146 are generally disposed along the perimeter of the duct exit 164, which for the ducted fan configuration is also the trailing edge 148 of the duct 114. As best shown in FIG. 24 and FIG. 27, internal compartments 154 provide fluid communication between the suction outlets 124 and the suction exit slots 146. The internal compartments 154 are configured to direct mass flow extracted from the suction outlets 124 out of the suction exit slots 146 at the duct exit 164.

The suction speed for the suction slots 124 is preferably within 15% of the fan tip speed. In other words, the ratio of the suction speed to the fan blade speed ($V_s/V_{tip}$) is generally about 1, but can range from about 0.85 to about 1.15. The active flow control system can include a pressurized air supply 162 capable of providing nearly the same suction speed as the fan tip speed, ±15%. This results in a $V_s/V_{tip}$ ratio of about 1±15%. In some embodiments, the pressurized air supply 162 is provided by the main engine of an aircraft 100.

Figure 8:
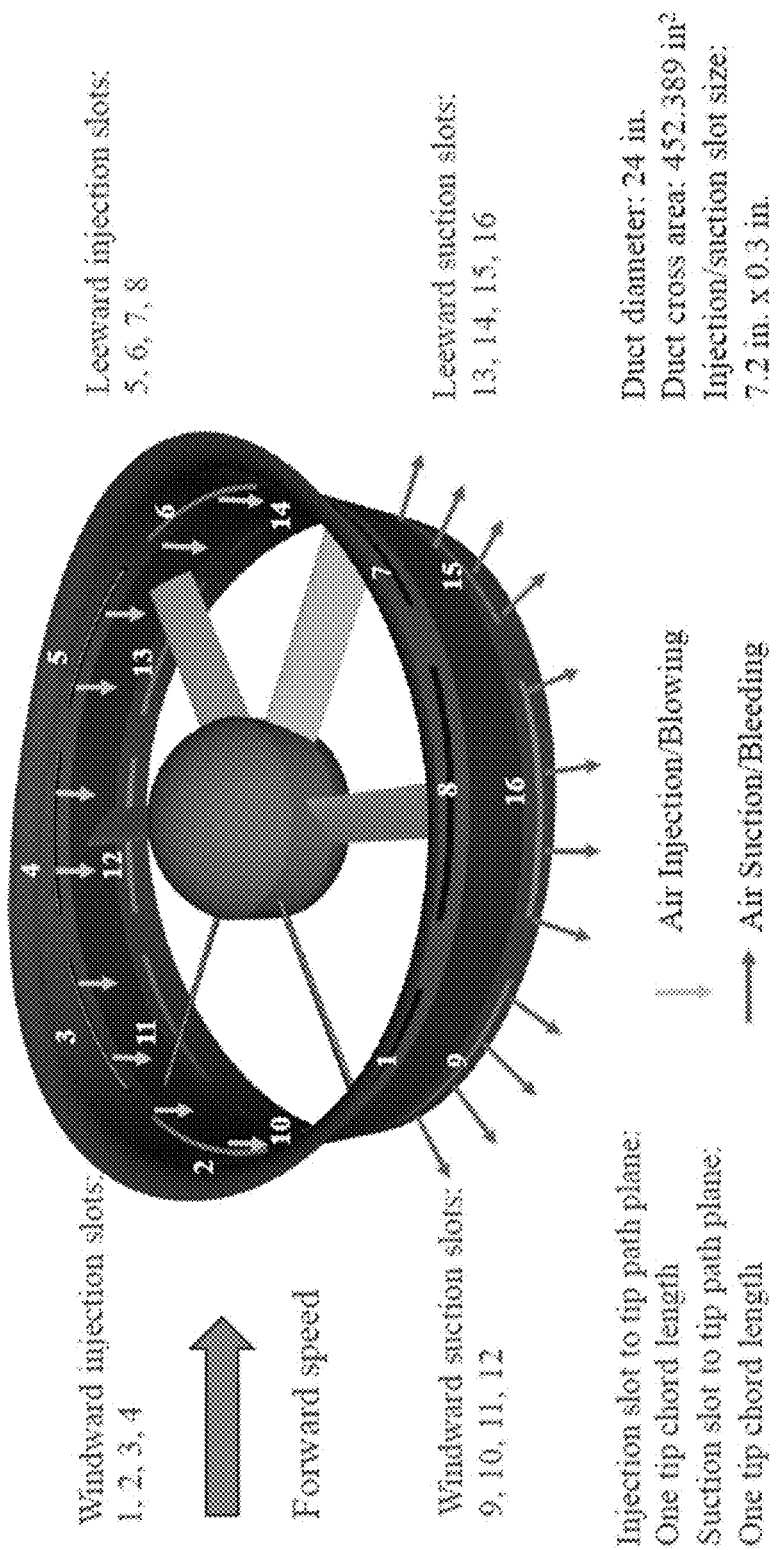
FIG. 8: Color diagram of a non-limiting example of an active flow control system utilizing subsets of injection slots and subsets of suction outlets. The example shows four windward injections slots, four leeward injection slots, four windward suction slots, and four leeward suction slots. The yellow arrows depict air injection/blowing, and the orange arrows depict air suction/bleeding.

There can be multiple slot groups that are controllable together, though independent from each other, such as four slot groups categorized as leeward up slots, windward up slots, leeward down slots, and windward down slots. In such embodiments, the leeward up slots can be controlled together, the windward up slots can be controlled together, the leeward down slots can be controlled together, and the windward down slots can be controlled together. In one non-limiting example, as depicted in FIG. 8, a ducted fan or fan-in-wing can have eight suction slots 124, each with a size of 7.2 in. by 0.3 in., a suction speed of 387.46 ft/s, a duct 114 diameter of 2 ft, a duct cross area of 3.1416 ft$^2$, and a fan blade tip speed of 387.46 ft/s. The suction direction can be normal to the duct wall 136. In one non-limiting example, as depicted in FIG. 8, a ducted fan or fan-in-wing can have eight injection slots 126, each with a size of 7.2 in. by 0.3 in., and an injection speed of 48.82 f/s. The injection direction can be parallel to the duct wall 136.

Figure 20A:
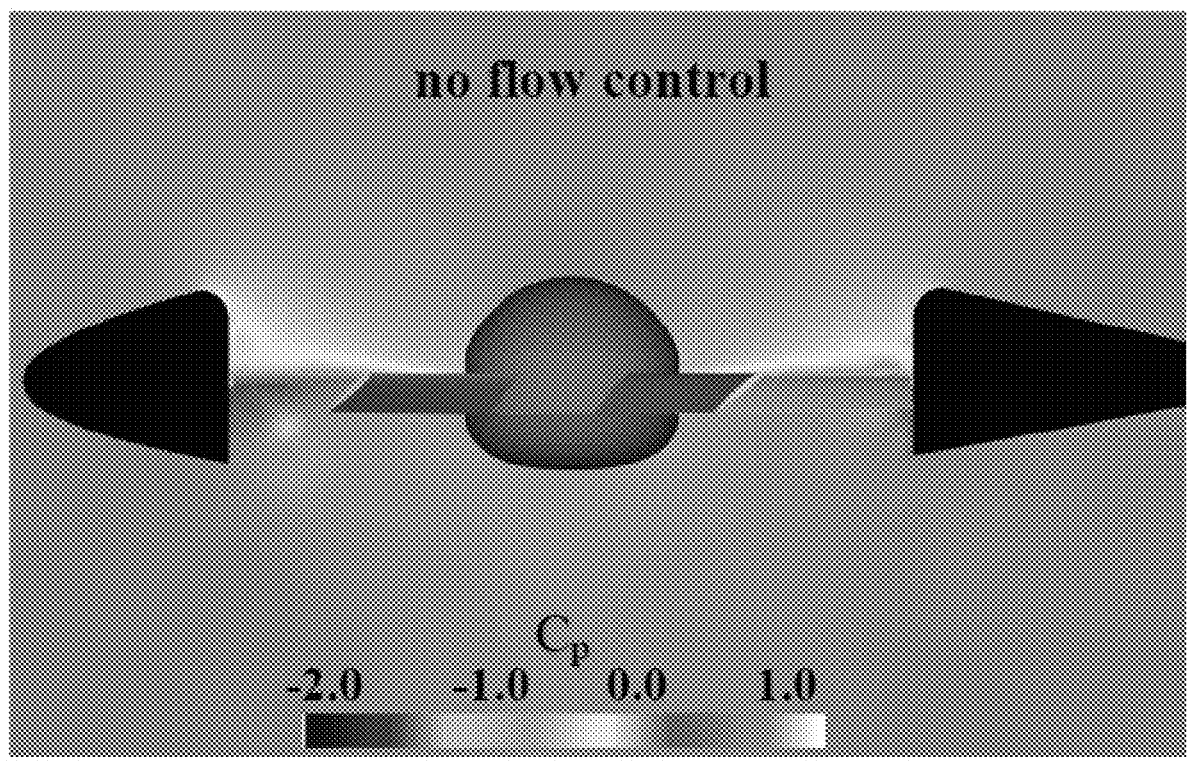
FIGS. 20A-20B: Pressure coefficients on central cutting plane at 38° blade pitch, 3700 RPM, with no flow control (FIG. 20A) and with active flow control (FIG. 20B). Active flow control greatly improves the pressure field of the duct.

The principle of the suction is to control the pressure. As seen in FIG. 19A and FIG. 20A, a pressure pocket underneath the fan blades 118 is created by the spinning rotor. Air flow speeds up in the duct inlet section 116, and pressure increases in the duct diffuser section 120. When the suction slots 124 are opened, active suction may be applied to remove this pocket of pressure from within the duct 114. Introducing air bleeding and/or suction underneath the fan blades 118 alleviates these adverse pressure gradients in the duct diffuser section 120, resulting in improved performance of the lift fan.

As depicted in FIG. 1, a ducted-fan or FIW aircraft 100 with the active flow control system described herein can include a power source 138, a duct 114, a fan 112 located within the duct 114 and powered by the power source 138, where the fan 112 is configured to create air flow through the duct 114, and one or more suction outlets 124 disposed in a duct diffuser section 120 (i.e., beneath the fan blades 118) and configured to bleed or actively remove air flow from within the duct 114. The suction outlets 124 are generally capable of both passively venting air flow from within the duct 114 and actively sucking air flow from within the duct 114, both of which activities are controlled by suitable computer systems designed to optimize performance. The aircraft 100 may further include an avionics system to control the flight of the ducted-fan or FIW aircraft 100. An avionics system can control the aircraft 100 using various inputs. For instance, the avionics system may use inputs, such as inertial sensors, GPS, and airflow speed and direction, in order to control the aircraft 100. The avionics system may be configured to orient the vehicle around a forward direction of flight, wherein the forward direction of flight defines a set of flight axes. The flight axes comprise a pitch-axis, a roll-axis, and a yaw-axis, wherein the pitch-axis is oriented substantially perpendicular to the forward direction of flight, and is the primary axis the vehicle rotates about while in forward flight. Therefore, it is desirable to have as much control authority (maximum control moment) to affect rotations about this pitch axis.

The active flow control system may include an air data system, which may determine the forces of airflow generated on the aircraft 100. The air data system generally includes a processor, and may include multiple processors. The processor of the air data system is operable to calculate the air data surrounding the aircraft 100. For example, the processor can be operable to receive pressure data from a plurality of pressure sensors 144 and calculate direction and magnitude of airflow, such as wind gusts and wind shears, surrounding the aircraft. The active flow control system is computer-controlled to optimize thrust based on the flow of air. The system can be turned on automatically whenever its operation would optimize performance. For example, during hover or forward flight, steady injection and suction may optimize performance. During transient flight, unsteady injection and suction may optimize performance. The injector and suction slots can be turned on when advantageous, and turned off when not needed.

An aircraft 100 with the active flow control system generally includes a power supply 138 for providing the air injection and suction. Either using air suction alone or a combined air injection and air suction generally requires an extra power supply 138 to generate a proper gage or vacuum pressure for the air injection and suction. This is especially true for the FIW or ducted fan operating at high RPM where a large suction (vacuum) pressure may be needed to maintain the same suction speed ratio to the tip speed (that is, the $V_s/V_{tip}$ ratio). This power supply 138 may come from a separate power unit, from the same power unit that drives the fan blades 118, or from the main engine power of the aircraft 100. As one non-limiting example, a main engine compressor creates compressed air, which can power things like the active flow control system.

The exit of the extracted mass flow from the suction slots 124 should also be accommodated for in an aircraft 100 having the active flow control system. The Examples herein show that about 6-8% of the duct mass flow is optimally extracted or bypassed through the suction slots 124, which should be placed in a proper location such as the main cabin of the aircraft 100, may be used as the air source for the air injection in the duct inlet region 116, or may be directed out through suction exit slots 146. As the Examples show, the option of redirecting the suction mass flow back to the duct exit 164 has an advantageous effect on the FIW system. This exiting mass flow can be suitably directed to any desired location 142, if not to the duct exit 164. As depicted in FIGS. 5C, 24, and 27, the suction exit slots 146 can be configured to direct the extracted mass flow out of suction exit slots 146 near the duct exit 164. This exiting mass flow is thus directed out in a direction parallel to the mass flow exiting the duct diffuser section 120 (i.e., parallel to the mass flow providing the main thrust from the fan 112).

A piping system 140 for the air injection and air suction may also be provided. The piping system 140 is capable of providing air from a pressurized air supply 162 for the air injection and suction, which is relatively easy to accommodate in the FIW configuration but is more difficult to accommodate in some ducted fan systems due to tight internal spaces. The piping system 140 can also be used to direct extracted mass flow to the desired location 142, such as when suction exit slots 146 and mass flow transport apparatuses are not utilized to direct extracted mass flow out at the duct exit 164. The piping system can be customized and optimized based on the design of the aircraft 100.

The control scheme for the active flow control is generally capable of coordinating the air injection and suction in the windward and leeward sides in various flight conditions, such as hover, axial flight, sideward flight, and forward or transient flight. Regardless of the particular control scheme, the active flow control system should be operable automatically for optimized performance, such as by controlling the injection and suction so as to achieve the optimal $V_s/V_{tip}$ ratio.

The active flow control system described herein has many benefits, such as improving thrust, improving stall margine, and improving application area. The active flow control system primarily increases the performance of the duct, while not increasing the operation range (which results in improved safety). The active flow control system also has a wide fan. More mass flow passes through the duct with active flow control. The mass flow can be optimized for efficiency using a curve. The active flow control system can be optimized to achieve the best efficiency and thrust value in hover, forward, or transient flight. As seen from FIGS. 19-20, the active flow control system significantly improves the aerodynamic characteristics of the pressure and velocity fields in the fan-in-wing (FIW) system.

EXAMPLES

Example I—Hover

Aerodynamic performance of a fan-in-wing (FIW) configuration in hover was numerically investigated using a high-fidelity, three-dimensional, unsteady Reynolds-averaged Navier-Stokes flow solver based on unstructured grid technology. Fan-in-wing or ducted fan configurations offer the advantage of hover capability with enhanced thrust compared to open fans, but suffer from reduced efficiency and thrust level at off-design conditions. In this Example, the aerodynamic performance and the flow field of a fan-in-wing configuration in hover were numerically investigated over a range of fan pitch angles and at two operating speeds. The maximum thrust, peak efficiency, and stall margin of the system are demonstrated. An active flow control system as described herein was introduced to enhance the operating efficiency and the thrust level of the system by increasing the circulation and the duct mass flow rate in the fan-in-wing system. Numerical investigations indicate a 25 to 55% increase in the maximum system thrust for the current configuration without suffering the peak efficiency loss using the active flow control system. This provides a viable technology to significantly enhance the aerodynamic performance of the lift fan devices such as ducted fans or fan-in-wing configurations, for example to support Vertical Takeoff and Landing (VTOL) aircraft.

Fan-in-Wing System

Figure 7A:
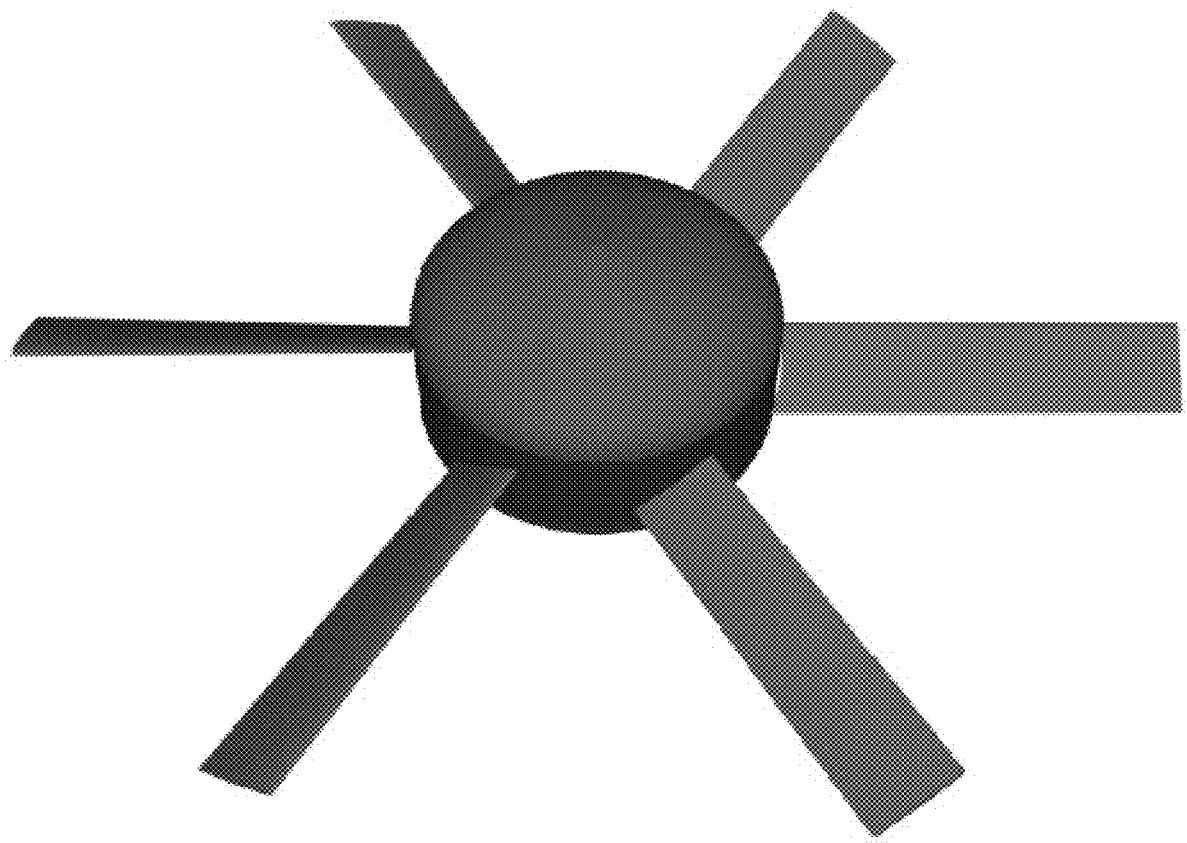
FIGS. 7A-7B: FIW wind tunnel model tested at Naval Surface Warfare Center Carderock Division (NSWCCD).
Figure 7B:
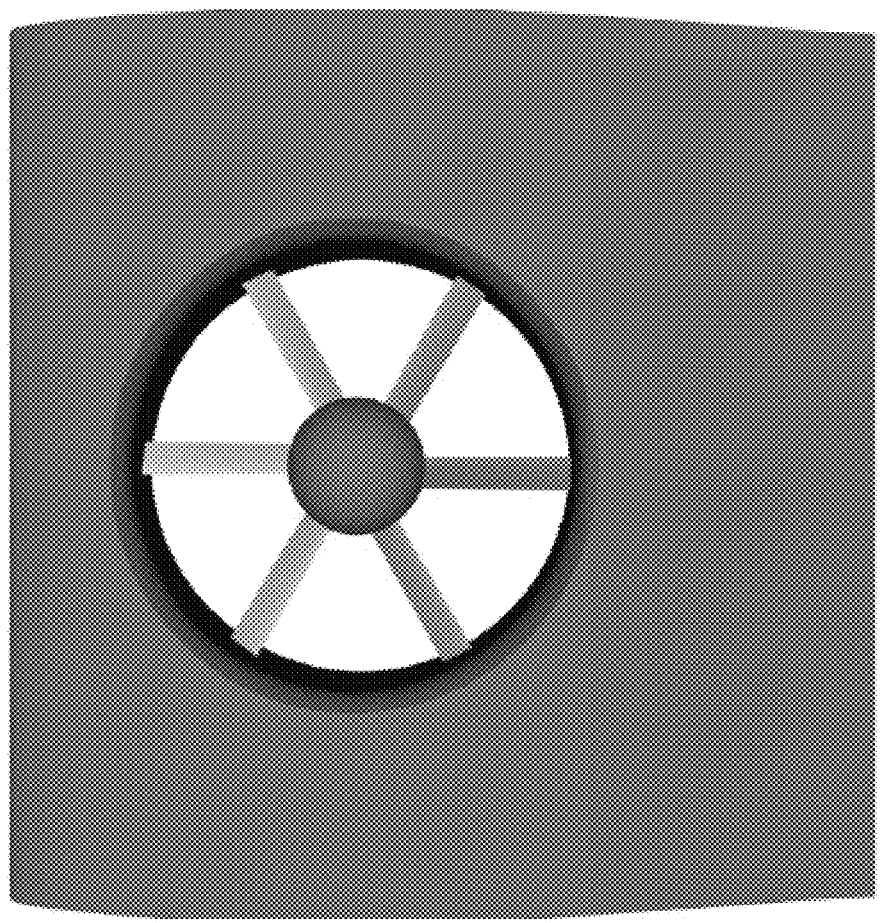

The FIW configuration considered in this Example is a particular wind tunnel model investigated at Naval Surface Warfare Center Cardorack Division (NSWCCD). The diagram of the FIW configuration is shown in FIG. 7B. It consists of a fixed wing and a rotating fan with a center body. The rotating fan has six evenly distributed blades, which are constructed based on a symmetric airfoil NACA0012. Each blade has a constant chord length of 2 in. and a total twist angle of negative 12° from hub to the tip. The radius of the fan blades is 11.875 in., and the tip clearance of the fan blade to the surrounding duct is 0.125 in. A cylindrical center body (hub) has 5.5 in. in diameter, and has the same height as the envelope thickness of the wing. The stationary wing is constructed using the NACA065-218 airfoil, which has a square size of 48 in. in longitudinal length and 48 in. in lateral span. The inner duct has a constant diameter of 24 in., which is centered at 30 in. from the leading edge of the wing. Table 1 provides a summary of the FIW geometric information. In the present Example, numerical computations for the FIW system in hover were performed for a series of fan blade pitch angles at two rotating speeds. All computations were performed at sea level, with the atmosphere temperature of 57° F. (15° C.), and the pressure of 2116.27 psf ($1.013 \times 10^5$ Pa). The operating and reference conditions for the FIW configuration in hover are given in Table 2.

FIW or ducted fan systems, to generate additional thrusts, and to enhance the operation efficiency of the system in adverse flow (off-design) conditions such as high thrust levels. This method uses air injection (active) in the duct inlet section and air bleed (passive) or air suction (active) in the duct diffuser section to modify the aerodynamic flow field within the fan-in-wing or ducted fan systems. The air injection is applied at the duct inlet section before reaching the fan blades, and the air suction is applied at the diffuser section of the duct underneath the fan blades. The air injection and air suction may be implemented independently or coordinately within the system. The term "active" means that the air injection and/or suction are activated in situations when extra system thrusts are needed, but are turned off in normal operating conditions such as near the peak (design) efficiency point. The amount of mass flow injected to or extracted from the slots can be controlled by pressure valves in the hardware instrumentation for the FIW or ducted fan systems.

A diagram of the active flow control system used for the current FIW system is shown in FIG. 8. A similar diagram of the active flow control scheme can be developed in other systems such as ducted fans. In the system, there are eight evenly distributed injection slots, each with a size of 7.2 in.×0.3 in., that are placed on the duct inlet surface 2 in. above the fan blade tip path plane (TPP). There are also eight evenly distributed suction slots of the same size that are placed on the duct diffuser surface 2 in. underneath the fan blade TPP. The vertical orientation of the suction slots to the TPP is carefully chosen to be the same length as the blade tip chord (2 in.). The injection and suction slots have the same width of 2.5% of the duct radius. In addition to the above injection and/or suction slots, an option for using air suction with exit slots was investigated, where the exit slots are placed at the duct exit and are internally connected with the suction slots on the side wall to guide the suction mass flow back to the FIW flow field. The number of slots used for air injection and suction may vary in different FIW or ducted fan configurations, but the purpose is to provide as much uniform coverage as possible for the injection and suction flows along the duct annulus before and after the fan blade TPP. The injection and suction slots are further divided into windward and leeward groups in order to provide

TABLE 1

| Geometric information about the FIW configuration | | | | | | |
|---|---|---|---|---|---|---|
| Components | Airfoil | Radius [in] | Root cutoff [in.] | Chord [in.] | Twist [deg.] | Solidity |
| Fan blade | NACA0012 | 11.875 | 3.8125 | 2.0 | −12 | 0.2184 |
| Wing | NACA64-212 | 12 | — | 48 | 0 | — |

TABLE 2

| Operating and reference conditions of the FIW configuration in hover | | | | | | |
|---|---|---|---|---|---|---|
| Parameters | Tip speed [ft/s] | Tip Mach | Fan Pitch [deg.] | Ambient pressure [lbf/ft²] | Ambient density [slug/ft³] | Ambient temperature [F.] |
| 3700 RPM | 387.46 | 0.3465 | 14, 22, 30, 38, 42 | 2116.274 | 0.002377 | 59 |
| 6172 RPM | 750 | 0.6707 | 14, 22, 30, 38, 42 | 2116.274 | 0.002377 | 59 |

Active Flow Control

The active flow control system described herein was introduced to improve the aerodynamic characteristics of the FIW operating in other conditions, such as in forward or transient flight.

flexibility to control the air injection and/or suction for the FIW operating in other conditions, such as in forward or transient flight.

Figure 9A:
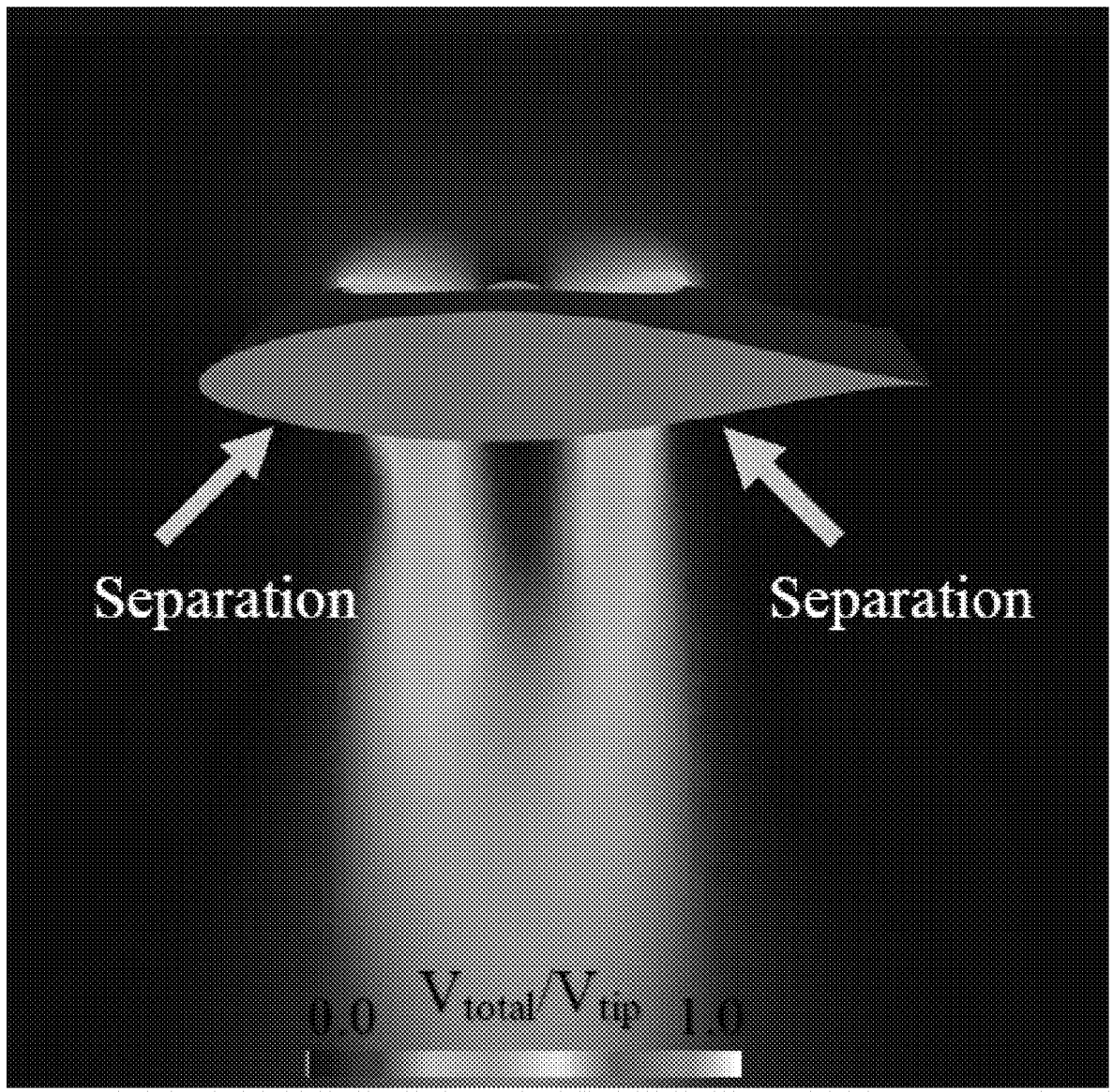
FIGS. 9A-9B: FIW configuration in hover (FIG. 9A) and forward flight (FIG. 9B).
Figure 9B:
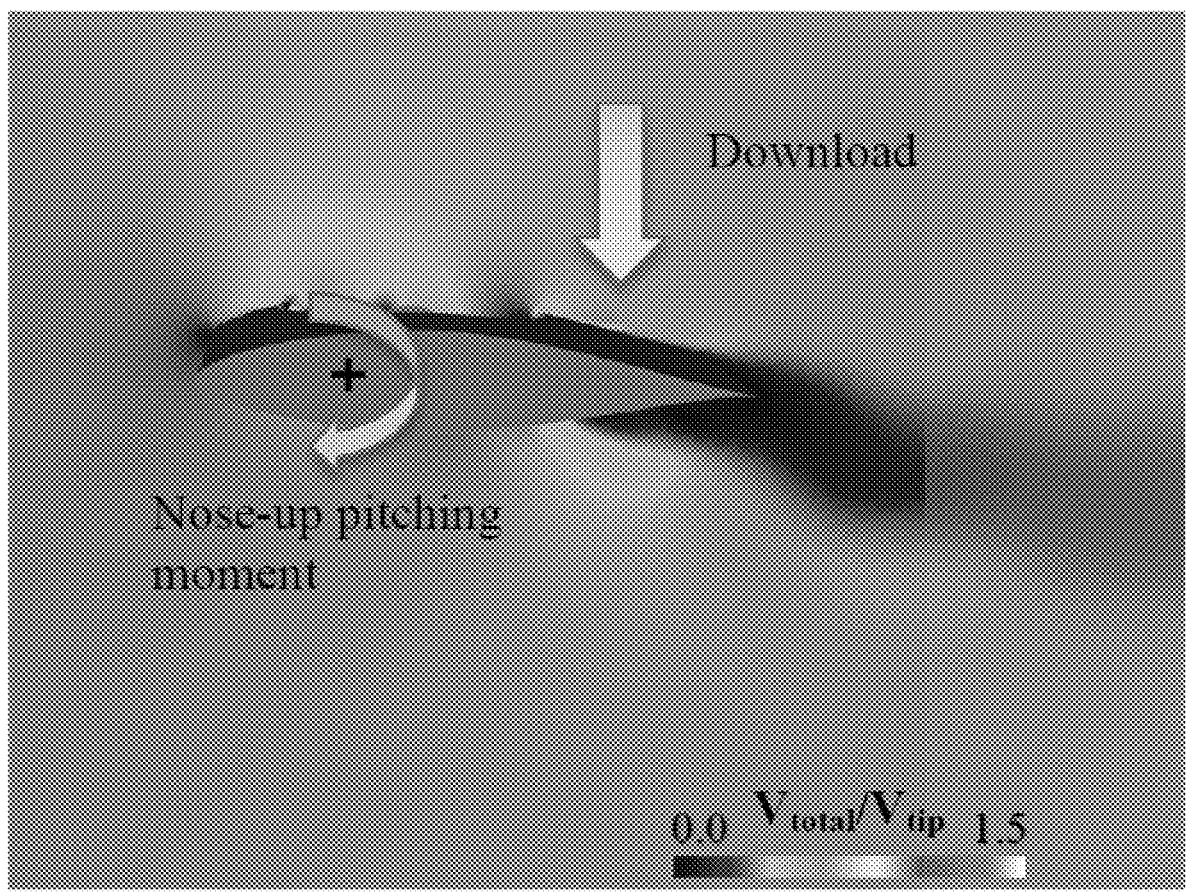

As mentioned above, there are two major aerodynamic challenges in the FIW or ducted fan systems. The first issue is the flow separation in lift fan systems operating in hover, as illustrated in FIG. 9A. There is a potential flow separation in the duct inlet area if a smaller inlet lip radius less than 6.5-7.5% of the duct diameter is chosen in ducted fan designs. In addition, the flow in the duct diffuser separates after passing the fan tip path plane (TPP) and before reaching the exit of the duct. This is true even at the design condition or low thrust level, as was observed in both wind tunnel tests by others and CFD computations. The second aerodynamic issue is the momentum drag and nose-up pitching moment when the lift fan devices are operating in forward flight or at high angle of attack, as illustrated in FIG. 9B. The momentum drag is caused due to the vehicle having to turn the freestream flow momentum into 90° through the duct, and the nose-up pitching moment is caused by unbalanced forces generated on the duct leeward and windward surfaces, or by the download generated on the rear portion of the FIW configuration (FIG. 9B). The active flow control system targets these aerodynamic issues that are common in lift fan systems operating in hover or forward flight conditions. While the current Examples are focused on a numerical investigation of aerodynamic performance of the FIW system in hover using the active flow control, the aerodynamic characteristics and performance of the configuration in forward and transient flight conditions can be similarly characterized. The active flow control system with different windward and leeward flow injection and suction serves the function of generating unbalanced forces in the duct area to order to counterbalance the nose-up pitching moment and improve the stability control of the system operating in forward flight condition.

Computational Method

The computational method used in this Example for the FIW configuration is based on a high-fidelity, three-dimensional, unsteady time-accurate Reynolds-averaged Navier-Stokes CFD code called U²NCLE. U²NCLE code uses a finite-volume, fully unstructured grid method for modeling and simulating both internal and external viscous flows including dynamic relative motions, such as rotorcraft, turbomachinery, as well as ducted fan or FIW configurations. The system of the governing equations is formulated in a conservative flux formula using primitive variables. The inviscid flux is calculated using a higher order Roe flux approximation. The viscous flux is calculated with a second order directional directive method. The system of equations is solved using an implicit Newton's method with a second order temporal accuracy, where Newton's method is used to march the nonlinear system of equations and Gauss-Seidel relaxations are used to solve the linear system of equations at each Newton's iteration. The viscous turbulent effect is modeled with the Spalart-Allmaras turbulence model, where the Langtry and Menter's local correlation-based transition model is integrated in the turbulence model in order to capture the transitional flow phenomenon in the fan-in-wing system.

In order to investigate the effectiveness of the active flow control concept on the aerodynamic performance of the FIW system, computational modeling techniques were developed to mimic the air injection and suction flows into and out of the duct system. Two computational methods were developed to model the air injection in the computation: a boundary condition method and a source term method. The boundary condition method specifies the total flow conditions such as total pressure and total temperature, as well as the injection velocity into the duct normal direction. The source term method offers the advantage of injecting flow with a certain amount of mass, momentum, and energy in any direction specified. For the air bleed or suction modeling in the diffuser section of the duct, a mass flow boundary condition is specified at the bleed/suction slots underneath the fan blade TPP. These computational techniques were integrated into the relative dynamic motions in order to assess the actual effect of the active flow control on the complex unsteady flow field in a hovering FIW system.

Computational Grid

Figure 10A:
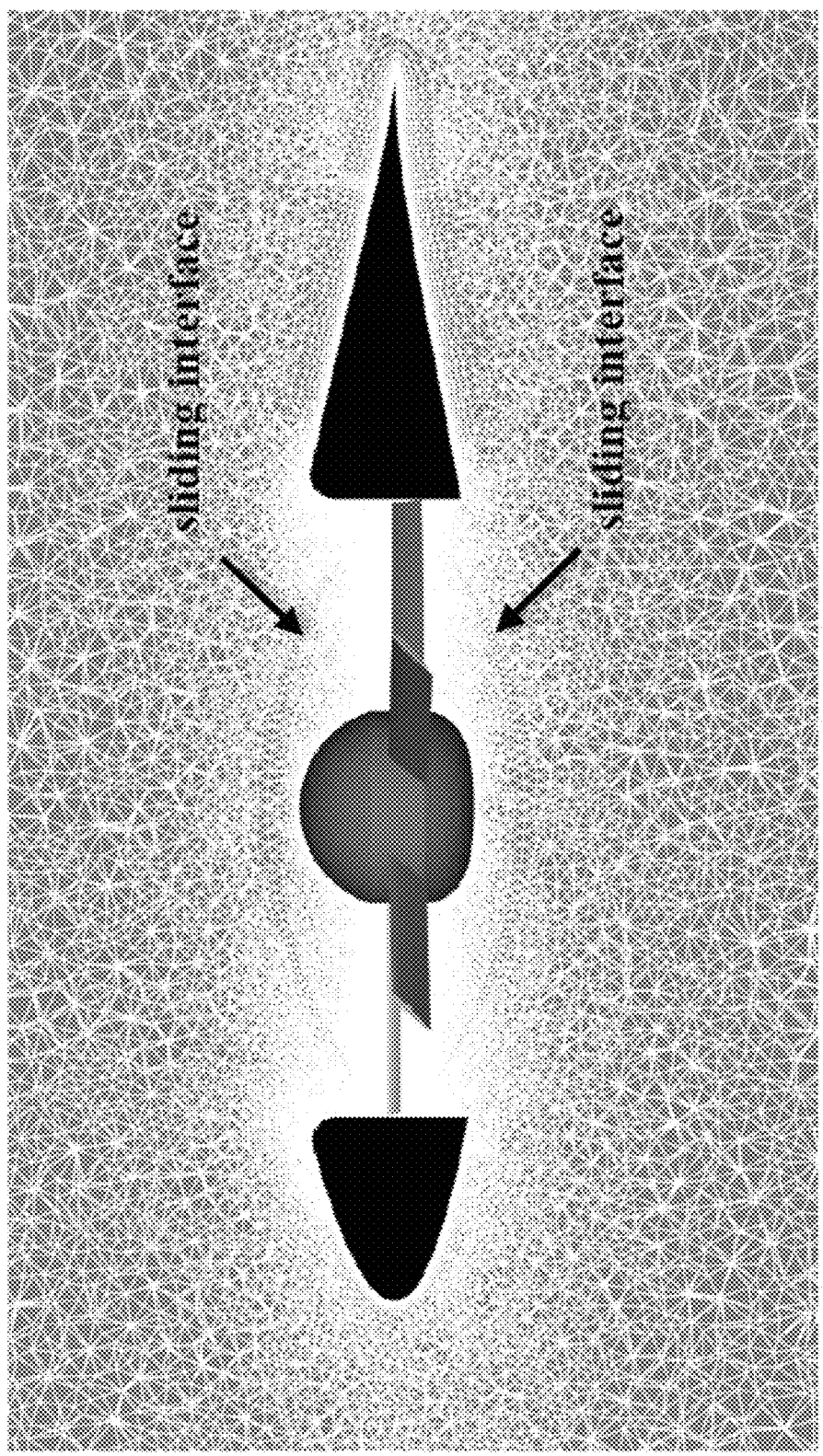
FIGS. 10A-10B: Computational mesh for the FIW system overview (FIG. 10A) and tip clearance (FIG. 10B).
Figure 10B:
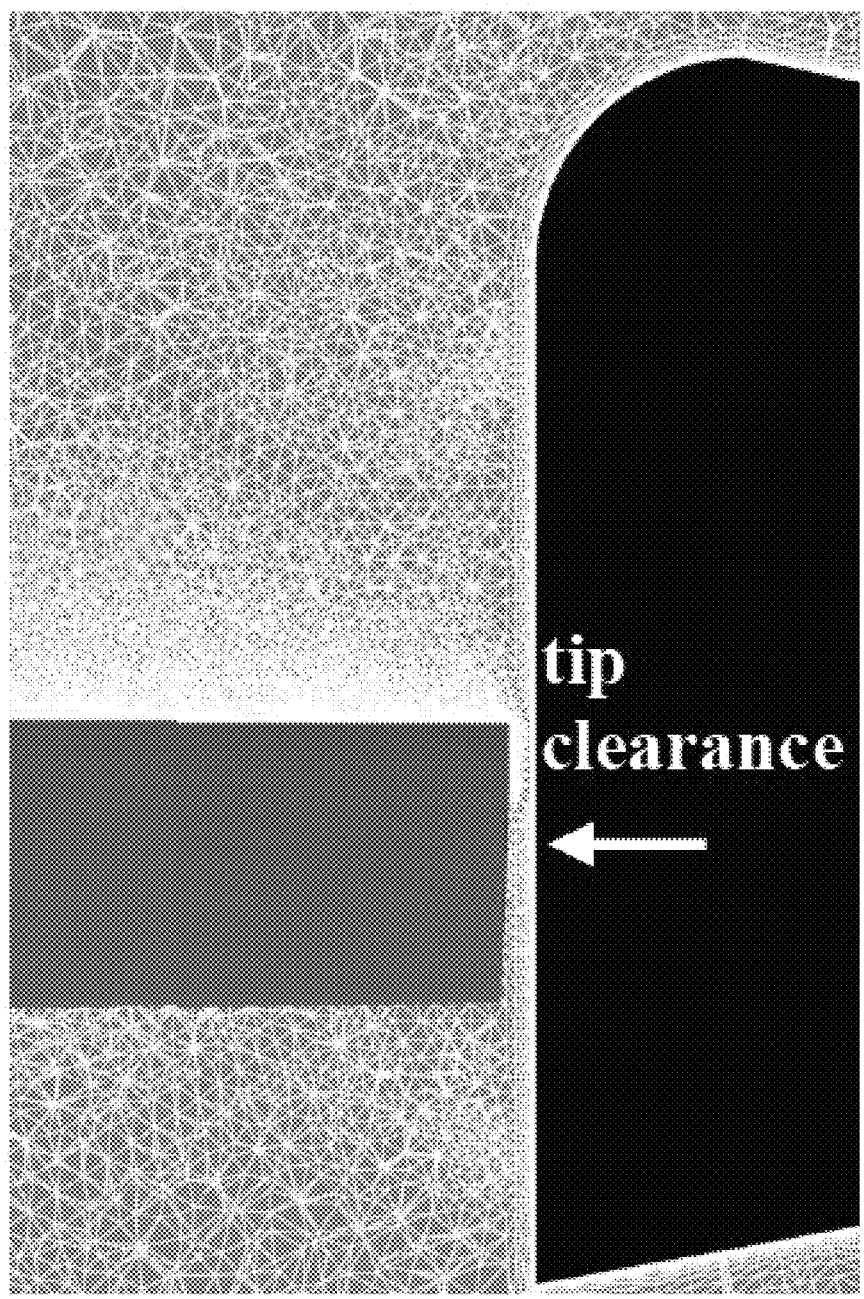
Figure 11A:
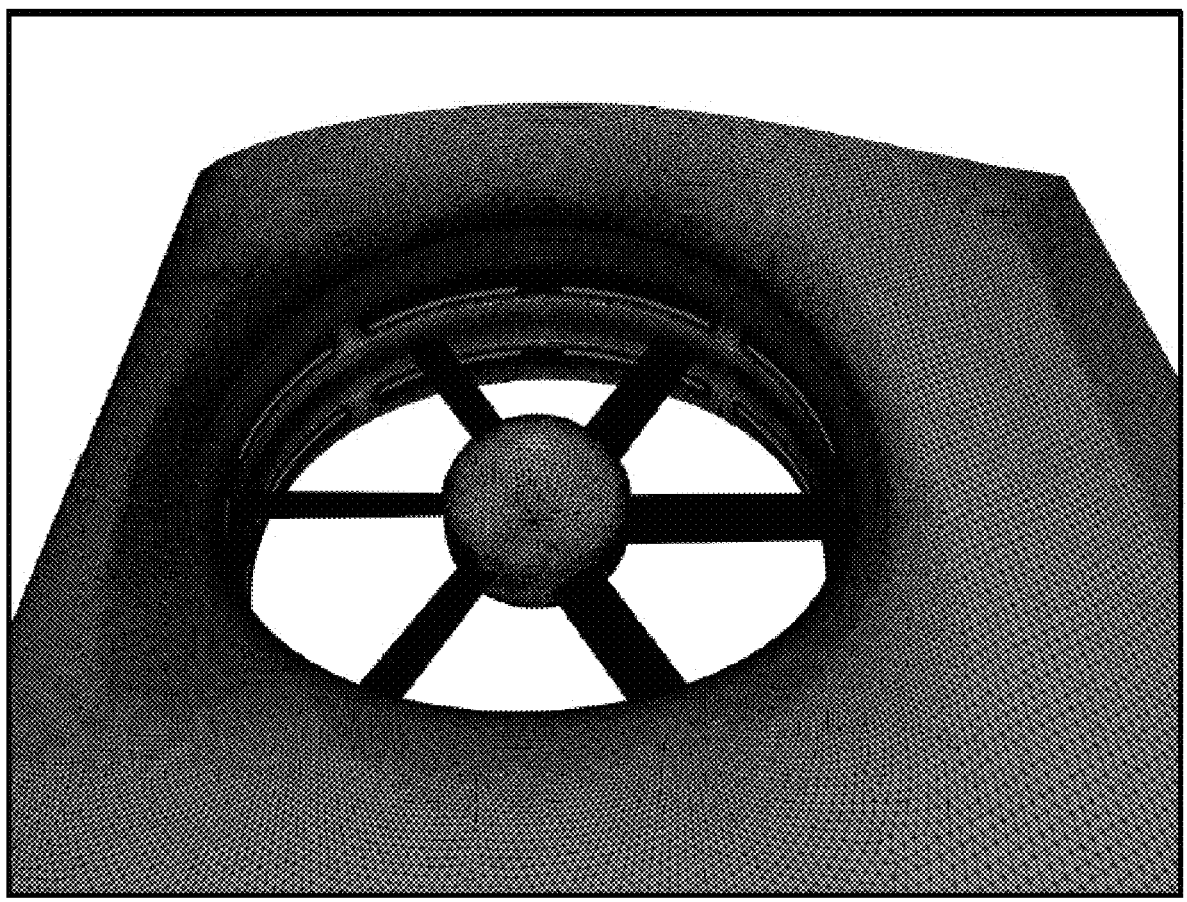
FIGS. 11A-11C: Computational model for the FIW system with active flow control slots (red color).
Figure 11B:
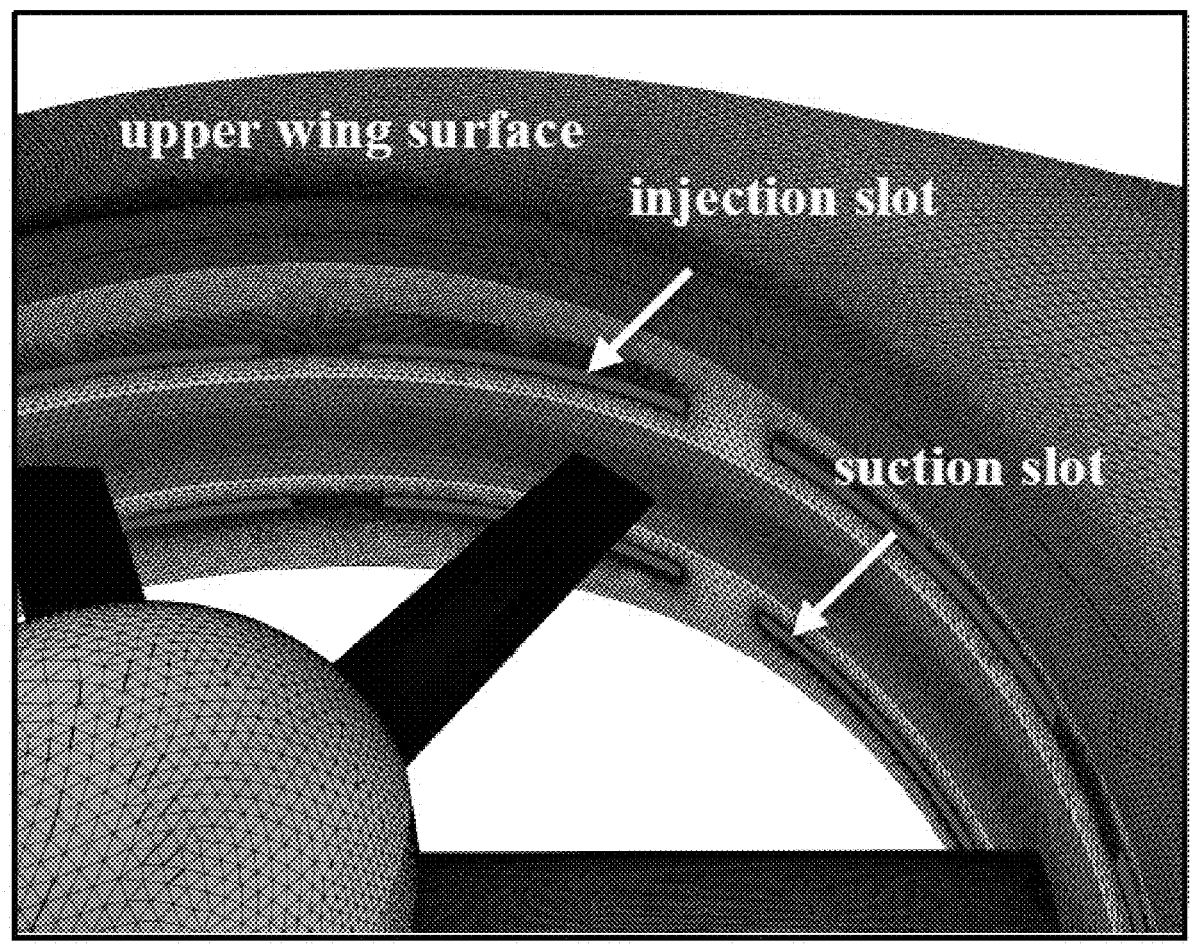
Figure 11C:
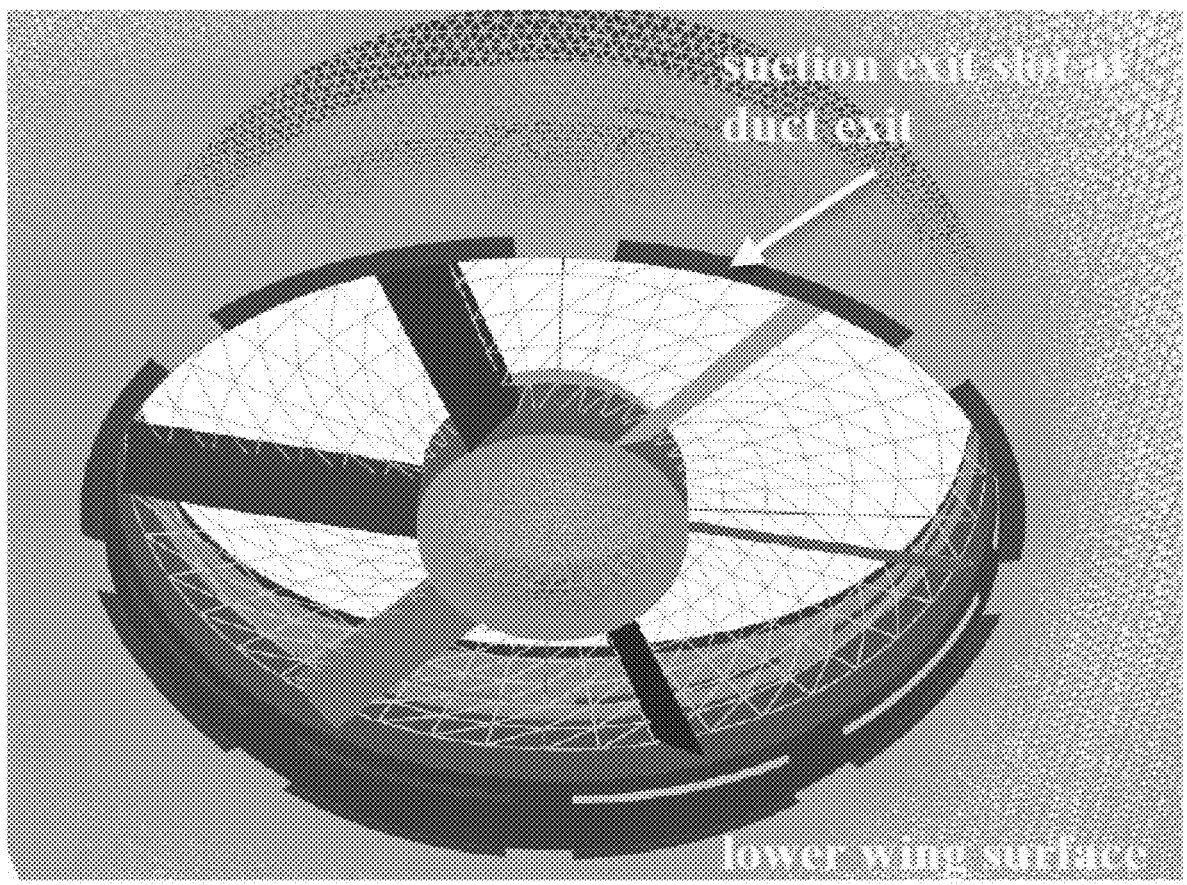

A series of fully unstructured meshes using mixed elements were generated for the current FIW configuration at each blade pitch angle, where the total mesh sizes were about 20 million points and 58 million cells for the entire fan-in-wing system, including a six-bladed rotating fan and a stationary wing. An overview of the mesh point clustering around the fan blades and the wing is shown in FIG. 10A on a cutting plane through the fan hub centroid. FIG. 10B shows the tip clearance between the blade tip and the duct wall, which is meshed with boundary layer growth. A $y^+$ value of one was used for all solid surfaces in order to capture the viscous effects such as laminar, turbulent, or transitional flows. Air injection and suction slots were created on the duct surface for modeling the active flow control scheme, which are marked by red color in FIG. 11A-11B. The suction exit slots are also illustrated in FIG. 11C, which are internally connected with the suction slots inside the wing structure in order to pass the mass flow extracted from the duct side wall back into the FIW flow field at the duct exit. In order to investigate the relative motion and unsteady interaction between the rotating fan and the stationary wing, a dynamic sliding method based on an interpolation procedure was used. This sliding grid method requires two CFD volume grids built with different tags, one as rotating and another as static. There are common interfaces between the rotating and static volume grids, as shown in FIG. 10A, where phantom cells are built within the volume cells in the other volume grid dynamically at each time step during the time marching iterations. Information between two volume grids is exchanged at the common interface between the rotating and the static volumes, where the data at the phantom cells are interpolated based on most current data in the surrounding physical cells using a parallel interpolation procedure. It should be noted that multiple relative motion grids were allowed in this sliding interface method for simulating the multiple rotating fans. The computational overhead was about 10% for exchanging information between relative motion grids.

Results and Discussion

Computational investigations of the FIW configuration in hover were performed using a high-fidelity simulation code U²NCLE. The computational meshes were decomposed into 128 blocks for parallel executions, where an open source library, OpenMPI, was used for the inter-node communications. In order to obtain the baseline aerodynamic performance of the current FIW configuration, unsteady computations were performed over a range of blade pitch angles from low thrust to deep stall. The rotating fan operated at two rotational speeds, a low speed at 3700 RPM and a high speed at 7162 RPM. The selected fan blade pitch angles at both RPM were 14°, 22°, 30°, 38°, and 42°, which correspond to certain wind tunnel experiments. The FIW aerodynamic performance at the above hover conditions was investigated with and without using the active flow control system (air injection and suction). In addition, computed aerodynamic performance of an open fan configuration was included for comparison purposes. Because of the challenges in both numerical computations and separated flow physics at post stall conditions, each computation required approximately 30 or more fan revolutions to reach a periodic state for the current FIW configuration in hover.

CFD Validation

Figure 31:
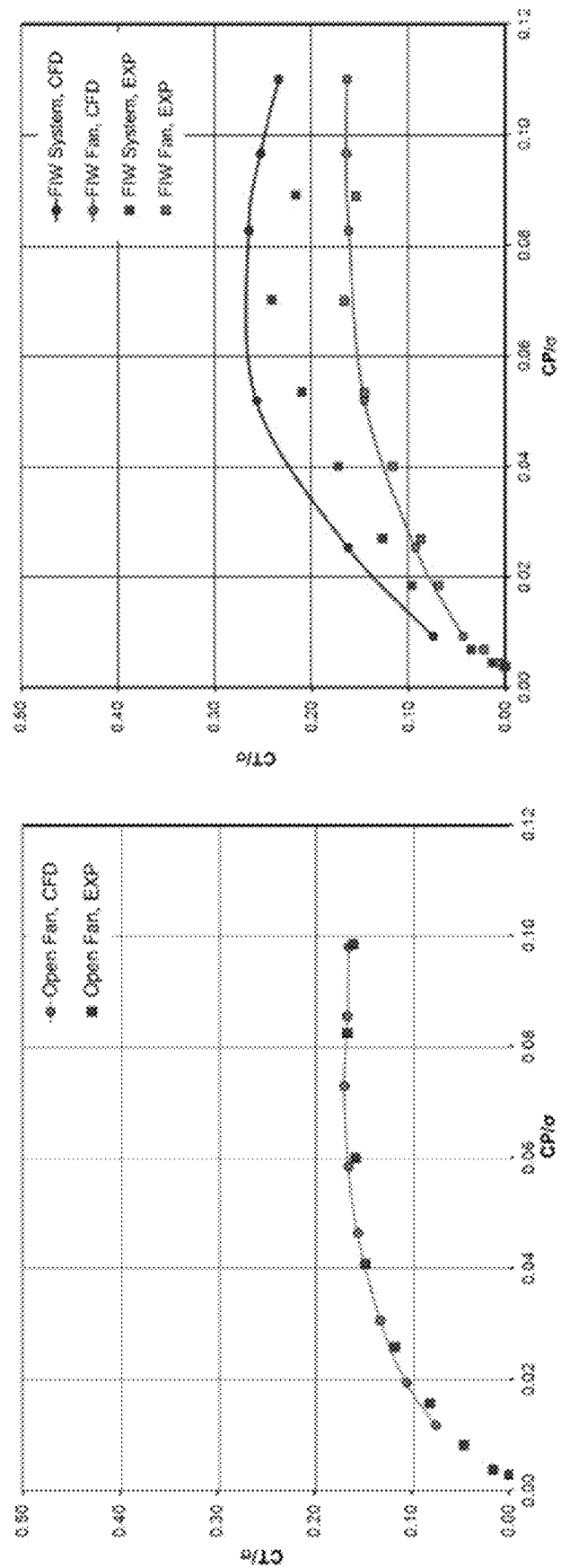
FIG. 31: Comparisons of measured and predicted $C_T/\sigma$ versus $C_P/\sigma$ for the open fan (left) and FIW system (right) in hover.

The U²NCLE CFD code was first validated for computed aerodynamic performance for the baseline FIW configuration in hover to assess the prediction accuracy and numerical uncertainty for the FIW simulations in forward flight. The wind tunnel models for both the open fan and FIW configuration in hover have been measured at the Naval Surface Warfare Center Carderock Division (NSWCCD). Shown in FIG. 31 are comparisons of computed and measured blade loading coefficient (CT/s) versus power loading coefficient (CP/s) for both open fan and FIW models. The open fan and FIW system both operate at a fan rotational frequency of 3700 rpm. Comparisons between the CFD results and wind tunnel test data show an excellent agreement between the measured and predicted aerodynamic performance for the open fan over a wide range of fan pitch angles. Computations for the fan thrust inside the FIW system also show good agreement with the wind tunnel measurements, although there are some discrepancies between the predicted and measured system thrusts for the full FIW configuration. This discrepancy is mainly caused by a larger wing thrust predicted in CFD computations and a smaller wing thrust measured in the wind tunnel test, which could be due to differences between the CFD and measured FIW models.

The maximum wing thrust in hover could reach to the same amount as produced by fan blades, and the smaller wing thrust measured in the wind tunnel test may be due to several design issues such as non-uniform duct lip, simple blade planforms, and not optimized fan blade twist distributions for the current wind tunnel model. On the other hand, the computational model used in this example is a finite wing span configuration exposed in a free air environment, which is different from the wind tunnel model that simulates an infinite wind span under the influence of tunnel walls. These differences in geometric and operational conditions may be attributed to the discrepancy between the measured and predicted FIW thrust as shown in FIG. 31. However, relative merits and improvement of the aerodynamic performance for the FIW system using the active flow control can be obtained based on the same computational model.

Baseline Performance

Figure 12A:
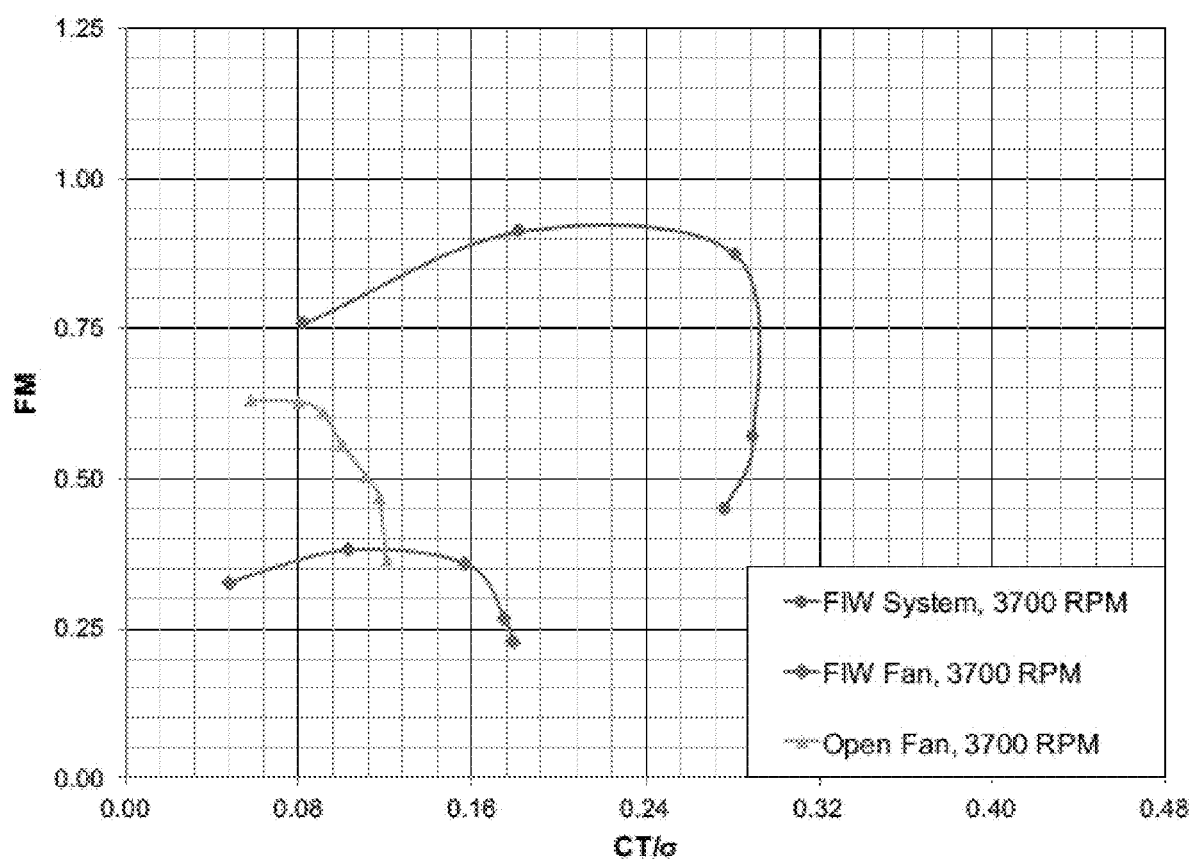
FIGS. 12A-12B: Figure of Merit (FM) versus thrust coefficient/fan blade solidity ($C_T/\sigma$) for the open fan, FIW fan, and FIW system at 3700 RPM (FIG. 12A) and 7162 RPM (FIG. 12B).
Figure 12B:
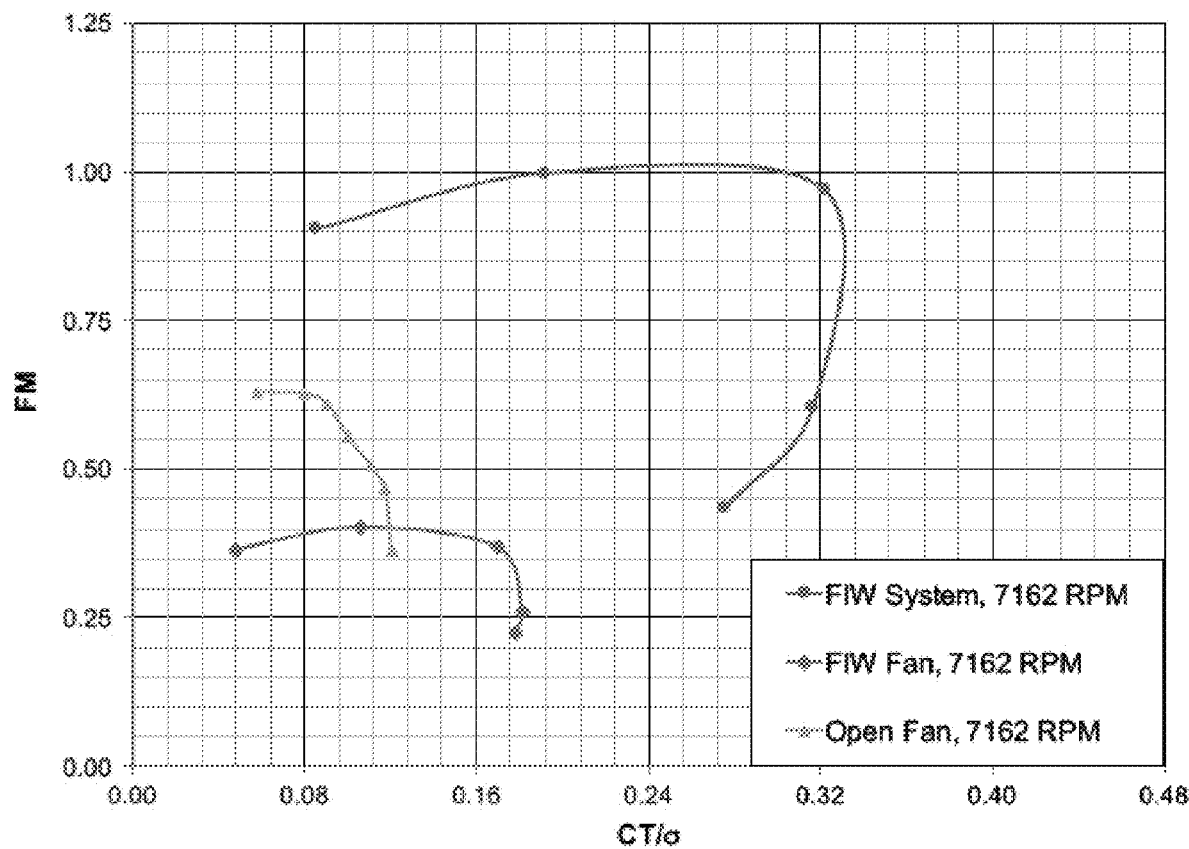

The aerodynamic performance of the baseline FIW configuration was investigated first in order to obtain a basic understanding about the complex flow physics. The performance data includes the Figure of Merit (FM), blade loading coefficient ($C_T/\sigma$), power loading coefficient ($C_P/\sigma$), Disk Loading (DL), and Power Loading (PL), which are compared between the open fan and the FIW system at both fan speeds. Shown in FIGS. 12A-12B are the computed FM versus $C_T/\sigma$ for the open fan, the fan inside the FIW configuration, and the entire FIW system. The FM of the open fan, although generally higher than the FM of the fan that is in inside the FIW system, decreases quickly after reaching to the peak efficiency at about $C_T/\sigma=0.08$. The fan performance in the FIW system, however, is able to maintain the hover efficiency over a wide range of thrust level or fan pitch angles, due to the presence of the duct that reduces the effective pitch angle as well as the fan blade tip loss. Even though the FM for the fan inside the FIW system is smaller than that of the open fan case, the overall FM and thrust level of the entire FIW system is significantly increased, due to additional thrust being generated on the wing surface by the fan suction effect. This is one of the advantages of the ducted fans or FIW configurations over the open fans.

The effect of the fan RPM on the FM and $C_T/\sigma$ is not very strong on the open fan or the fan inside the FIW configuration, but is noticeable in the whole FIW system. The peak FM of the FIW system is increased from 0.87 at 3700 RPM to about 1.0 at 7162 RPM. In addition, the maximum thrust is also increased from $C_T/\sigma=0.29$ at 3700 RPM to about $C_T/\sigma=0.32$ at 7162 RPM. At both fan speeds, the FM of the FIW system is dropped quickly after the fan blade pitch angle reaching above 30°, indicating a possible stall in the FIW system.

Figure 13A:
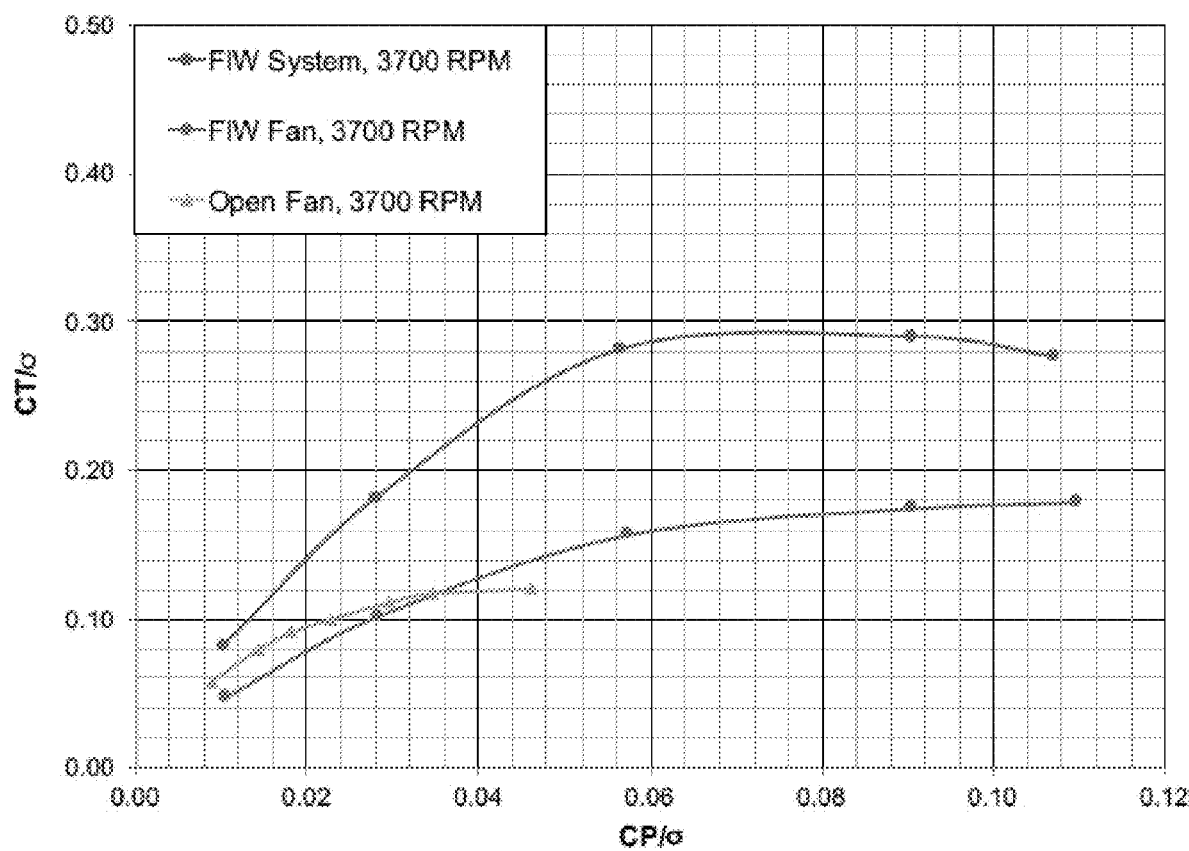
FIGS. 13A-13B: $C_T/\sigma$ versus power coefficient/fan blade solidity ($C_P/\sigma$) for the open fan, FIW fan, and FIW system at 3700 RPM (FIG. 13A) and 7162 RPM (FIG. 13B).
Figure 13B:
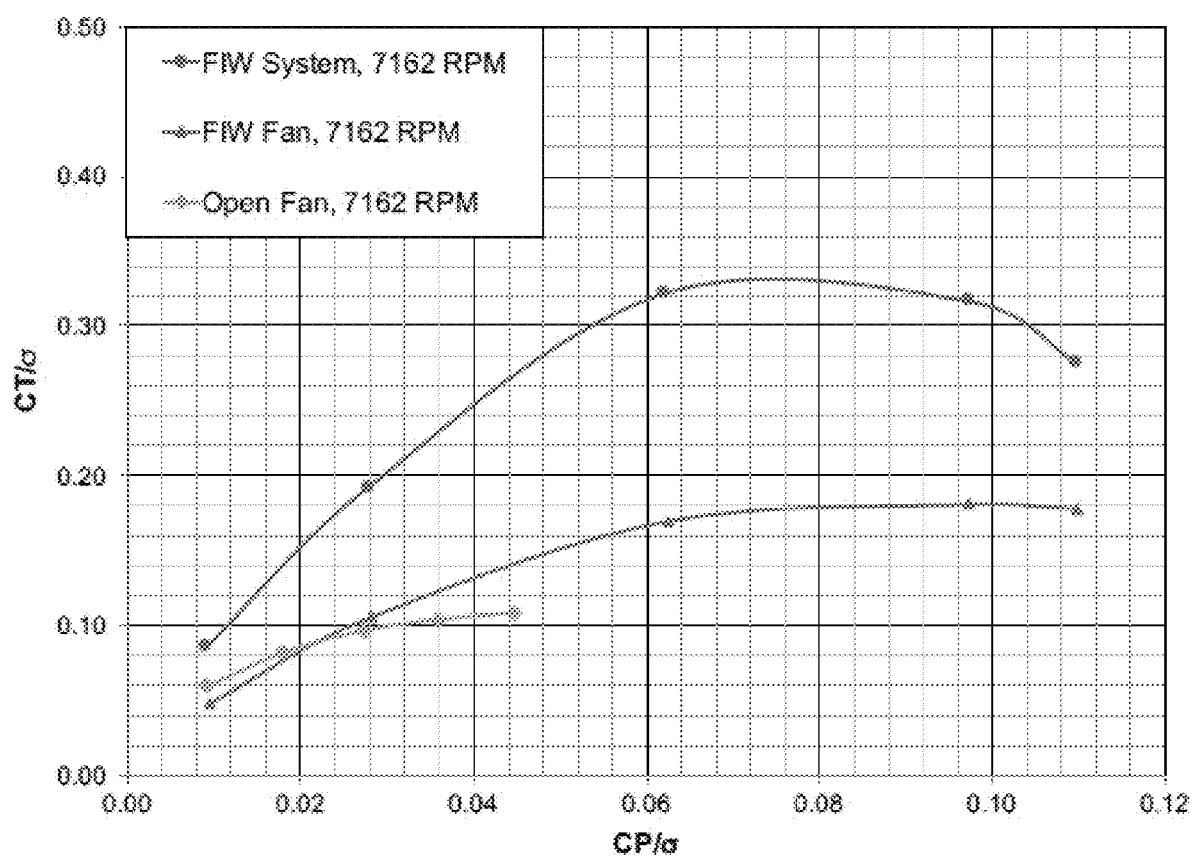
Figure 14A:
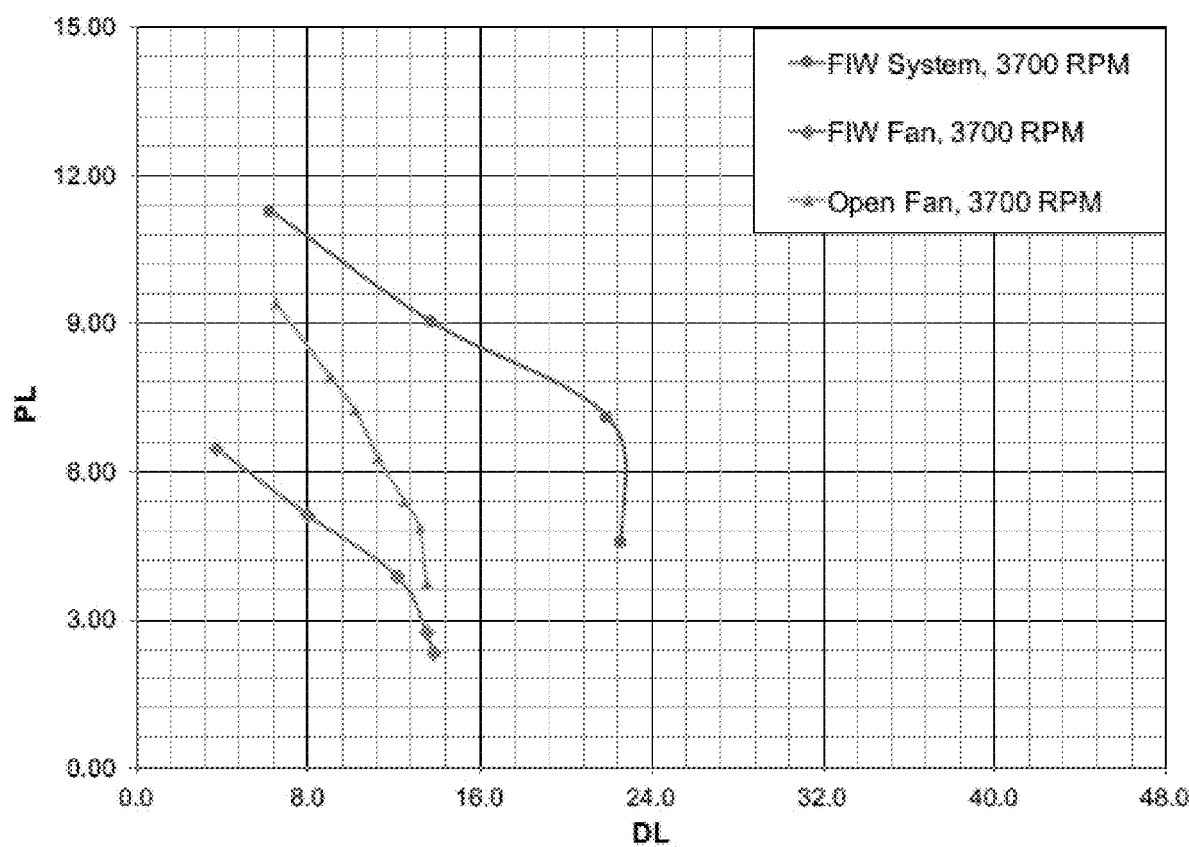
FIGS. 14A-14B: PL versus DL for the open fan, FIW fan, and FIW system at 3700 RPM (FIG. 14A) and 7162 RPM (FIG. 14B).
Figure 14B:
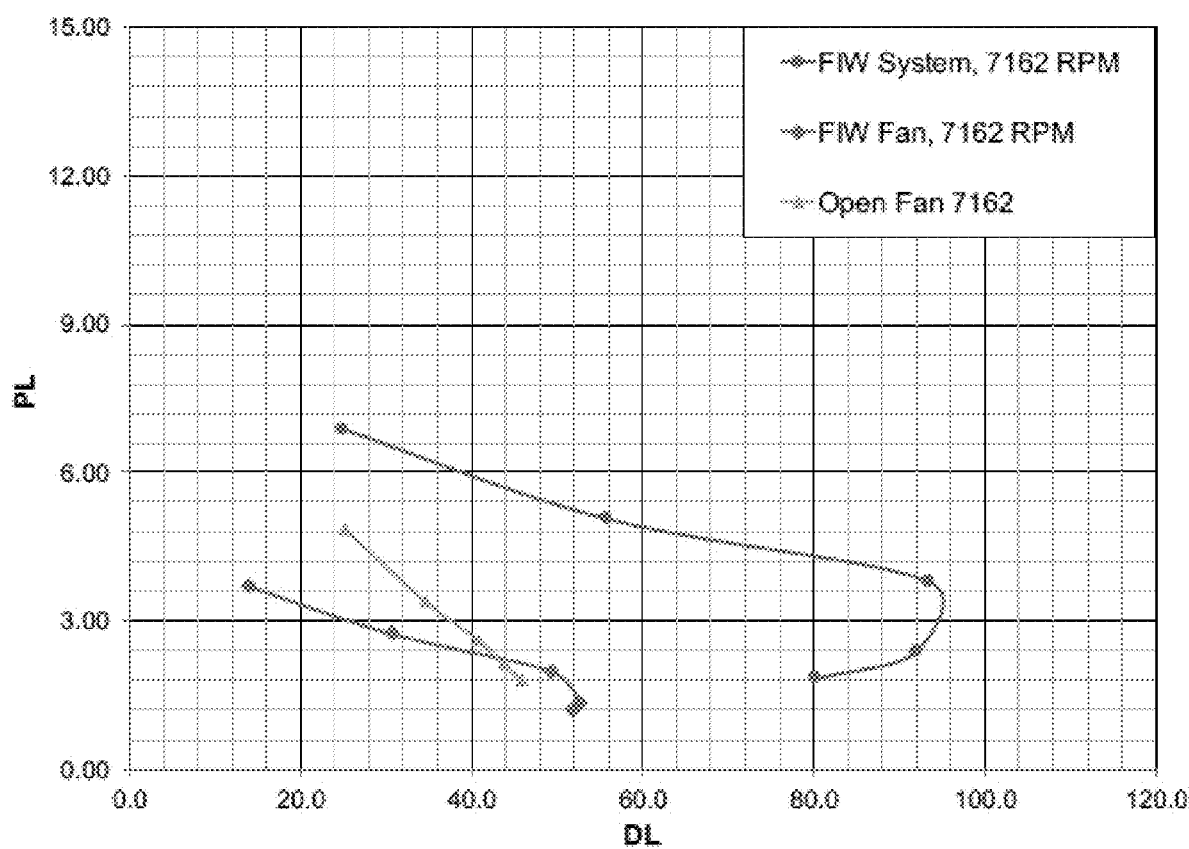

The comparisons of the $C_T/\sigma$ versus $C_P/\sigma$ curves for the open fan, the fan inside FIW, and the whole FIW system are shown in FIGS. 13A-13B. Again, the fan speed does not significantly affect the fan thrust coefficient and power coefficient in the open fan or in the FIW configuration, but does increase the thrust coefficient for the overall FIW system. This indicates that additional thrust gain is mainly generated on the wing surface in hover, and higher RPM corresponds to a higher thrust gain. Interestingly, the fan performance curves are crossed between the FIW configuration and the open fan at some low thrust level (0.02<CT/σ<0.04). This indicates that the aerodynamic performance of the fan blades inside the FIW configuration could be worse than the open fan case at very low thrust levels, although the overall performance of the FIW system is increased.

The basic performance of the open fan, fan inside the FIW configuration, and the whole FIW system can also be characterized by Disk Loading (DL) and Power Loading (PL). DL is a measure of the thrust generated per unit area, and PL is the ratio of thrust over power, which is an indication of the operating efficiency. The general trend is the same for the open fan, the fan inside FIW, and the FIW system, which indicates a reduced PL (low efficiency) as the DL increases. The PL is generally higher at the lower RPM (3700) case than that at the higher RPM (7162) case, indicating that the current FIW configuration operates more efficiently at a lower rotating speed. In both cases, there is a maximum DL corresponding to the maximum thrust level at each RPM, which is about 22.4 psf at 3700 RPM and 94 psf at 7162 RPM. This is roughly 4 times the difference based on the dimensional analysis of the FIW system at two given RPMs.

Effect of Active Flow Control

This Example demonstrates that the active flow control system has outstanding results for the FIW configuration in hover. The baseline performance of the FIW system without the active flow control was obtained and analyzed in the previous section. The active flow control system was applied to the FIW system that was already in post stall, where the recovery of the aerodynamic performance of the FIW system was investigated at both fan speeds. At the low fan speed of 3700 RPM, a number of combinations using steady injection at the duct inlet and steady suction at the duct diffuser were investigated. At the high fan speed of 7162 RPM, only the air suction method was applied at the duct diffuser section in the FIW configuration. While a various amount of mass flows have been tested for air injection along the normal or tangential direction to the duct wall, only a small amount of tangentially injected air was found effective in combination with the air suction at the duct diffuser. The air suction was steadily applied to the suction slots on the duct surface at a much higher mass flow rate, which can be applied independently or combined with tangentially injected air. The option of air suction with the suction exit flow at the duct exit was also investigated, with the purpose of redirecting the same amount of suction mass flow back into the FIW flow field. The strength of the air injection was measured based on the ratio of the injection speed ($V_i$) to the fan tip speed ($V_{tip}$), and the strength of the air suction was measured based on the ratio of the suction speed ($V_s$) to the fan tip speed ($V_{tip}$). The range of the air injection speed was between 0.41 and 0.45 of the tip speed, and the range of the air suction speed was between 0.7 and 1.35 of the tip speed. The air suction speed is directly linked to the suction pressure ($P_s$) applied to the suction slots. Other useful parameters include the ratio of the injection mass flow rate ($M_i$) or the suction mass flow rate ($M_s$) to the duct mass flow rate ($M_{duct}$), as well as the ratio of the suction pressure ($P_s$) to the ambient (atmospheric) pressure ($P_{atm}$). The following Table 3 provides all parameters for the air injection and suction investigated in the current FIW configuration.

TABLE 3

Parameters used for the flow control in the FIW configuration

| Notation | Description | RPM | Pitch | $\dot{M}_i/\dot{M}_{duct}$ | $V_i/V_{tip}$ | $\dot{M}_s/\dot{M}_{duct}$ | $V_s/V_{tip}$ | $P_s/P_{atm}$ |
|---|---|---|---|---|---|---|---|---|
| COM-1 | Injection & suction | 3700 | 38° | 0.007 | 0.126 | 0.060 | 0.70 | 0.97 |
| COM-2 | Injection & suction | 3700 | 38° | 0.007 | 0.126 | 0.078 | 1.00 | 0.92 |
| EXT-1 | Suction & exit | 3700 | 38° | — | — | 0.078 | 1.00 | 0.92 |
| SUC-1 | Suction only | 3700 | 38° | — | — | 0.063 | 0.85 | 0.94 |
| SUC-2 | Suction only | 3700 | 38° | — | — | 0.078 | 1.00 | 0.92 |
| SUC-3 | Suction only | 3700 | 42° | — | — | 0.067 | 1.00 | 0.92 |
| SUC-4 | Suction only | 3700 | 42° | — | — | 0.086 | 1.35 | 0.86 |
| SUC-5 | Suction only | 7162 | 38° | — | — | 0.042 | 0.70 | 0.89 |
| SUC-6 | Suction only | 7162 | 38° | — | — | 0.060 | 0.85 | 0.78 |
| SUC-7 | Suction only | 7162 | 42° | — | — | 0.078 | 0.85 | 0.78 |

Figure 15A:
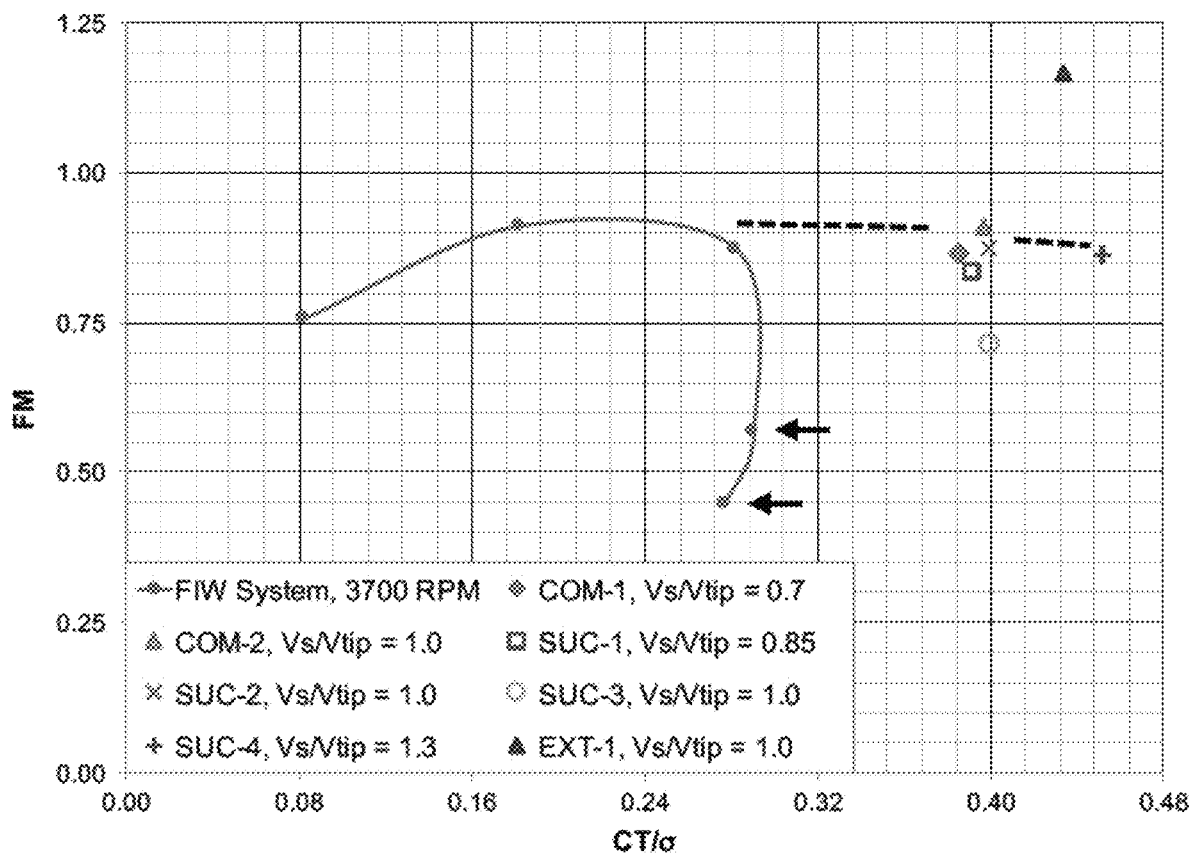
FIGS. 15A-15B: FM versus $C_T/\sigma$ for the FIW system with and without flow control at 3700 RPM (FIG. 15A) and 7162 RPM (FIG. 15B).
Figure 15B:
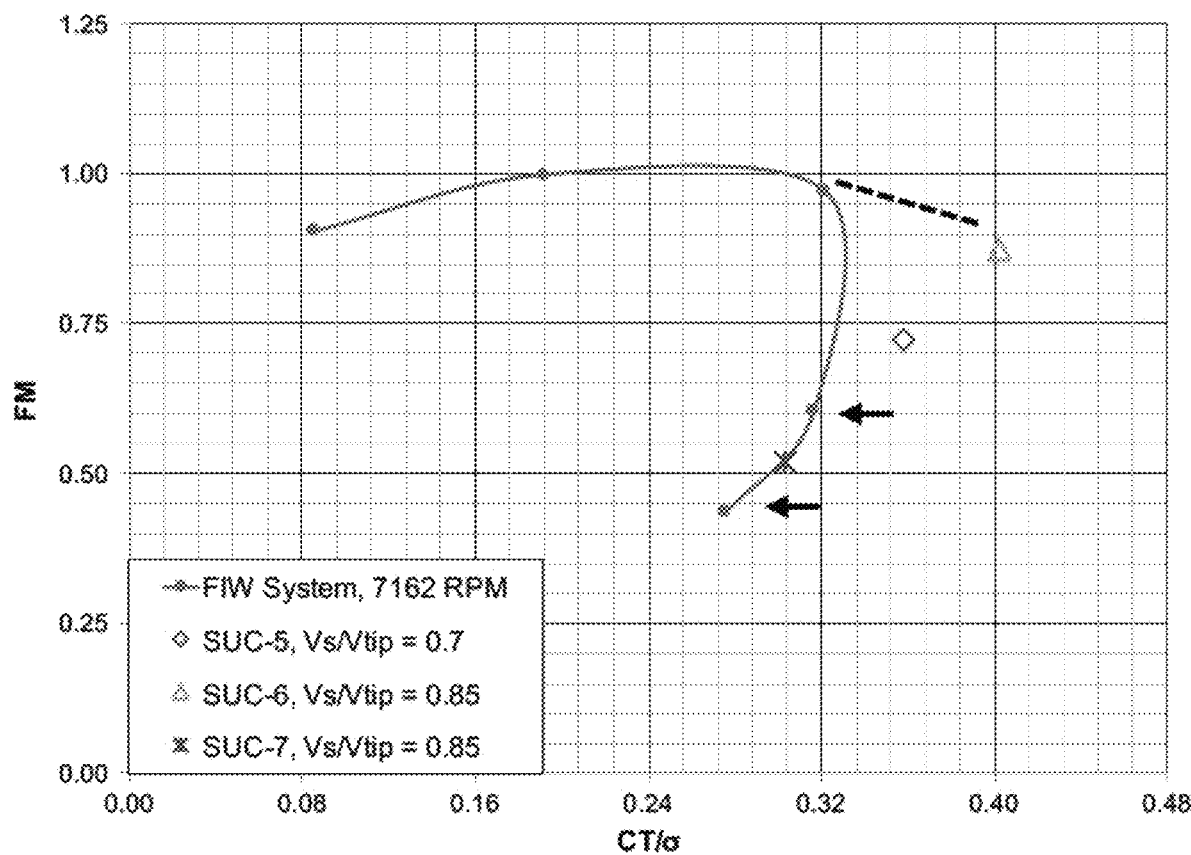

The aerodynamic performance of the FIW configuration using the active flow control scheme is shown in FIGS. 15-17, which were recovered from the previous baseline post-stall solutions at 38° and 42° fan pitch angles without the active flow control (marked by two arrows in the figures). The dashed lines in these figures represent the trend of performance gains using the active flow control. For the low fan speed case at 3700 RPM, the air suction as well as the combined air injection and suction was applied to the FIW system at a 38° fan pitch angle. FIG. 15A shows that the maximum system thrust is significantly increased from a $C_T/\sigma=0.29$ to roughly $C_T/\sigma=0.40$ without suffering from the peak efficiency (FM) loss. This is equivalent to an increase of 38% in the maximum system thrust on the current FIW configuration. The general trend is that a higher suction speed rate ($V_s/V_{tip}$) corresponds to a higher FM of the system. The option of combined air injection and suction (COM-2) with the suction speed equal to the fan tip speed ($V_s/V_{tip}=1$) further improves the overall FM. In particular, the option of air suction with the mass flow directed back to the duct exit (EXT-1) provides the highest FM for the FIW system at this fan pitch angle and RPM. At the fan pitch angle of 42°, an even higher suction speed rate at $V_s/V_{tip}=1.3$ (or the suction power) is needed in order to further increase the maximum system thrust while maintaining at a high level of FM. The peak system thrust is further increased to $C_T/\sigma=0.45$, which is a 55% increase from the maximum baseline performance without using the flow control. However, further increase in the suction speed would cause numerical difficulty in obtaining a convergent CFD solution for the FIW configuration. For the high fan speed case (7162 RPM), a similar trend was obtained by applying the air suction in the FIW system, but the performance gain is only achieved at 38° fan pitch angle. Because of the high tip speed at 7162 RPM, a much lower suction pressure is required to maintain the same suction speed ratio to the tip speed as in the low RPM case. The maximum system thrust using the air suction is achieved at $C_T/\sigma=0.40$, which represents an increase in the maximum system thrust by 25% from the baseline performance at this high fan speed (7162 RPM).

Figure 16A:
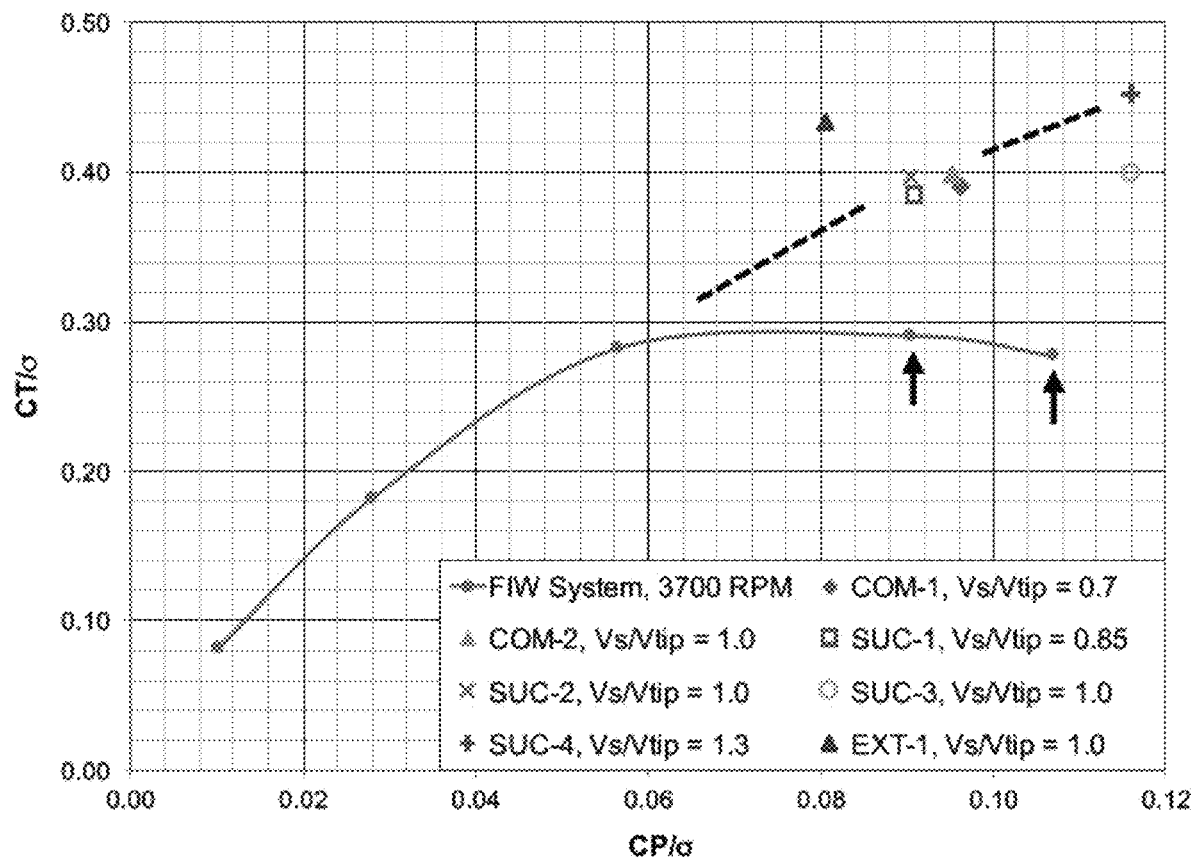
FIGS. 16A-16B: $C_T/\sigma$ versus $C_P/\sigma$ for the FIW system with and without flow control, at 3700 RPM (FIG. 16A) and 7162 RPM (FIG. 16B).
Figure 16B:
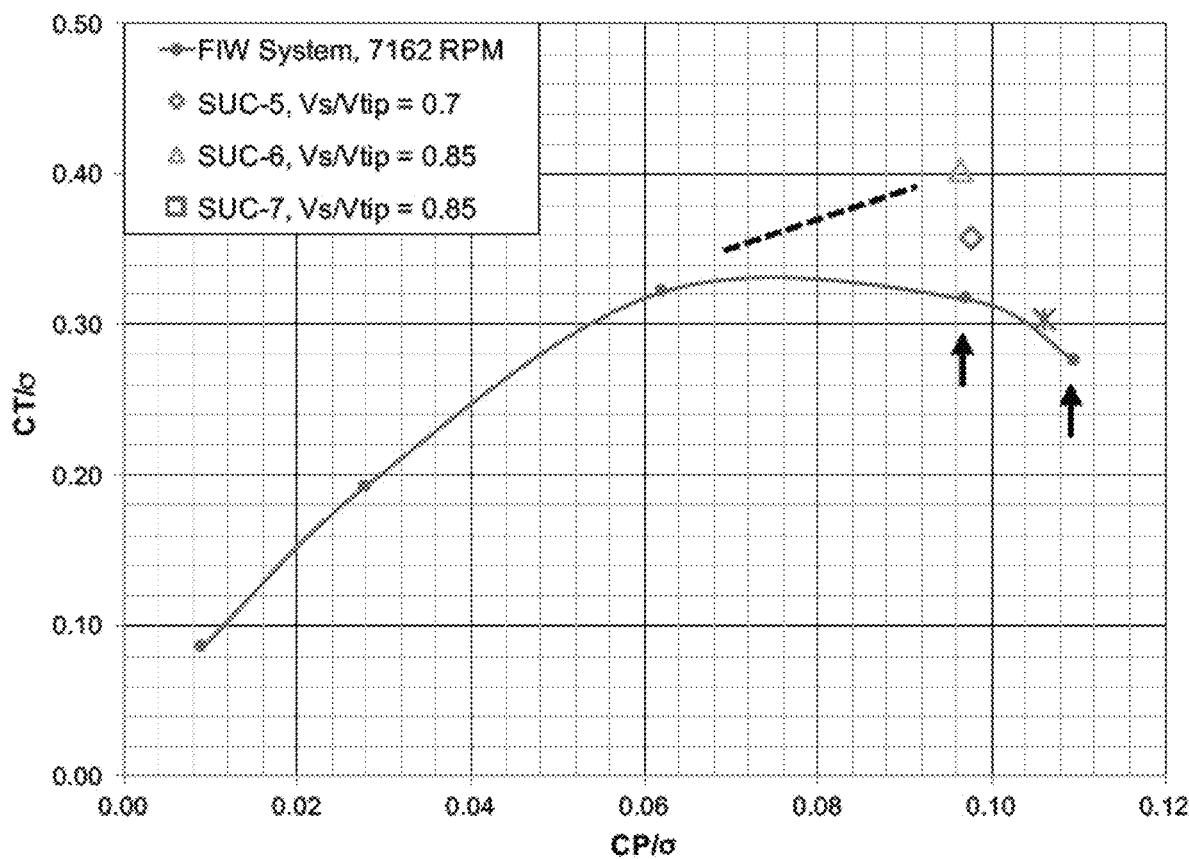

Shown in FIGS. 16A-16B are comparisons of the $C_T/\sigma$ versus $C_P/\sigma$ curves for the FIW configuration with and without using the active flow control. The general trend is that the higher air suction rate, the higher the maximum system thrust, which is true at both low and high fan speeds. The option of air suction with the exit flow directed back to the FIW system shows the largest increase in thrust at the fan speed of 3700 RPM. However, the maximum system thrust using the air suction at the high fan speed (7162 RPM) is less than what was achieved at the low fan speed (3700 RPM). This indicates that the active flow control using air injection and/or suction is more effective in the low fan speed case.

Figure 17A:
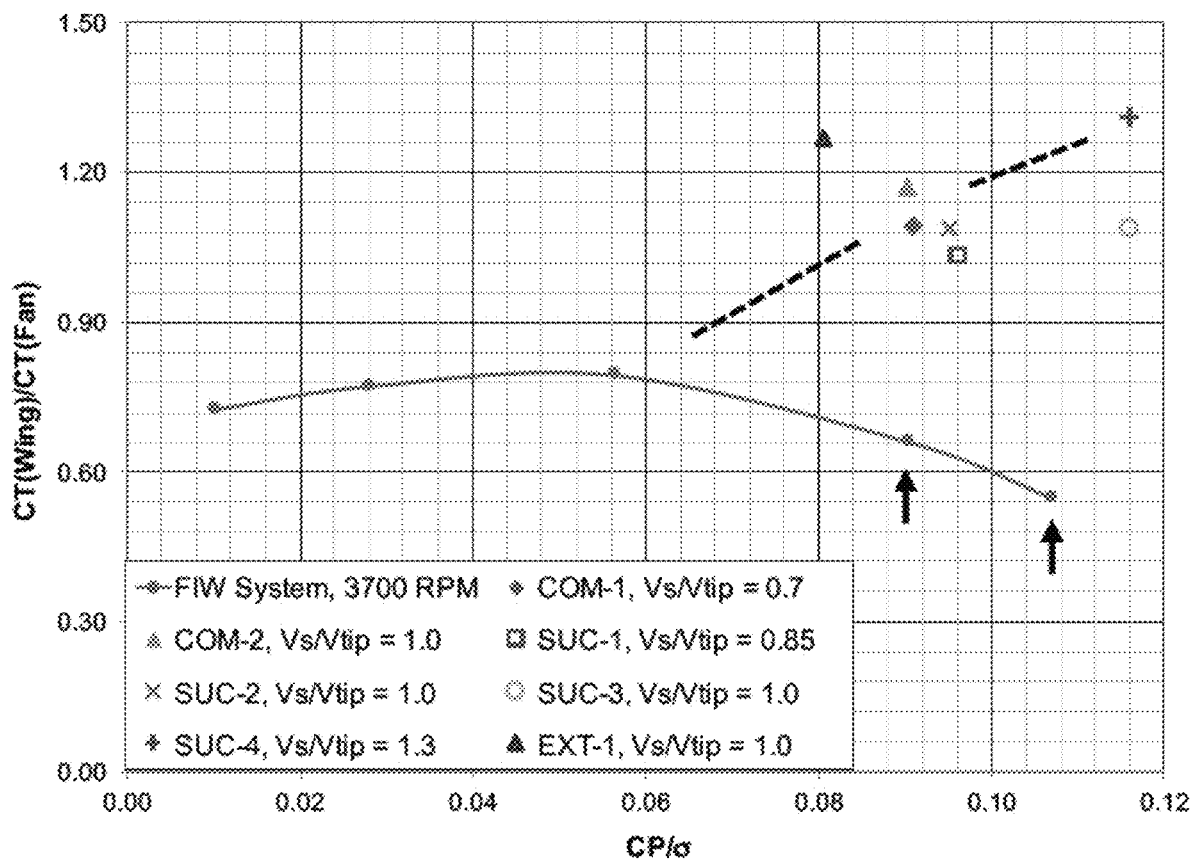
FIGS. 17A-17B: $C_{Twing}/C_{Tfan}$ versus $C_P/\sigma$ for the FIW system with and without flow control, at 3700 RPM (FIG. 17A) and 7162 RPM (FIG. 17B).
Figure 17B:
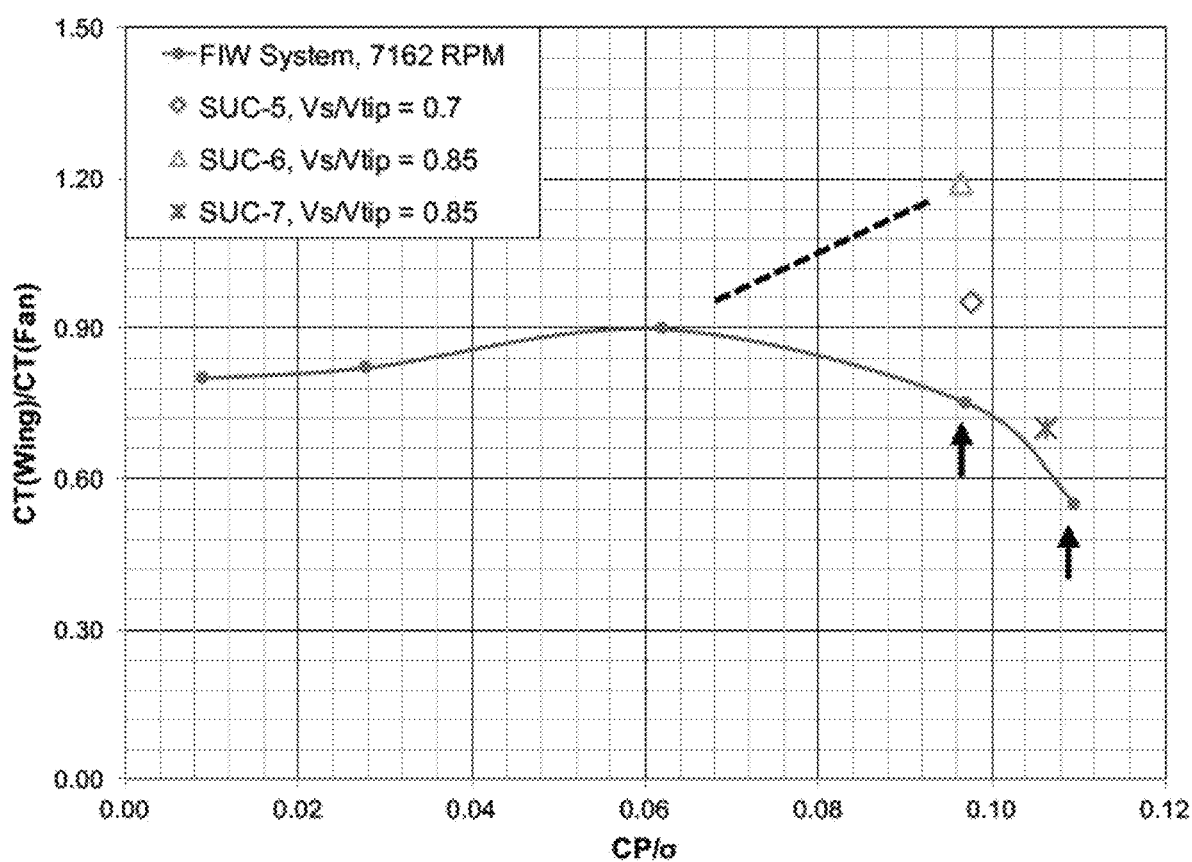

The ratio of the thrusts generated on the fan and on the wing shows the relative contribution of each FIW component to the overall system thrust, which is shown in FIGS. 17A-17B. Without using the active flow control, the maximum ratio is about 0.78 at the low fan RPM and about 0.9 at the high fan RPM. With the active flow control, this ratio is increased to around 1.2 or above, which is higher than the ideal case of 1.0 for the ducted fan or FIW configurations operating in hover without the flow control. The option of air suction with the exit flow directed back to the FIW system shows the largest increase in the wing thrust at the fan speed of 3700 RPM. This directly contributes to the increase of the overall FM for the FIW system, as shown in FIGS. 12A-12B. This shows that the increase in the system thrust is mainly attributed to the increase of thrust on the wing using the active flow control. In other words, the active flow control has a larger impact on the wing or duct performance than on the fan performance.

Mechanism of Active Flow Control

Figure 18A:
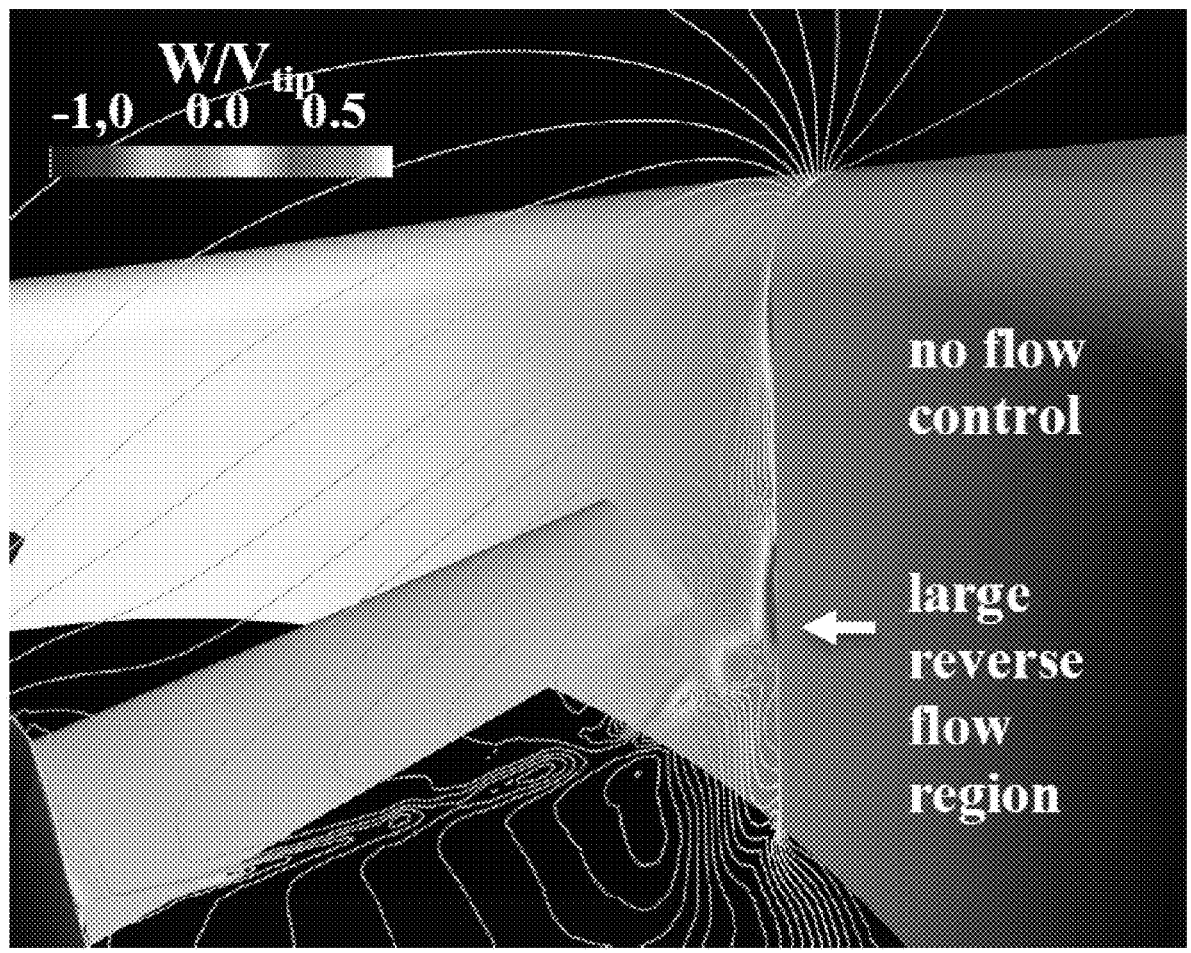
FIGS. 18A-18F: Downard axial velocity for the FIW system with and without active flow control at 38° blade pitch and 3700 RPM.
Figure 18B:
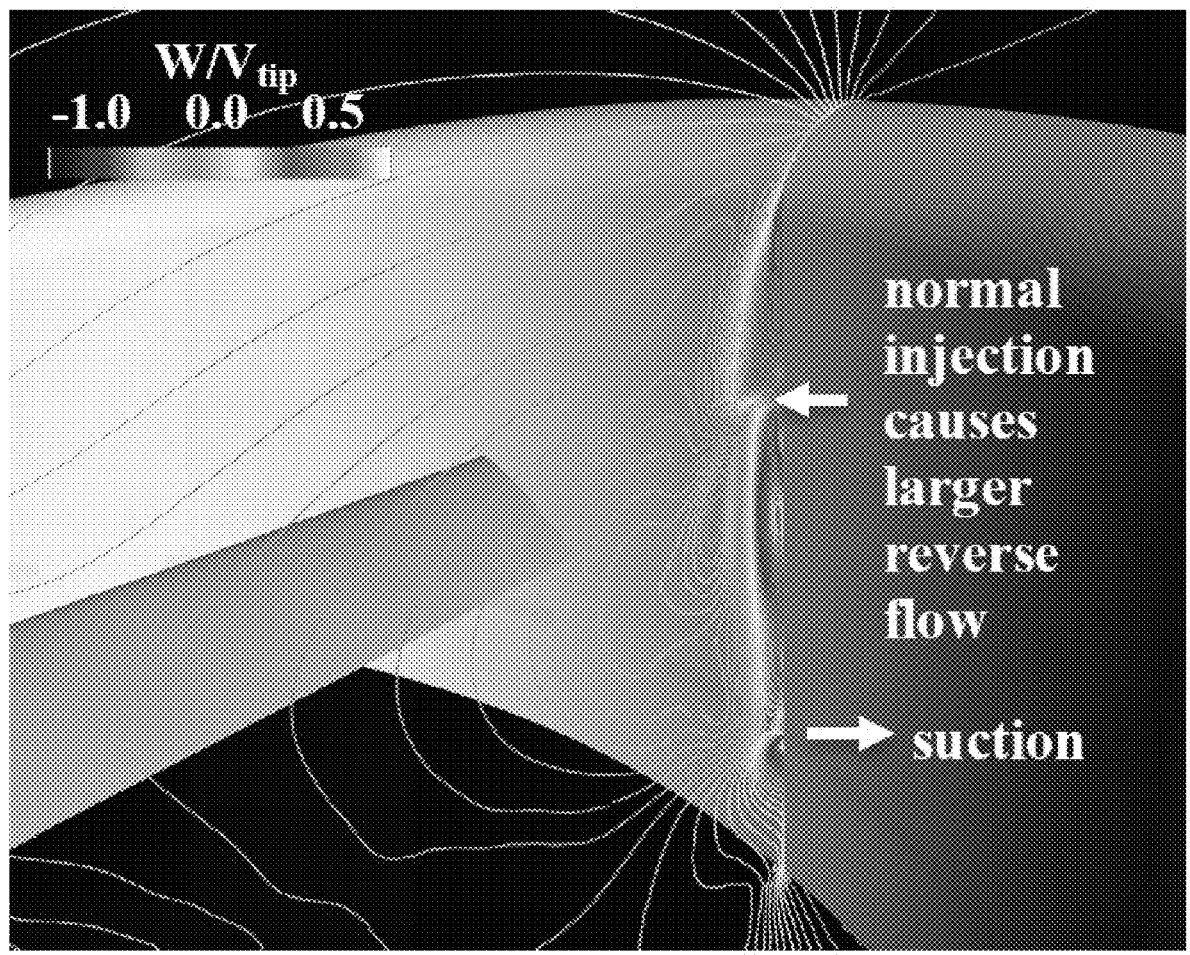
Figure 18C:
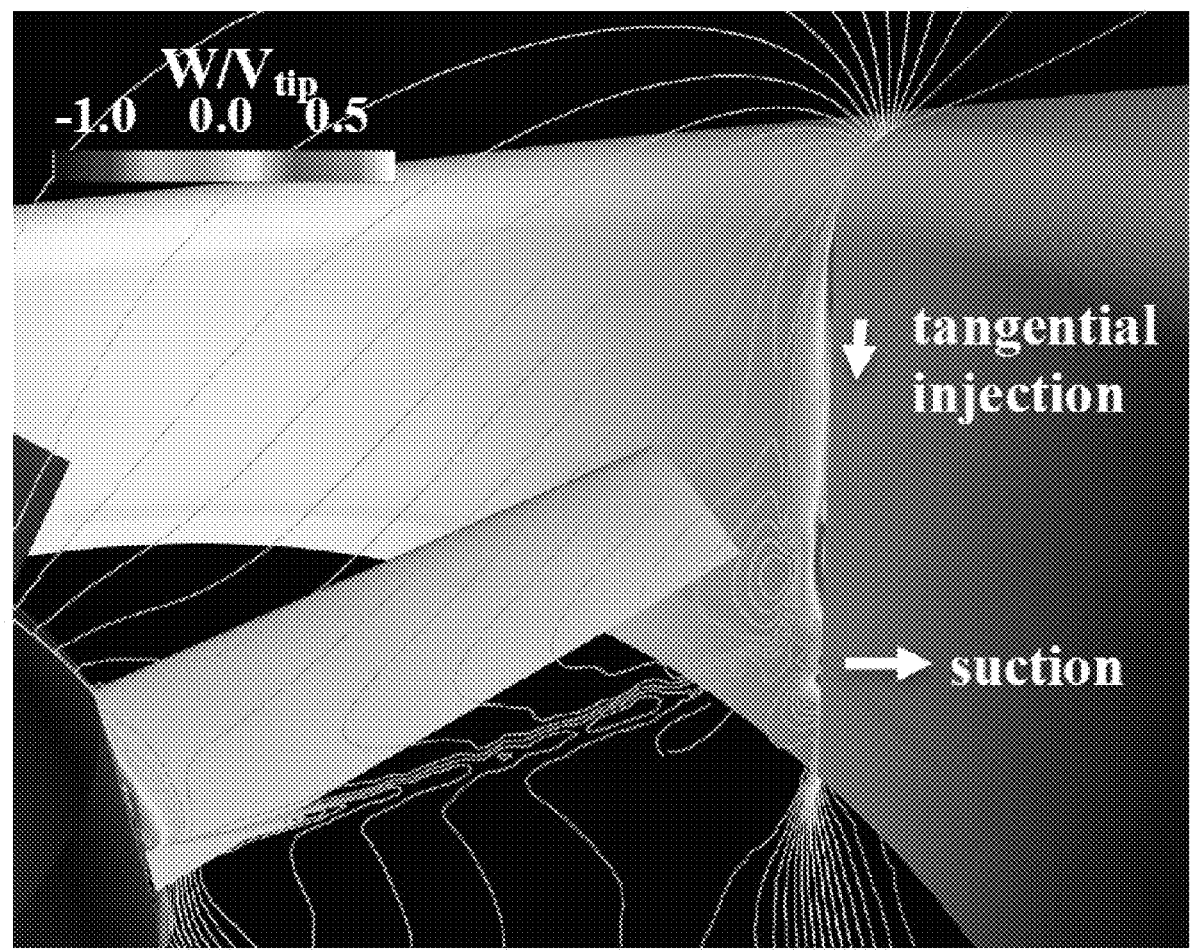
Figure 18D:
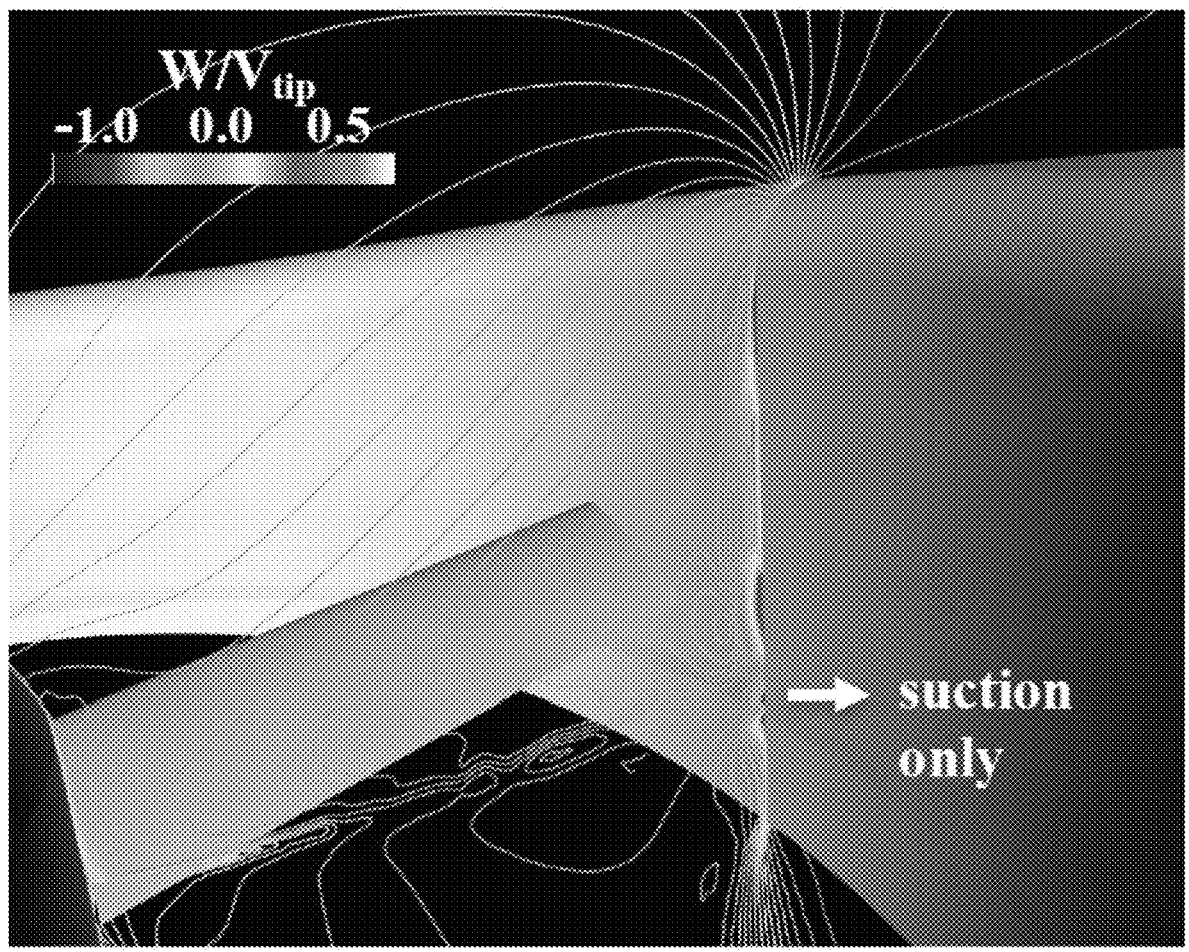
Figure 18E:
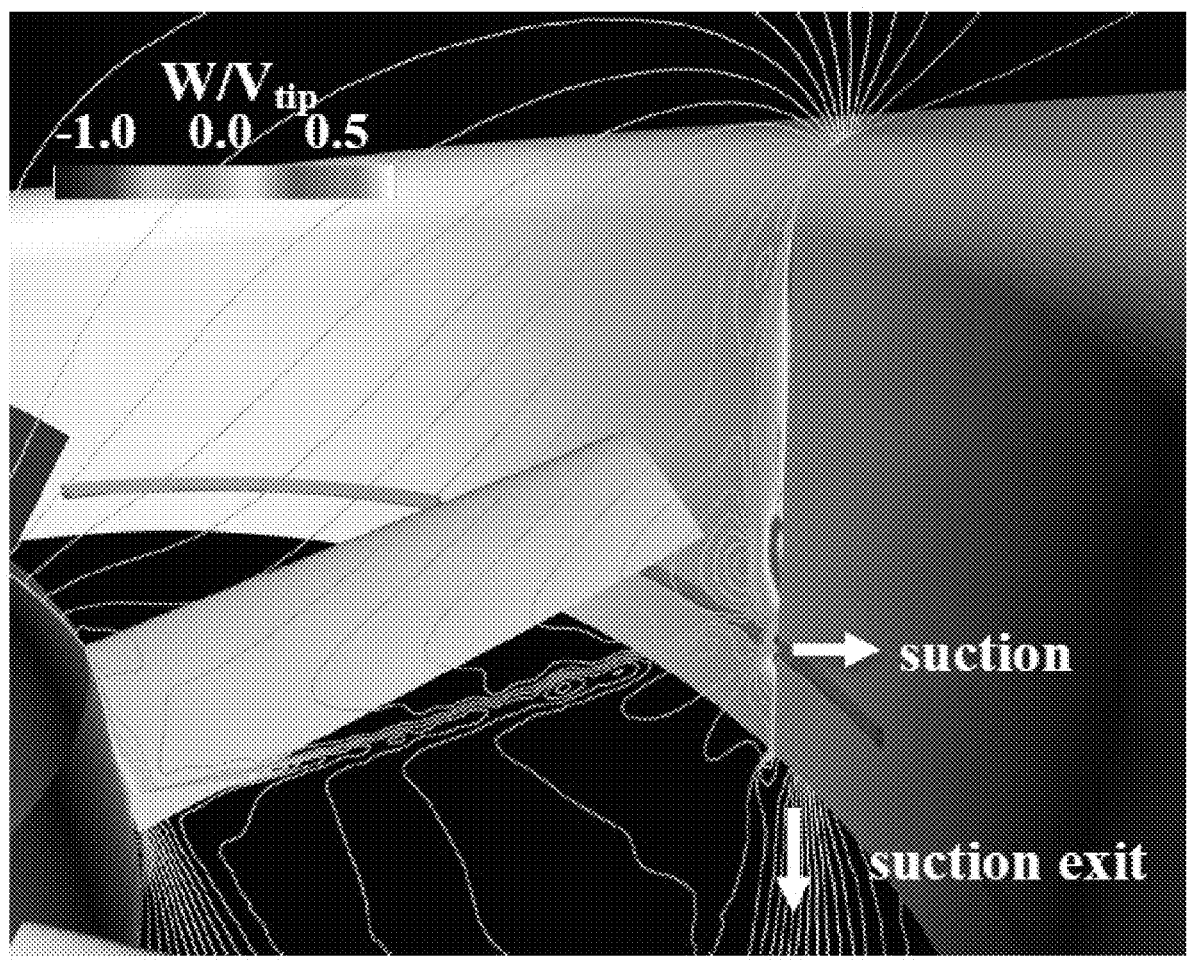
Figure 18F:
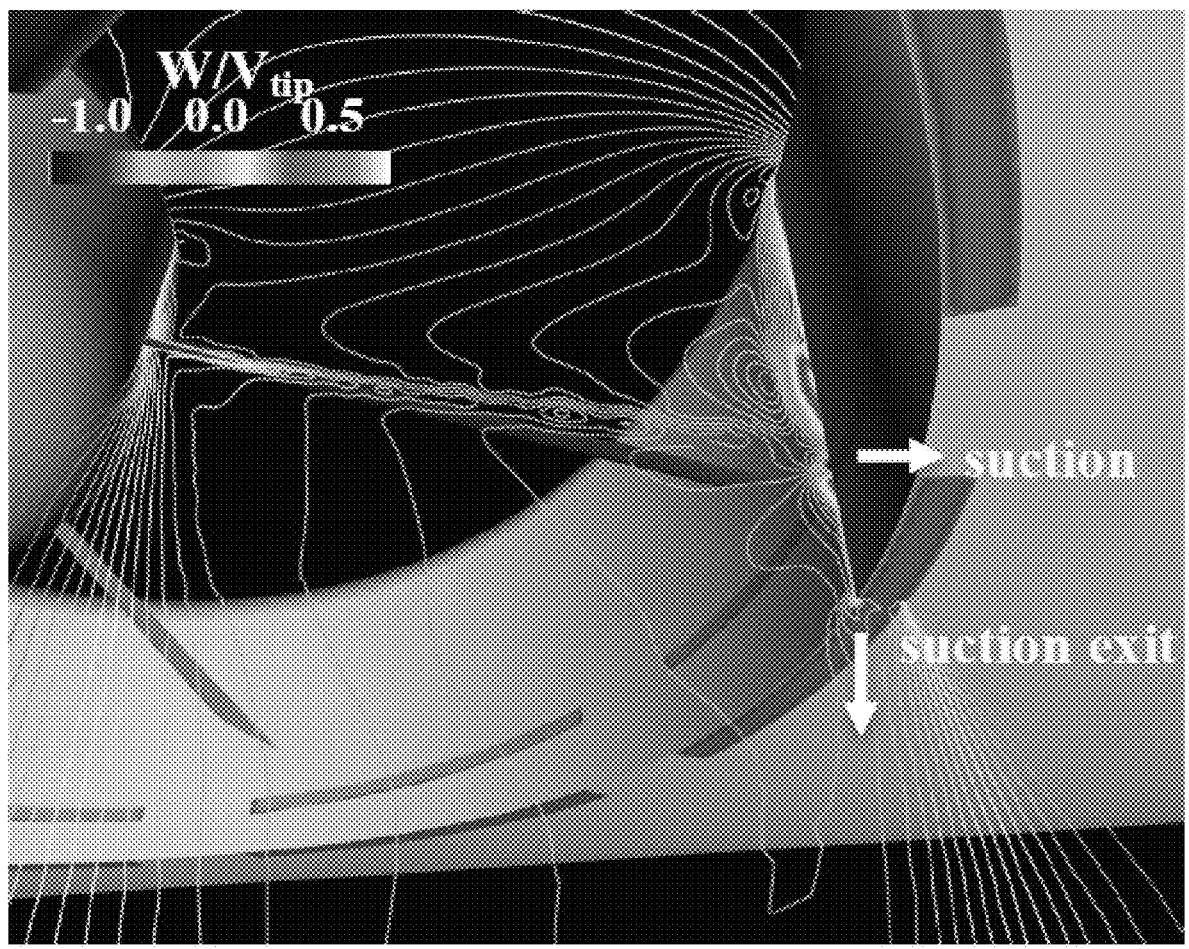

The predicted aerodynamic performance of the FIW system is significantly increased by the active flow control, especially by the air suction applied at the diffuser section of the FIW duct. Without wishing to be bound by theory, this is mainly attributed to the improved flow field by removing or minimizing the reverse flows from the duct passage, which allows more mass flows passing through the duct cross section. As mentioned earlier, there are two areas of concern that may cause the flow separation inside the FIW or ducted fan systems: the duct inlet lip area and the duct diffuser section aft the blade tip path plane. FIGS. 18A-18D show the vertical (axial) velocity contours on a cutting plane through the injection and suction slots in the FIW system at a 38° pitch angle using different flow control options: no flow control (FIG. 18A), combined normal injection and suction (FIG. 18B), combined tangential injection and suction (FIG. 18C), air suction only (FIG. 18D), and air suction with the mass flow directed back to the system at the duct exit (FIGS. 18E-18F). It is seen from FIG. 18A that a large reversed flow is developed in the vicinity of the duct wall if no flow control is used at this fan pitch angle. The air injection in the normal direction to the duct wall (perpendicular to the axial velocity) causes disturbances to the flow field inside the duct, as shown in FIG. 18B, which creates a strong reverse flow region immediately following the injected air stream. The air injection in the tangential direction of the duct helps improve the near-wall fluid momentum, and the best improvement in efficiency is achieved in combination with the air suction in the diffuser section (see FIG. 18C). The air suction only option is sufficient in this case to remove the low momentum reverse flow generated in the vicinity of the duct wall, and thus increase the duct mass flow rate as shown in FIG. 18D. The last option of air suction with the exit mass flow directed back to the duct exit, as shown in FIGS. 18E-18F, further improves the aerodynamic flow field and increases the thrust generated on the wing. With a sufficient suction strength ($V_s/V_{tip}$=1.0), aerodynamic performance of the FIW system in hover can be significantly improved by using the air suction alone or a combination of air suction with the air injection.

Figure 19B:
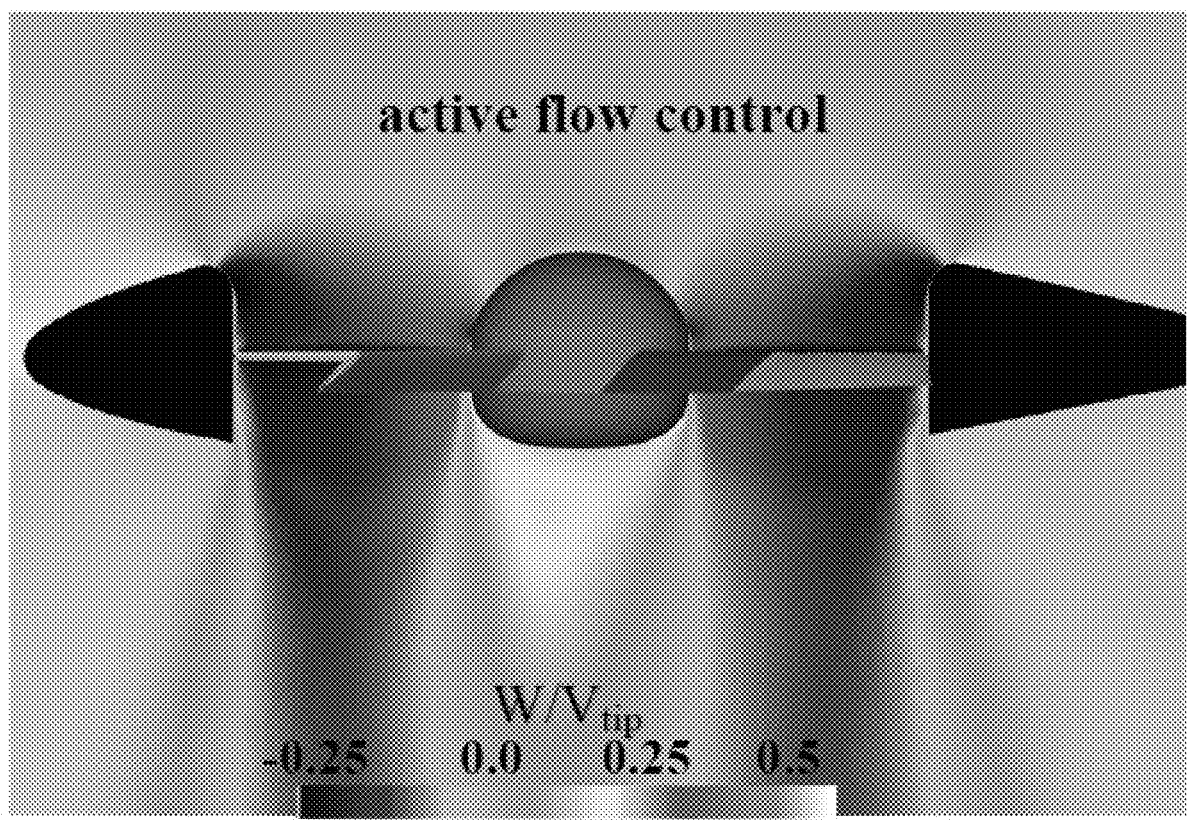
Figure 20B:
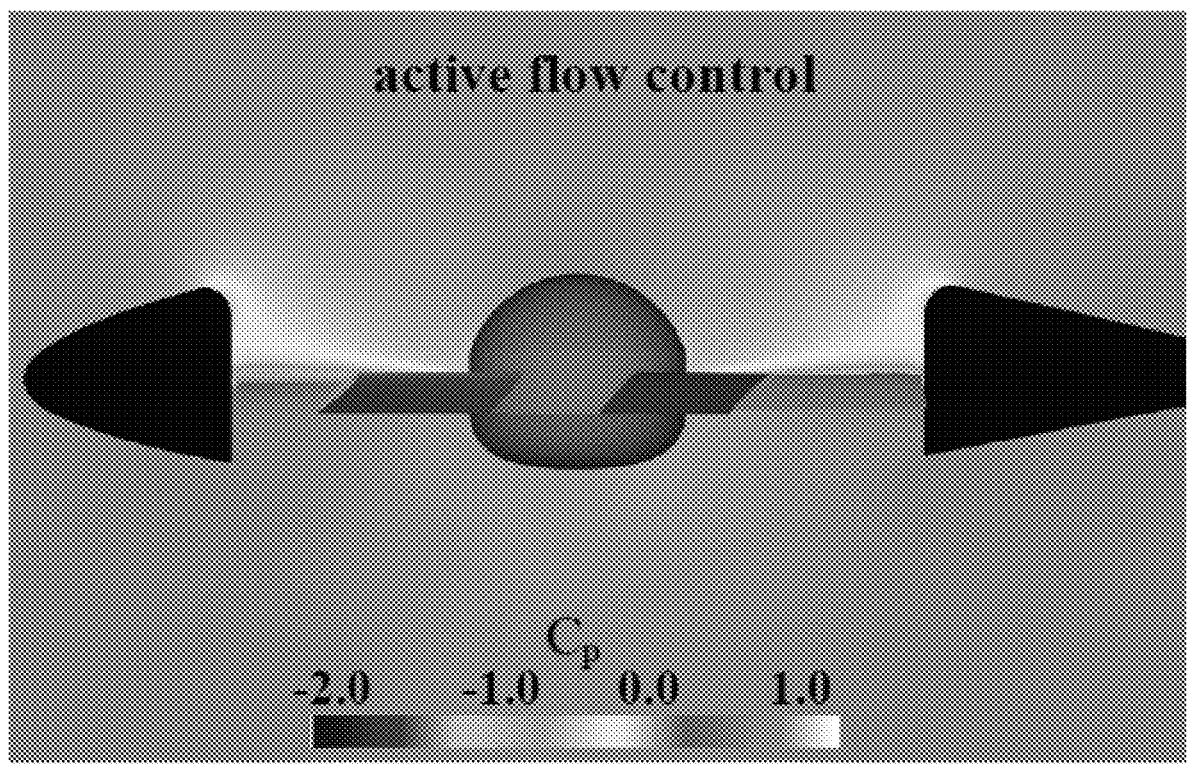

The improved duct velocity using the above flow control strategy significantly increases the mass flow rate that is allowed to pass through the duct cross section, as shown in FIGS. 19A-19B. The enlarged separation zone near the duct wall without active flow control has caused a significant flow blockage to the mass flow passing through the duct, which is the main reason for the reduction of the system thrust and increased power assumption at high thrust levels. With the active flow control using air suction in the duct diffuser section, which extracts the low momentum reverse flows out of the duct area, the duct axial velocity is significantly increased and more mass flow can be passed through the duct cross section. For example, the current computation shows that at the fan speed of 3700 RPM and the blade pitch angle of 38°, the duct mass flow rate is increased from the baseline value of 24 lbm/s without the flow control to a new value of 30.22 lbm/s with the active flow control. This is a 26% increase in the mass flow rate that directly contributes to the 35% increase in the maximum system thrust of the FIW system in hover. The increased duct velocity also increases the suction effect on the wing by the rotating fan, which results in a significantly lower pressure on the duct upper surface, as shown in FIGS. 20A-20B. This effect is most evidence in the option of air suction with the exit mass flow back to the FIW system. The combined effect of increased duct velocity and reduced pressure on the upper wing inlet region results in significantly improved aerodynamic flow inside the FIW system, which translates to a much larger system thrust being generated at relatively high hover efficiency.

Design Considerations

The efficacy of the active flow control system has been demonstrated in the present example using CFD computations, which show that applying the air suction in the duct diffuser section underneath the fan blades is the key to significantly improve the maximum system thrust and hover efficiency of the current FIW configuration in hover. However, this active flow control system comes at the price of an auxiliary power requirement and increased complexity of internal structures in order to accommodate the air injection and suction actuators.

Conclusions

The active flow control system for lift fan devices such as ducted fans and fan-in-wing (FIW) configurations has been numerically investigated for the naval FIW configuration in hover using high-fidelity computational simulations, and validated by the same. The baseline hover performance of the FIW configuration was obtained at two rotating speeds (3700 RPM and 7162 RPM), and the aerodynamic performance was compared with the FIW device using the active flow control over a wide range of thrust levels including post stall. Computational simulations of the FIW configuration indicate excellent results of the active flow control scheme, especially the air suction used in the diffuser section of the duct under the TPP.

The active flow control system has demonstrated a significant effect on improving the maximum system thrust and the aerodynamic efficiency for the current FIW configuration operating in hover. The key to this concept is the air suction underneath the fan blade at a certain location measured by one blade tip chord length below the TPP. The ratio of the suction speed to the fan tip speed should be, but does not need to be, in the vicinity of one in order to obtain an optimal suction effect and improve the system thrust and hover efficiency for the FIW configuration operating in the hover condition. The maximum thrust of the FIW system is increased by 25-55% using the current active flow control for the FIW device operating at 3700 RPM and 7162 RPM without suffering significant penalty in hover efficiency.

Example II—Forward Flight

The active flow control system aims to improve the system thrust and efficiency while reducing the power consumption and nose-up pitching moment for FIW in forward flight. In order to investigate the effect of active flow control on FIW aerodynamic performance, the active flow control strategies described in Example I were evaluated for FIW in forward flight, using several different options.

Figure 29A:
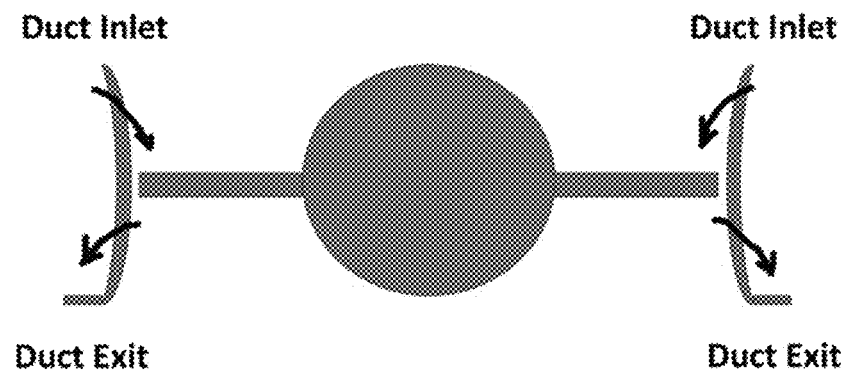
FIGS. 29A-29C: Diagrams of full-annulus air injection-extraction (FIG. 29A), full-annulus air extraction only (FIG. 29B), and full-annulus zero-mass flow extraction (FIG. 29C) for the ducted fan in hover.
Figure 29B:
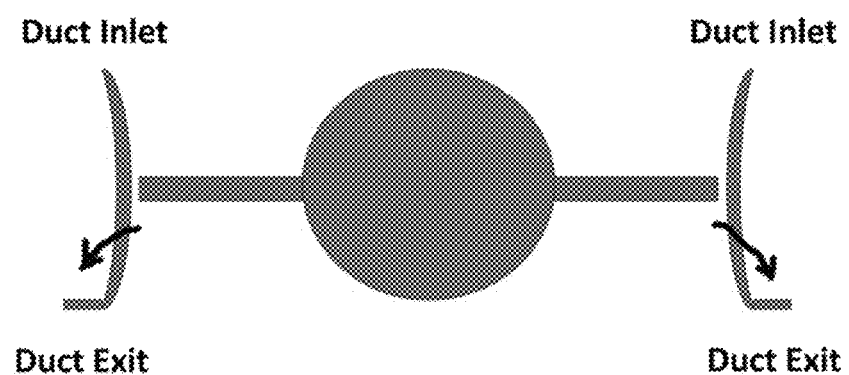
Figure 29C:
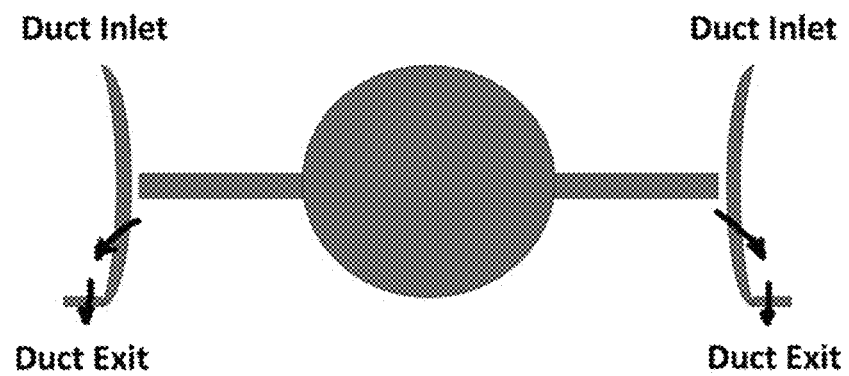

Full-annulus air injection and extraction is an active flow control strategy similar to what was used for FIW in hover in Example I (FIG. 29A-29C). In full-annulus air injection and extraction, air streams are steadily injected from eight slots at the duct inlet section in a full annulus in the axial direction. In addition, air streams are also steadily extracted from eight slots on the duct surface below the fan blades. Two air injection mass flow rates were examined for improving the aerodynamic performance of the FIW system: (a) 0.522 lbm/s and (b) 0.946 lbm/s, which are distributed among eight injection slots above the fan blades. The air extraction rate was fixed at 2.963 lbm/s among eight slots under the fan blades, which were used in combination with the air injections at the above-described two injection mass flow rates. These two options are denoted as Full-Inj-Ext and Full-Inj-Ext 2 in Table 4 (FIG. 28).

Figure 30A:
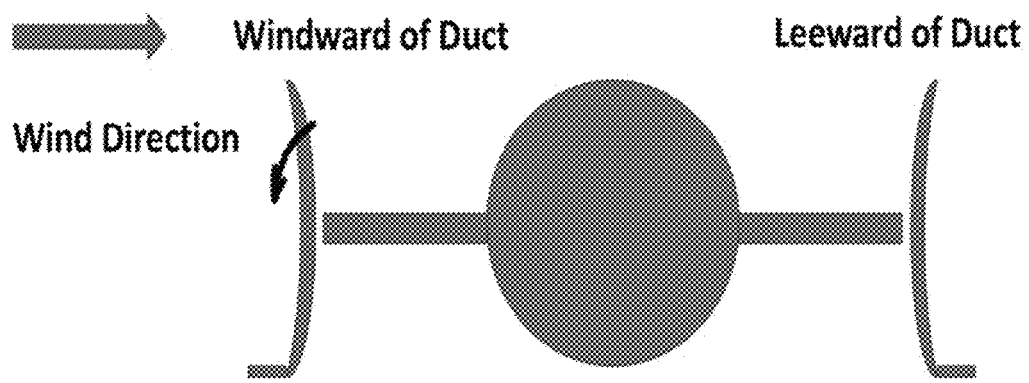
FIG. 30A-30D: Diagrams of semi-annulus up-extraction (FIG. 30A), semi-annulus low-extraction (FIG. 30B), semi-annulus zero-mass flow up-extraction (FIG. 30C), and semi-annulus zero-mass flow low-extraction (FIG. 30D) for the ducted fan in forward flight.
Figure 30B:
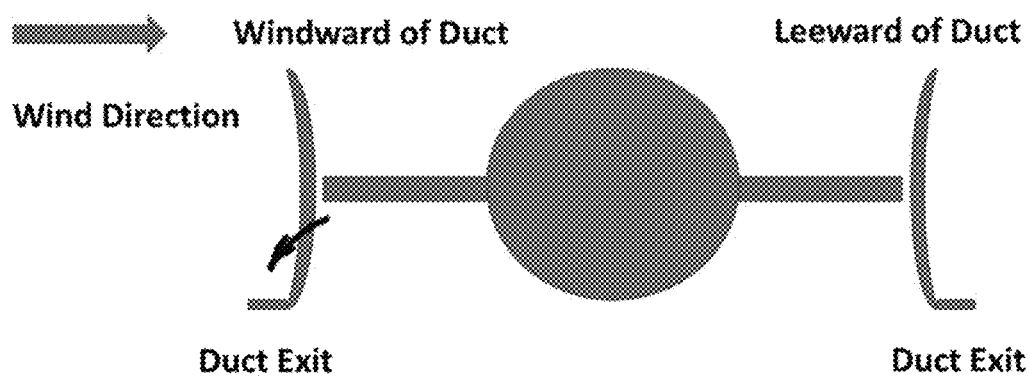

Because the flow separates on the windward side of the duct after turning 90 degrees from the freestream into the duct passage in forward flight, semi-annulus air extraction only was also evaluated (FIG. 30A-30B). This method uses a semi-annulus air extraction on the windward side of the duct to create an imbalanced force for the FIW system. Two air extraction methods were investigated: (a) air extraction from the upper four slots on the windward side of the duct (FIG. 30A), and (b) air extraction from the lower four slots on the windward side of the duct (FIG. 30B). In both semi-annulus extraction methods, the total extracted mass flow rate was 1.778 lbm/s. This flow control option results in a non-zero net mass flow, which is placed outside the FIW system. These two active flow control options are denoted as Semi-Up-Ext and Semi-Low-Ext in Table 4 (FIG. 28).

Figure 30C:
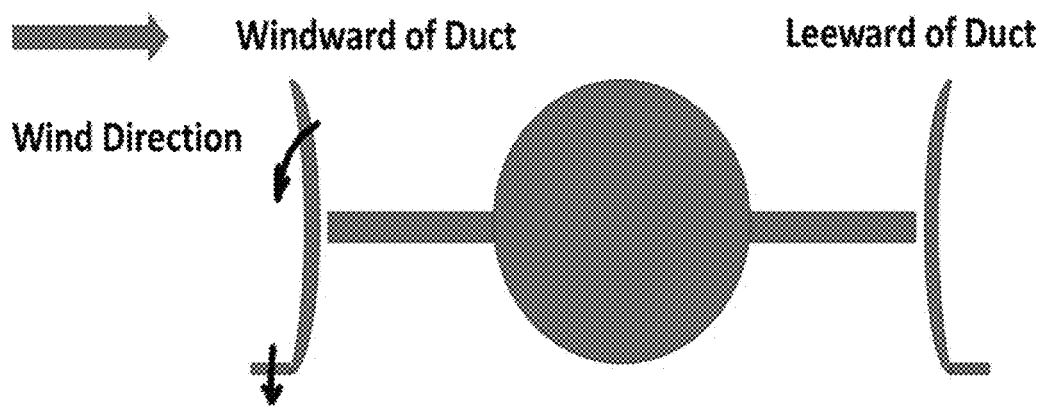
Figure 30D:
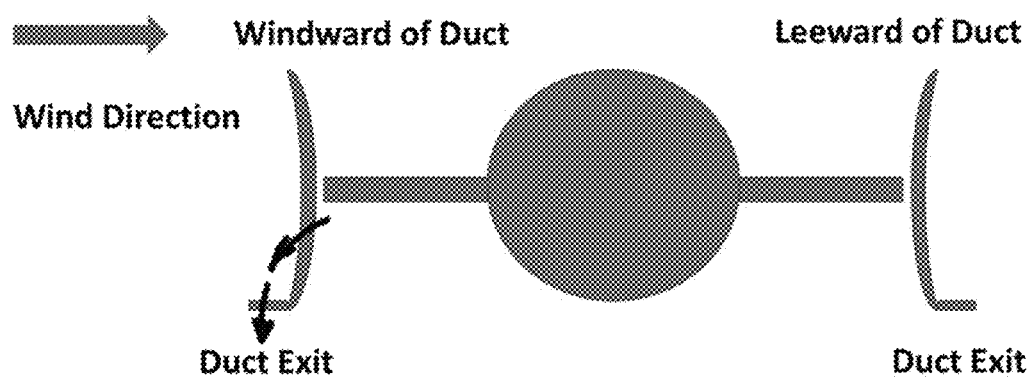

In order to avoid the complexity of directing the extracted fluids from the duct to the outside of the FIW system, semi-annulus air extraction with zero-net mass flow was also evaluated (FIG. 30C-30D). This active flow control strategy extracts fluids from the duct inner surface and directs them to the exit of the duct passage to form a zero-net mass flow method, similar to the one implemented for FIW in hover in Example I (FIG. 29C). However, in semi-annulus air extraction with zero-net mass flow, the air extraction and redirection fluid are implemented on the windward side of the duct only instead of full annulus in the FIW system in hover. Two semi-annulus options with the zero-net mass flow were evaluated: (a) air extraction from the upper four windward slots (FIG. 30C), and (b) air extraction from the lower four windward slots (FIG. 30D). In both options, the same mass flow rate of 1.778 lbm/s was extracted from the duct passage, which was directed into the exit of the duct on the same windward side to form a zero-net mass flow control strategy. These two active flow control options are denoted as Semi-Up-Zero and Semi-Low-Zero in Table 4 (FIG. 28).

Computational Method

A high-fidelity, three-dimensional, unsteady time-accurate Reynolds-averaged Navier-Stokes CFD code U$^2$NCLE was used to investigate the aerodynamic performance of the FIW configuration in forward flight. The solver uses a finite-volume, fully unstructured grid topology to simulate both internal and external viscous flows involving dynamic relative motions, such as rotorcraft, turbomachinery, and ducted fan or FIW configurations. The system of the governing equations is written in a conservative flux formula using primitive variables. The inviscid flux is calculated using a second order Roe flux scheme. The viscous flux is calculated with a second order directional derivative method. The system of equations is solved using an implicit Newton's method with a second order temporal accuracy, where Newton's method is used to march the nonlinear system of equations and Gauss-Seidel relaxations are used to solve the linear system of equations at each Newton's iteration. The viscous turbulent effect is modeled with the Spalart-Allmaras turbulence model, where the Langtry and Menter's local correlation-based transition model is integrated into the turbulence model in order to capture the transitional flow phenomenon in the FIW system.

In order to investigate the efficacy of the active flow control concept for improving the aerodynamic performance of FIW in forward flight, the same computational modeling techniques developed to mimic the air injection and suction in hover were applied here in forward flight, including a boundary condition method and a source term method. The boundary condition method specifies the total flow conditions such as total pressure and total temperature, as well as the injection direction into the duct wall. The source term method offers the advantage of injecting flows with a certain amount of mass, momentum, and energy in any direction specified. For the air extraction modeling, a mass flow boundary condition is specified at the suction slots under the fan blade TPP. These computational techniques are integrated into dynamic relative motion grids in order to investigate the unsteady aerodynamic interaction of FIW in forward flight using the active flow control strategy.

Computational Mesh

A series of computational meshes using mixed unstructured elements were generated for the FIW configuration at four different blade pitch angles, including 14, 22, 30, and 38 deg. The mesh size is about 20 million nodes and 58 million cells for the entire FIW system including a six-bladed rotating fan and a stationary wing. An overview of the mesh point clustering around the fan blades and the wing is shown in FIG. 10A on a cutting plane through the fan hub centroid. A tip clearance between the blade tip and the duct wall is meshed by the boundary layer type of mesh, as shown in FIG. 10B. A y+ value of one is used for all solid surfaces in order to capture the viscous effects such as laminar, turbulent, or transitional flow. In order to investigate the relative motion and unsteady interaction between the rotating fan and the stationary wing, a dynamic sliding method based on an interpolation procedure was used. This sliding grid method requires at least two CFD volume grids built with different tags, one as rotating and another as static. There is a common interface between the rotating and static volume grids, as shown in FIG. 10A, where phantom cells are built within the partner volume grid dynamically at each time step during the time marching iterations. Information between two volume grids is exchanged at the common interface between the rotating and the static volumes, where the data at the phantom cells are interpolated based on most current data in the surrounding physical cells using a parallel interpolation procedure. The computational overhead is about 10% for exchanging information between relative motion grids.

Results

Computational simulations for FIW in forward flight are performed using high performance computing Linux clusters, where the CFD meshes are decomposed into 128 blocks for parallel executions. A minimum time step is used corresponding to one degree of the fan azimuthal angle per time step, where three Newton iterations are used at each time step and six to eight Gauss-Seidel relaxations are used at each Newton iteration. These parameters are based on the standard practice of the U$^2$NCLE solver in simulating the unsteady aerodynamic problems. The FIW aerodynamic performance is investigated with and without using the above active flow control to provide quantified assessment about the current flow control strategy on lift fan devices in forward flight. Quasi-steady forces and moments are converged in about 20 fan revolutions for the baseline FIW simulations. However, a low frequency oscillation was discovered for the FIW system thrust in forward flight when semi-annulus active flow control strategy was applied. Therefore, simulations up to 60 fan revolutions were performed for the FIW system in forward flight using the active flow control. The low frequency oscillatory behavior of the FIW thrust and pitching moment in forward flight are discussed below.

Baseline Forward Flight

The baseline aerodynamic performance in forward flight was first investigated in order to gain an understanding about complex flow physics in the FIW configuration. The aerodynamic performance data evaluated include blade loading coefficient ($C_T/\sigma$), power loading coefficient ($C_P/\sigma$), propulsive efficiency (VT/P), and pitching moment ($CM/\sigma$) versus the fan pitch angle, which were computed at 14, 22, 30, and 38 deg. The same fan rotational frequency of 3700 rpm and an advance ratio of 0.3355 were applied to all simulation cases.

Figure 32A:
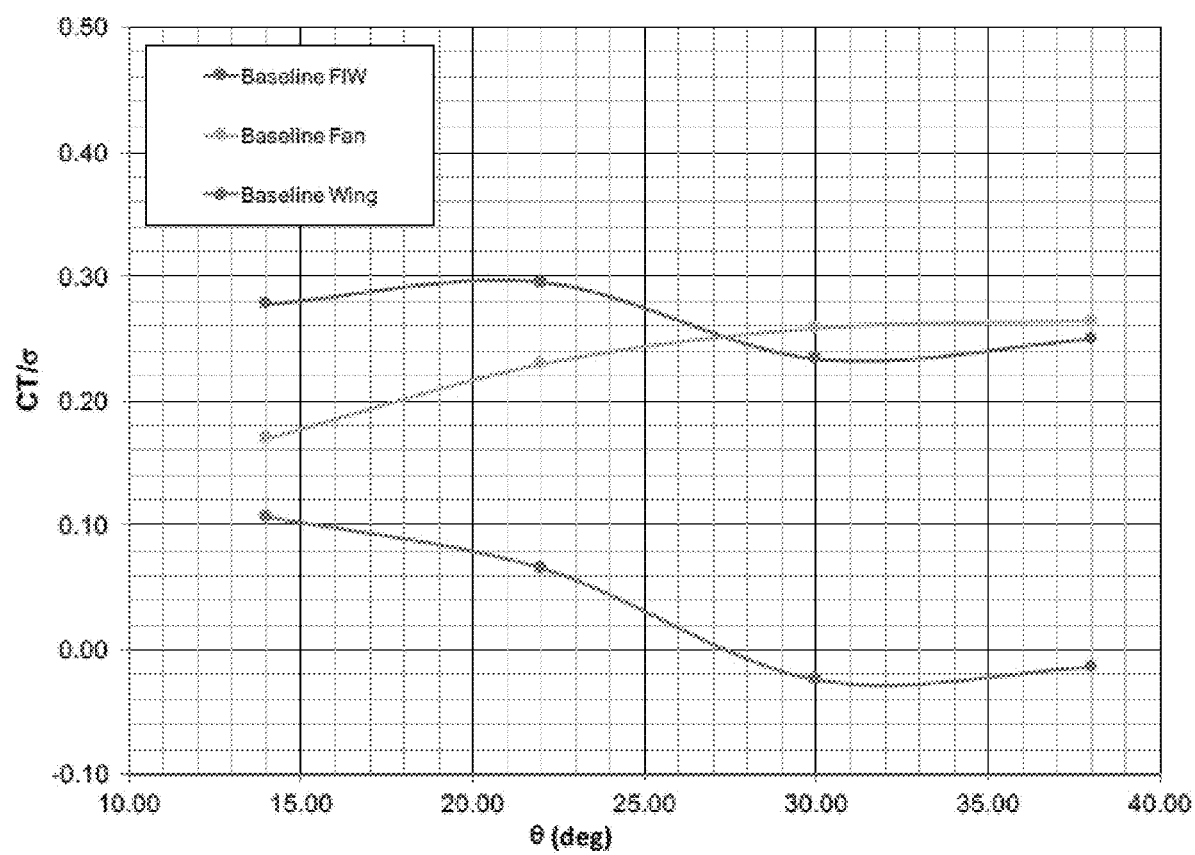
FIGS. 32A-32B: Predicted thrust loading ($C_T/\sigma$, FIG. 32A) and power loading ($C_P/\sigma$, FIG. 32B) coefficients for FIW in forward flight.

Unlike the FIW in hover, the majority of the FIW thrust in forward flight is produced by the fan and almost no thrust is produced by the wing. This is clearly seen in FIG. 32A for the computed $C_T/\sigma$ versus fan pitch angle (θ) for the FIW system baseline case without the active flow control. It shows that the fan thrust increases with the increase of the fan pitch angle. However, the wing thrust decreases as the fan pitch angle increases. This is because the higher the fan pitch angle, the higher turning angle of the fluids after exiting the fan duct. The minimum thrust of the wing occurs at θ=30 deg. Overall, the maximum FIW system thrust occurs around the fan pitch angle of 22 deg. The overall trend of the FIW system thrust is determined by the behavior of the wing, indicating that potential gain in the FIW system thrust could be achieved by improving the wing thrust in forward flight.

Figure 32B:
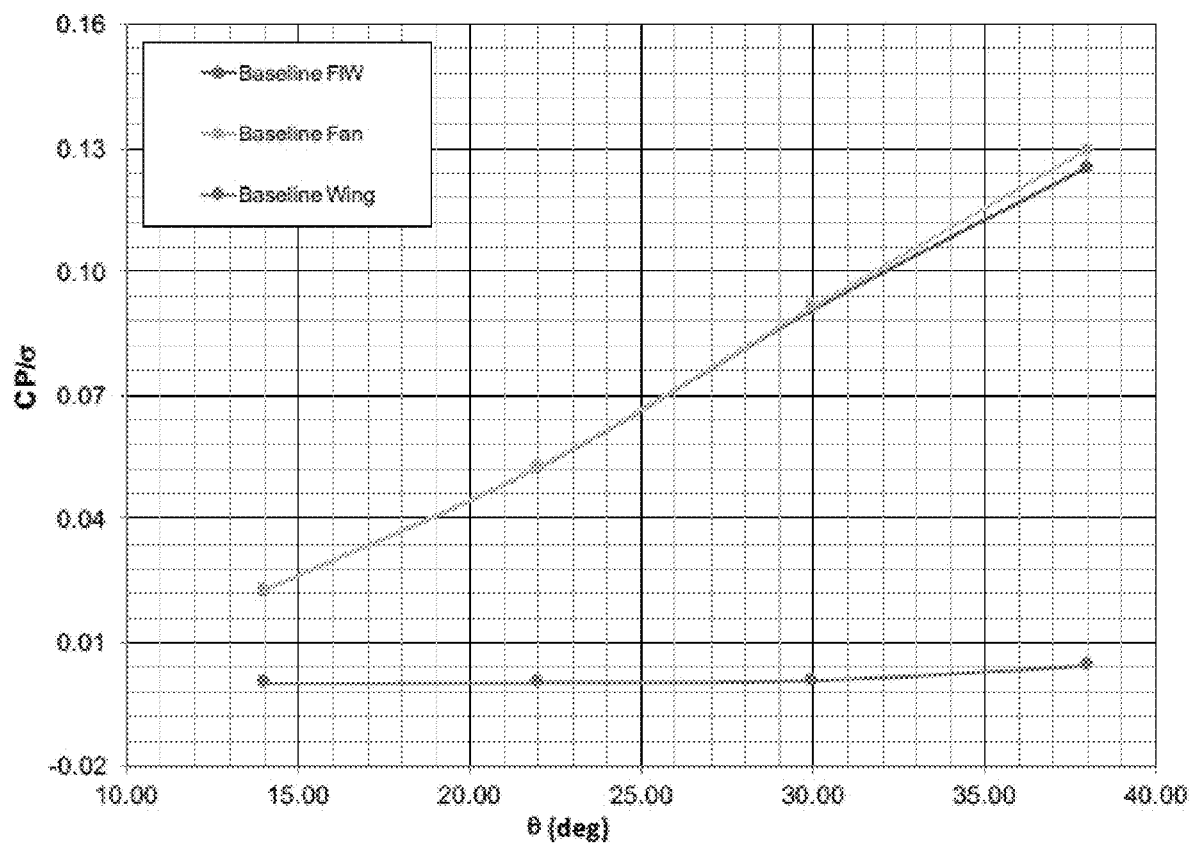

The power consumption in the FIW system is mainly used to drive the fan blades. At the same fan pitch angle, the power consumption of the fan in forward flight is significantly higher than that in hover condition. This is because the fan blades experience a higher effective pitch angle in forward flight than that encountered in hover, resulting in increased power requirements. The computed FIW power consumption ($C_P/\sigma$ versus θ) is shown in FIG. 32B, which is increased linearly with the increase of the fan pitch angle. Because the FIW power consumption is primarily caused by the fan blades, both fan and FIW powers follow closely with each other. There is no significant change in the trend of the FIW power as the fan pitch angle increases.

Figure 33A:
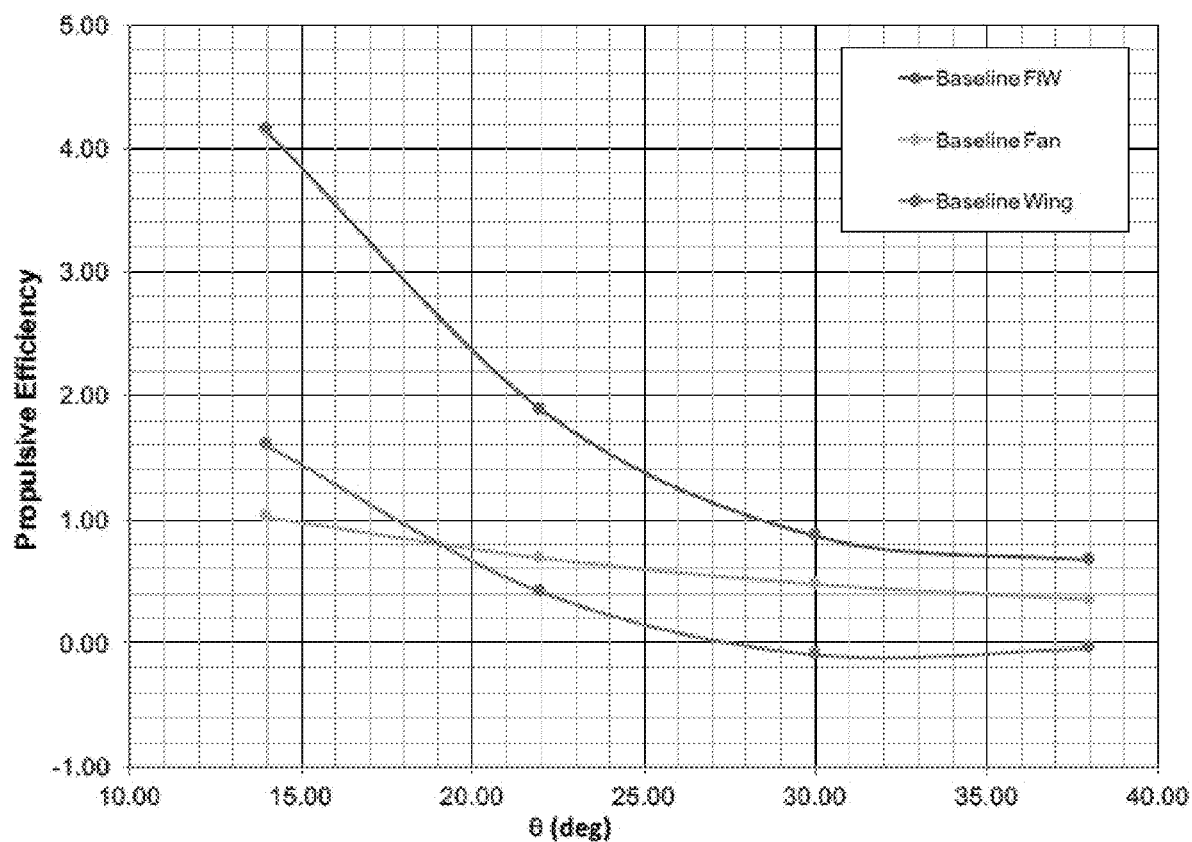
FIGS. 33A-33B: Predicted propulsive efficiency (FIG. 33A) and pitching moment ($C_M/\sigma$, FIG. 33B) for FIW in forward flight.

The propulsive efficiency (TV/P, where T is thrust, V is forward speed, and P is the fan power consumption) is a measure of the thrust generated by the FIW system at unit power consumption for a given forward flight speed, which is shown in FIG. 33A. It shows a decreased propulsive efficiency in both fan and wing, as well as the FIW system, with the increase of the fan pitch angle. However, the reduction rate in propulsive efficiency is higher at the low fan pitch angles, and becomes nearly flat at the high fan pitch angles (>30 deg). It should be noted that the propulsive efficiency of the wing is calculated based on the power generated by the fan, since the wing does not consumes power. Because of the overall reduction trend of the propulsive efficiency, the optimal aerodynamic performance of the FIW system should not be solely based on propulsive efficiency, but include other parameters such as thrust as well.

Figure 33B:
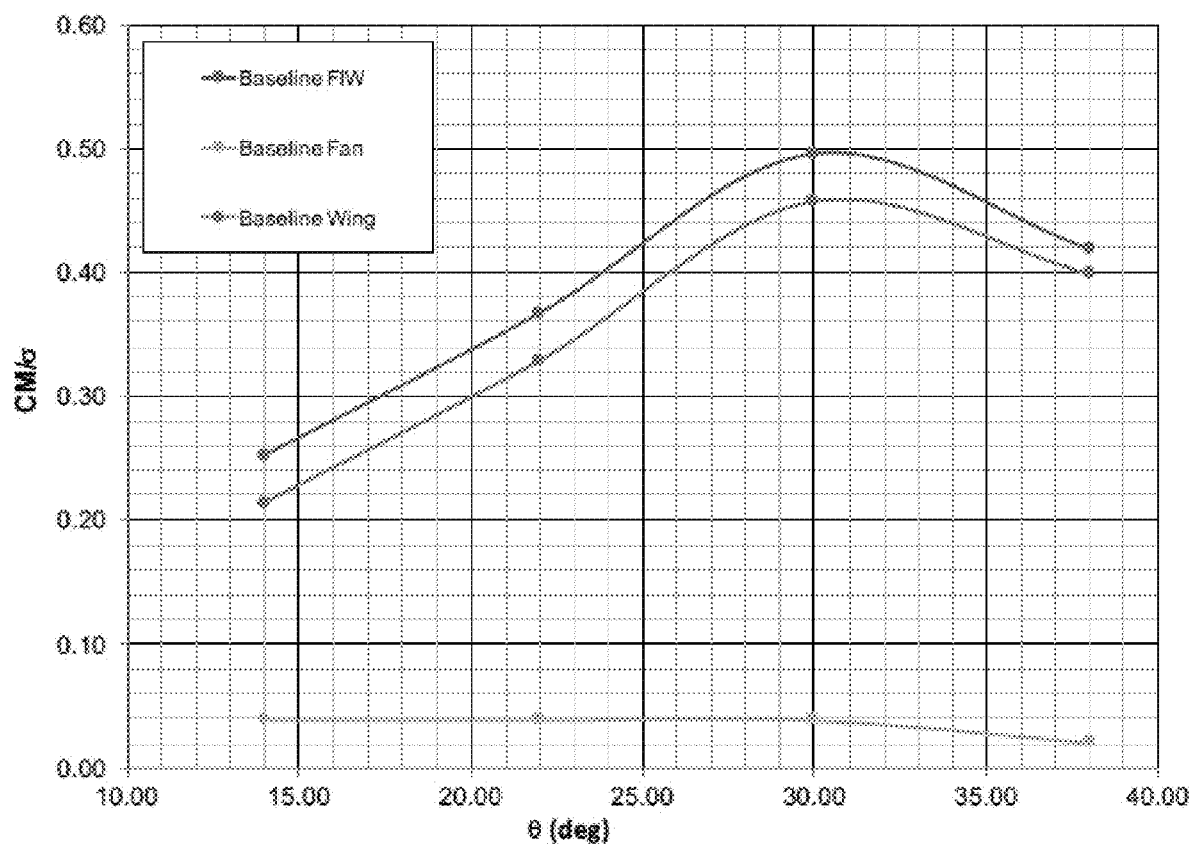

A noticeable side effect of the FIW configuration in forward flight is the nose-up pitching moment, which reduces the control stability of the FIW system during forward flight operations. This nose-up pitching moment is created due to imbalanced pressure forces generated on the windward and leeward sides of the duct and wing surfaces. Shown in FIG. 33B are the pitching moments computed on the fan, the wing, and the overall FIW system. Because a large portion of the nose-up pitching moment is produced by the wing and not by the fan, the pitching stability of the FIW in forward flight can be improved by balancing the aerodynamic forces on the wing only.

Aerodynamic Performance

The FIW system in forward flight experiences an adverse flow environment with the freestream turning 90 deg from the horizontal to vertical directions through the FIW duct. As a result, there is a large disparity between the thrusts produced by the fan and by the wing in forward flight. Unlike the FIW in hover, the majority of the FIW thrust in forward flight is produced by the fan and almost no thrust is produced by the wing. Therefore, any significant improvement of the FIW thrust should come from the wing.

Figure 34:
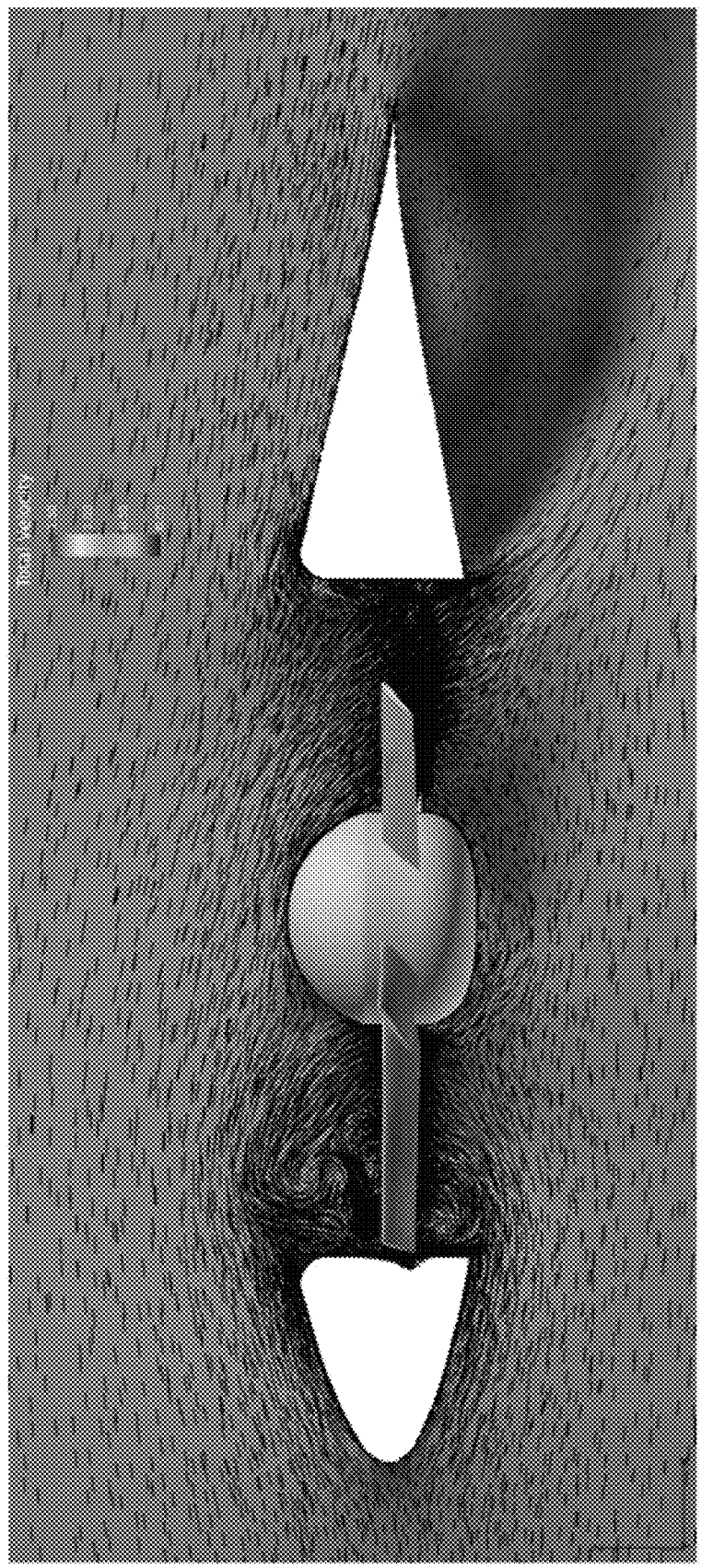
FIG. 34: Computed velocity field for the baseline FIW in forward flight, θ=38 deg.
Figure 35:
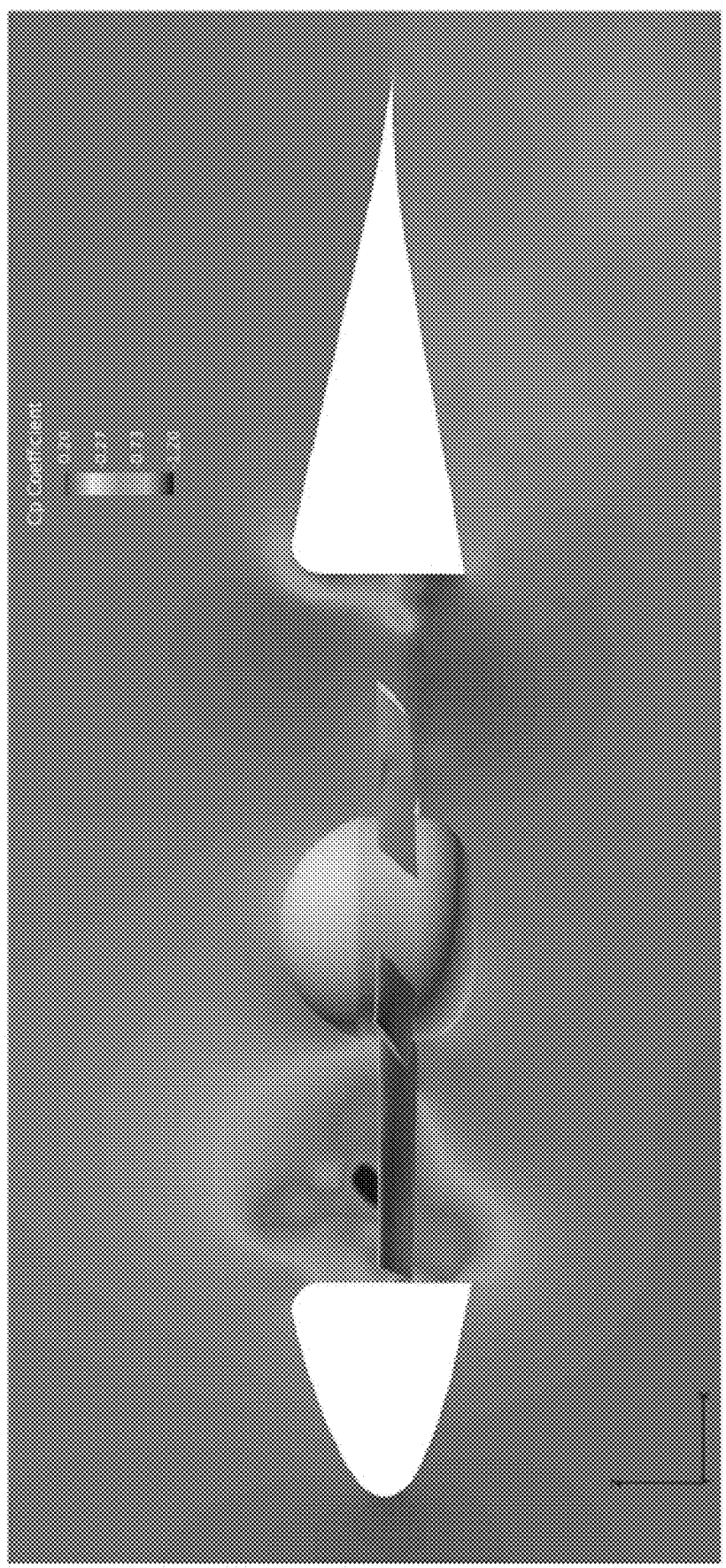
FIG. 35: Computed pressure field for the baseline FIW in forward flight, θ=38 deg.

Shown in FIG. 34 is the velocity vector field calculated for the baseline FIW configuration at 38 deg of the fan pitch angle, where the color contours indicate the velocity magnitude. It shows that large flow separations are developed at the windward side of the duct, both above and below the fan blades. Minor flow separations are also seen at the duct leeward side before entering the duct passage. The flow turns into the horizontal direction quickly after exiting the duct passage. The flow separations at the duct inlet cause significant flow blockage into the duct passage, resulting in a large thrust loss on both fan and wing in forward flight, as shown in the pressure coefficient contours in FIG. 35.

Figure 36:
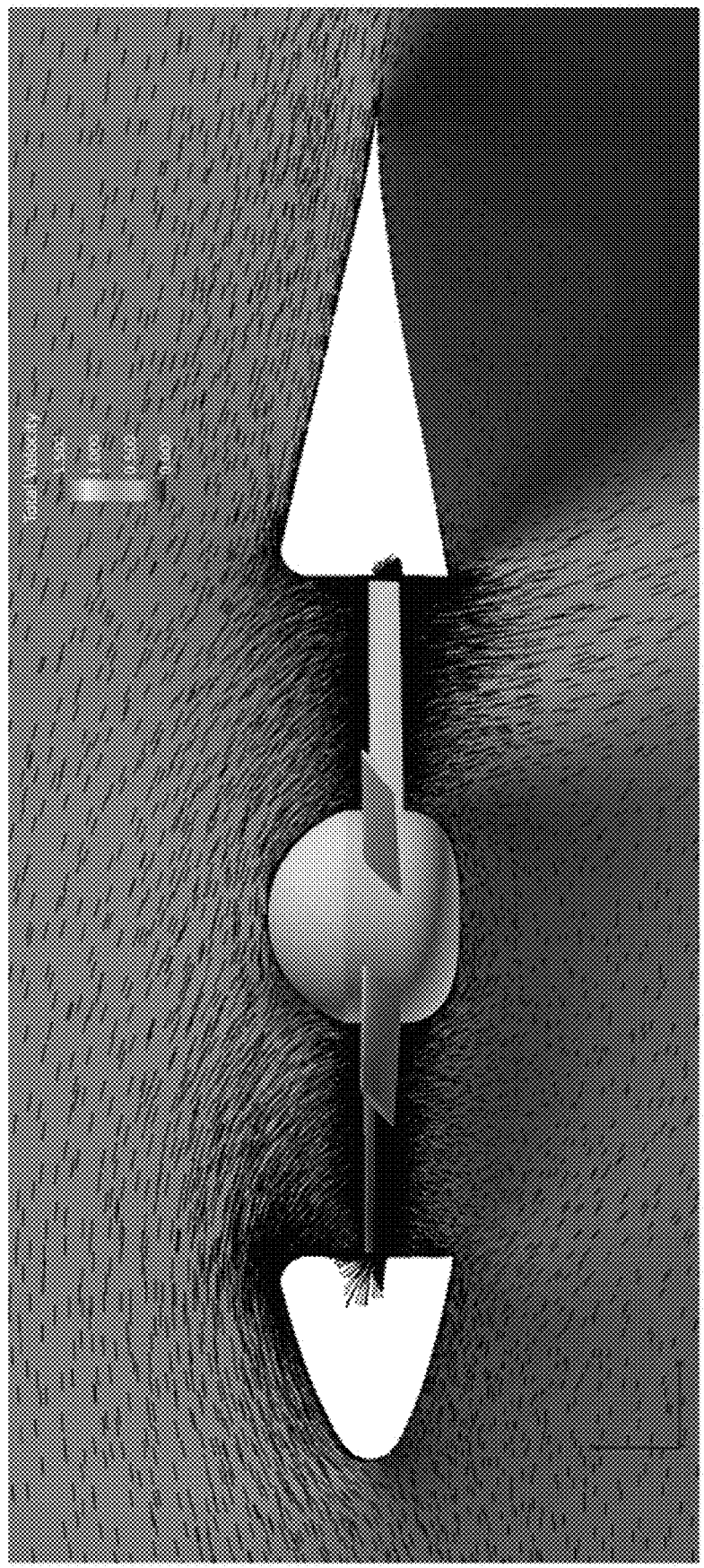
FIG. 36: Computed velocity field for FIW using inactive flow control (Semi-Low-Zero), θ=38 deg.
Figure 37:
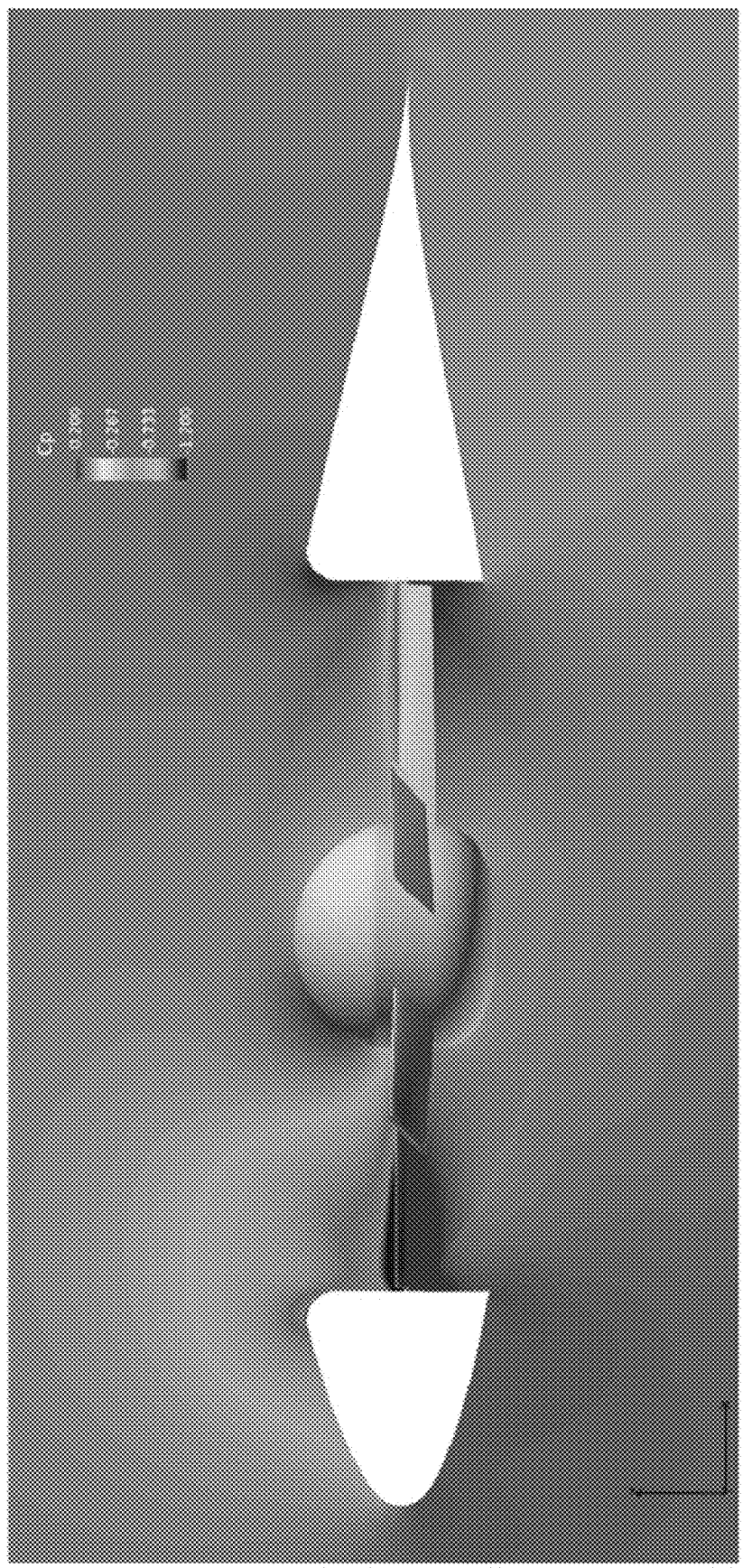
FIG. 37: Computed pressure field for FIW using active flow control (Semi-Low-Zero), θ=38 deg.

The goal of the active flow control is to reduce or eliminate the flow separation at the windward side of the duct in an attempt to improve the mass flow rate through the duct as well as to improve the pressure field on the wing surface. All six active flow control schemes listed in Table 4 were numerically investigated to assess the efficacy on FIW aerodynamic performance in forward flight. Computations of FIW using the active flow control were performed at a fixed fan blade pitch angle of 38 deg and are compared with the baseline FIW without the active flow control. The computational results show that two full-annulus schemes do not improve the system thrust, although reduced power consumption is observed. However, all semi-annulus schemes in general show improvement from a moderate to a high degree in the overall FIW system thrust. The most thrust gain is achieved using the semi-annulus zero-net mass flow options. The improvement in aerodynamic performance is largely attributed to removing the flow separation from the windward side of the duct before entering the duct passage, as shown in FIG. 36 for the velocity field calculated using the active flow control (Semi-Low-Zero). The flow separations experienced in the baseline forward flight condition (FIG. 34) are largely removed, resulting in smooth mass flows passing through the duct passage. The improved inflow field at the duct inlet also increases the lift generated by both fan and wing, as strong suction effect is observed on the upper wing surface in forward flight, which is shown in FIG. 37.

Effects of different active flow control schemes on the FIW performance were assessed below based on the following four performance parameters: (1) total thrust, (2) fan power consumption, (3) propulsive efficiency, and (4) pitching stability. Computed FIW aerodynamic performance using all active flow control methods are compared in Table 5, including the baseline aerodynamic performance. All computations were performed at a fixed advance ratio of 0.3355 at the same fan pitch angle of 38 deg.

TABLE 5

Comparison of the FIW aerodynamic performance in forward flight, θ = 38 deg.

| Cases | Thrust Loading (CT/σ) | Power Loading (CP/σ) | Propulsive Efficiency (VT/P) | Pitching Moment (CM/σ) |
|---|---|---|---|---|
| Baseline FIW | 0.2492 | 0.1253 | 0.6670 | 0.4191 |
| Full-Inj-Ext | 0.2158 | 0.0773 | 0.9367 | 0.1371 |
| Full-Inj-Ext (2) | 0.2414 | 0.0890 | 0.9104 | 0.2232 |
| Semi-Up-Ext | 0.4034 | 0.1601 | 0.8453 | 0.8712 |
| Semi-Low-Ext | 0.4650 | 0.1519 | 1.0273 | 0.7572 |
| Semi-Up-Zero | 0.4244 | 0.1520 | 0.9367 | 0.9998 |
| Semi-Low-Zero | 0.5301 | 0.1527 | 1.1646 | 0.9307 |

Thrust

In terms of the thrust improvement using the above active flow control strategies, the air injection used in the full-annulus strategy (Full-Inj-Ext) does not show a thrust increase on the wing. Instead, a reduced thrust is demonstrated on the fan as the mass flow injection rate increases (Full-Inj-Ext 2). This result is consistent with the findings observed for FIW in hover, where the air injection did not improve the thrust generated on the FIW system. These results show that any air injection methods in the FIW duct system do not bring positive effects on the FIW thrust in either hover or forward flight.

However, active flow control using the semi-annulus extraction methods show a beneficial effect considerably. The semi-annulus air extraction methods (Semi-Up-Ext and Semi-Low-Ext) increase the total system thrust by 61.8% to 86.6% compared with the baseline FIW thrust performance, respectively. The semi-annulus air extractions with the zero-net mass flows (Semi-Up-Zero and Semi-Low-Zero) show the largest increase in the system thrust by 70.3% to 112.6% comparing with the FIW baseline performance, respectively. In general, extracting the fluids from the lower windward slots under the fan blades (Semi-Low-Ext and Semi-Low-Zero) produce larger thrust gains than extracting the fluids from the upper windward slots (Semi-Up-Ext and Semi-Up-Zero).

Power Consumption

Using the full-annulus air injection methods, the fan power consumption remains either constant at a low mass flow injection (Full-Inj-Ext) or is reduced at a high mass flow injection (Full-Inj-Ext 2). The computational results show that a high air injection flow rate generally leads to a reduced fan power consumption, or a better propulsion efficiency for FIW in forward flight. The active flow control using the semi air extraction methods, however, shows a noticeable increase in the fan power consumptions although the FIW thrust is increased considerably. The computational results indicate 27.8% to 21.8% increase in power consumption using the semi air extraction methods. There is no significant difference in power consumptions between the non-zero and zero-net mass flow methods.

Propulsive Efficiency

The study of the FIW propulsive efficiency provides a measure on which active flow control strategy is cost effective. Computational results indicate that all active flow control methods investigated in this Example improve the propulsive efficiency in a various degree compared with the baseline FIW system. Generally speaking, the methods using the full-annulus methods provide 36.5% to 40.4% increase of the propulsive efficiency due to reduced power consumption in forward flight. In addition, 26.7% to 40.4% improvement of the propulsive efficiency is obtained with the semi air extraction from the upper slots (Semi-Up-Ext and Semi-Up-Zero). The largest improvement of the propulsive efficiency is achieved from 40.4% to 74.6% using the semi air extractions from the lower slots (Semi-Low-Ext and Semi-Low-Zero). These results are consistent with the largest improvement of the FIW thrust when the same semi-annulus active flow controls are used.

Pitching Stability

Computational results indicate that the full-annulus and semi-annulus active flow control methods produce a different trend in pitching moment, because of a different trend in the FIW thrust produced by these methods. The full-annulus active flow control methods consistently show a reduction of the pitching moment from 46.7% to 67.2% compared with the baseline FIW system at the same forward flight condition, where the largest reduction of pitching moment is obtained at a high air injection rate. On the other hand, all semi-annulus air extraction methods show a large increase in the pitching moment from 80.7% to 135.6% at the same forward flight condition, where the zero-net mass flow methods (Semi-Up-Zero and Semi-Low-Zero) produce the highest pitching moment increase in all active flow control methods investigated in this Example.

Unsteady Behavior

Figure 39:
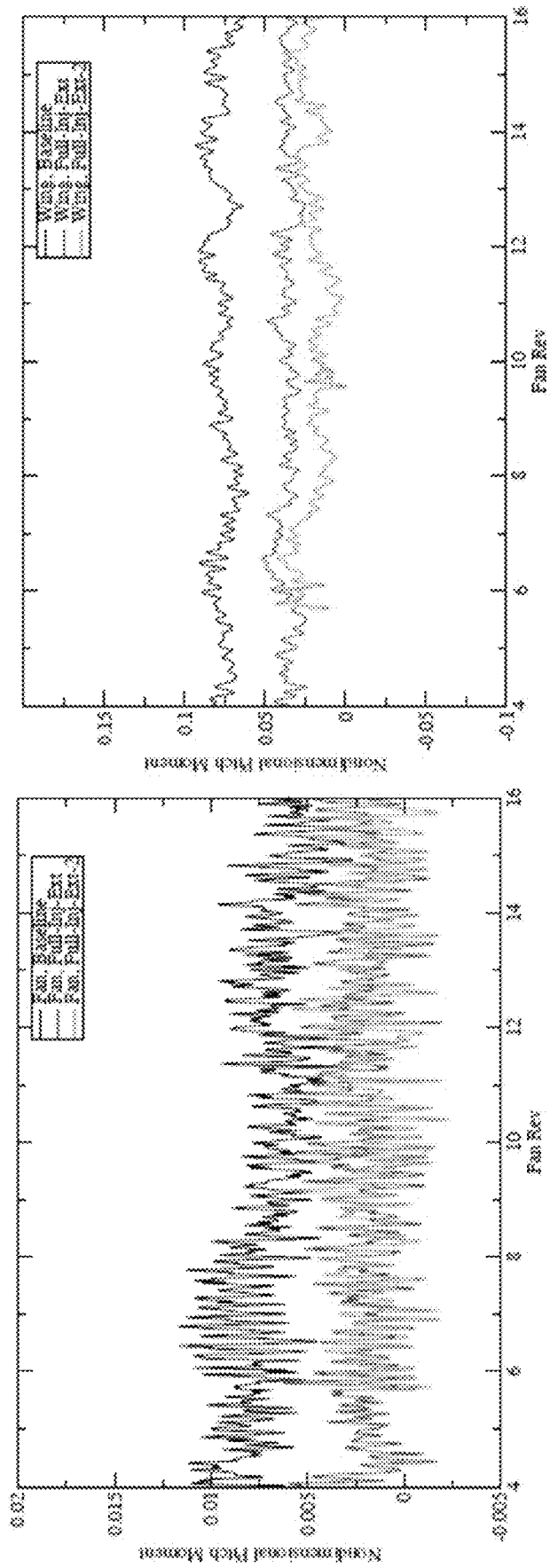
FIG. 39: Convergence histories of non-dimensional pitching moment of fan (left) and wing (right) using full-annulus active flow control, at θ=38 deg.

The above FIW performance analyses are based on the time-averaged aerodynamic data calculated for the FIW configuration over a period from 10 to 50 fan revolutions. However, unsteady behavior of the forces and moments have a direct impact on the handling quality of VTOL devices. To investigate the time-accurate unsteady effect of the active flow control on the FIW aerodynamic characteristics, computed normalized thrusts on the fan and wing of the FIW system using two full annulus active flow controls are shown in FIG. 38. All computed thrusts exhibit a high frequency oscillatory behavior as what is observed in the baseline FIW configuration. In addition, the air injection methods used in the full-annulus active flow control have the negative effect of reducing the fan thrust, but almost no effect on the wing thrust. This is the reason for the reduction of the FIW system thrust using the full annulus active flow control. The computed non-dimensional pitching moments in FIG. 39 also show the high frequency behavior as the fan thrust, but reduced pitching moments are obtained on both fan and wing using the full annulus active flow controls.

Comparisons of computed thrust and pitching moment on the FIW system using the semi-annulus active flow controls are shown in FIGS. 40 and 41, respectively. While the mean fan thrust is not significantly changed using the semi-annulus active flow control, the mean thrust on the wing is significantly increased compared with the baseline FIW without the active flow control (FIG. 40). This shows that increased aerodynamic thrust for the FIW system comes from the increase of thrust on the wing. In addition, notable unsteady patterns are developed for both thrust and pitching moment on the FIW system. In addition to the same high frequency contents as observed using the full annulus active flow control, a significantly low frequency content of one per 20 fan rev is evident in both thrust and pitching moment, as shown in FIGS. 40 and 41. The reason to cause such a low frequency fluctuation in thrust and pitching moment is not clear, and may be related to the unstable state of the FIW system recovered from the stall. This unsteady behavior in the FIW thrust and pitching moment is an area for optimization to achieve optimal active flow control schemes for the FIW aerodynamics in forward flight.

Effect of Active Flow Control

The above computational analyses using different active flow control strategies indicate mixed results in terms of improving the FIW thrust and propulsive efficiency while minimizing the power consumption and pitching moment in forward flight. It was found that injecting the air into the duct or extracting the air from the duct has rather different effects in terms of the FIW aerodynamic performance. The general trend is that methods using the air injection help reducing the fan power consumption and the noseup pitching moment of the FIW system, but have a negative effect on the system thrust. On the other hand, the methods using the air extraction tend to increase the system thrust and propulsive efficiency, but increase the power consumption and pitching moment of the FIW system as well. Therefore, the choice of an active flow control strategy depends on the specific requirements for the FIW system in forward flight. However, the air extraction methods using the zero-net flow strategies (Semi-Up-Zero and Semi-Low-Zero) provide an easier implementation of the active flow control in FIW or VTOL devices. The increased pitching moment can be addressed using a separate flow control method or wing flap treatment. The computational investigations performed in this Example are useful for developing an optimal flow control strategy for the FIW system in forward flight conditions.

Conclusions

The aerodynamic performance of a FIW configuration was numerically investigated in forward flight based on high-fidelity computational simulations. An active flow control system was introduced for the FIW or lift fan devices in forward flight. The effects of active flow control on the FIW thrust, power consumption, propulsive efficiency, and pitching moment were assessed based on high-fidelity computational simulations. Semi-annulus active flow control methods were described in this Example, and showed significant improvement of the system thrust and propulsive efficiency for the FIW device in a forward flight. This active flow control system can be applied to other similar lift fan devices such as ducted fans. The semi-annulus active flow control using the zero-net mass flow strategies, in particular using the air extraction from the lower windward slots on the duct surface, provided the highest performance gain in terms of the total thrust and propulsive efficiency of the FIW system in forward flight. The current semi-annulus active flow control strategy can easily be incorporated with the full-annulus air extraction with the zero-net mass flow that was developed for FIW devices in hover. Low frequency oscillations of once per 20 fan revolutions were observed in the unsteady simulations of the FIW thrust and pitching moment. These unsteady behaviors are a target for optimization to better enhance performance.

Certain embodiments of the systems and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the compositions and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A method of conducting active flow control in a ducted fan or fan-in-wing aircraft having a fan within a duct defining a duct wall, the method comprising:
    actively sucking air through one or more suction outlets in the duct wall from a position relative to a blade tip of a rotatable blade of the fan, wherein the position is in a diffuser section of the duct under a plane defined by rotation of the blade at a quarter chord point of the blade tip and disposed at a distance from the plane approximately equal to a distance between a leading edge of the blade tip and a trailing edge of the blade tip; and
    directing the sucked air to an exit of the duct at a trailing edge of the duct;
    wherein the sucking is conducted at a suction speed within 15% of a speed of the blade tip.

2. The method of claim 1, wherein the step of actively sucking air includes semi-annulus air extraction, wherein the air is actively sucked from a windward side of the duct only under the blade.

3. The method of claim 1, wherein the step of actively sucking air includes full-annulus air extraction, wherein the air is actively sucked from a full annulus of the duct under the blade.

4. A method of conducting active flow control in a ducted fan or fan-in-wing aircraft having a fan within a duct defining a duct wall, the method comprising:
    passively or actively removing air from a position relative to a blade tip of a rotatable blade of the fan through one or more suction outlets in the duct wall, wherein the position is in a diffuser section of the duct under a plane defined by rotation of the blade at a quarter chord point of the blade tip and disposed at a distance from the plane approximately equal to a distance between a leading edge of the blade tip and a trailing edge of the blade tip;
    wherein the method comprises a combination of semi-annulus air extraction with zero-net mass flow and full-annulus air extraction with zero-net mass flow, wherein:
    in forward flight, the air is actively removed semi-annulusly from a windward side of the duct only under the blade, and is directed to an exit of the duct, and
    in hover, the air is actively removed in a full annulus of the duct under the blade, and is directed to an exit of the duct.

* * * * *